(12) United States Patent
Fukushima

(10) Patent No.: US 6,366,741 B1
(45) Date of Patent: Apr. 2, 2002

(54) IMAGE-FORMING APPARATUS SYSTEM AND METHOD FOR REMOTELY SUPERVISING A PLURALITY OF IMAGE-FORMING APPARATUSES

(75) Inventor: Kazuyoshi Fukushima, Setagaya-ku (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 09/539,509

(22) Filed: Mar. 30, 2000

(30) Foreign Application Priority Data

Mar. 30, 1999 (JP) .......................................... 11-089559

(51) Int. Cl.[7] .............................................. G03G 15/00
(52) U.S. Cl. ......................................................... 399/8
(58) Field of Search ............................. 399/8, 9, 10, 11

(56) References Cited

U.S. PATENT DOCUMENTS

| | | | |
|---|---|---|---|
| 5,631,724 A | | 5/1997 | Sawada et al. |
| 5,715,496 A | * | 2/1998 | Sawada et al. ................ 399/8 |
| 5,887,216 A | * | 3/1999 | Motoyama .................... 399/8 |
| 5,933,675 A | * | 8/1999 | Sawada et al. ................ 399/8 |
| 6,141,507 A | * | 10/2000 | Sawada ......................... 399/8 |

FOREIGN PATENT DOCUMENTS

| | | | |
|---|---|---|---|
| JP | 6251274 | A | 9/1994 |
| JP | 8006445 | A | 1/1996 |
| JP | 6329298 | A | 8/1996 |
| JP | 11296767 | A | 10/1999 |

* cited by examiner

*Primary Examiner*—Fred L. Braun
(74) *Attorney, Agent, or Firm*—Oblon, Spivak, McClelland, Maier & Neustadt, P.C.

(57) ABSTRACT

A supervising method and system, the system including a plurality of image-forming apparatuses, and a monitoring terminal apparatus disposed in a service center which is connected to the plurality of image-forming apparatuses via a public line. Each image-forming apparatuses is capable of transmitting report information to the service center when an abnormality occurs in the image-forming apparatus. A monitoring terminal stores and displays the report information from the image-forming apparatus. The monitoring device counts a not-yet-dealt-elapsing time period per stored report information. The monitoring terminal further compares each not-yet-dealt-elapsing time period of the report information with a predetermined time period, alerting an operator of the report information and associated effect based upon the not-yet-dealt-elapsing time period exceeding the predetermined time period as to process expediently urgent report information.

52 Claims, 37 Drawing Sheets

Fig. 4

| | Parameter Contents | |
|---|---|---|
| Copier of Address 1 | Model Number | |
| | Serial Number | |
| | Foregoing Check Sum | |
| Copier of Address 2 | Model Number | |
| | Serial Number | |
| | Foregoing Check Sum | |
| Copier of Address 3 | Model Number | |
| | Serial Number | |
| | Foregoing Check Sum | |
| Copier of Address 4 | Model Number | |
| | Serial Number | |
| | Foregoing Check Sum | |
| Copier of Address 5 | Model Number | |
| | Serial Number | |
| | Foregoing Check Sum | |
| Remote Report by Remote Reporting Key | Contact Destination Telephone Number | |
| | Redial number of times | |
| | Redial interval | |
| | Information Transmission Possibility When reporting to Service Center | Jam occurrence number of times |
| | | Self diagnosis abnormality number of times |
| | | Copy sheet number |
| | | Copier Condition |
| | Foregoing Check Sum | |
| Remote Report by self diagnosis Abnormality | Contact Destination Telephone Number | |
| | Redial number of times | |
| | Redial interval | |
| | Information Transmission Possibility When reporting to Service Center | Jam occurrence number of times |
| | | Self diagnosis abnormality number of times |
| | | Copy sheet number |
| | | Copier Condition |
| | Foregoing Check Sum | |
| Remote Report by Pre-Caution | Contact Destination Telephone Number | |
| | Redial number of times | |
| | Redial interval | |
| | Information Transmission Possibility When reporting to Service Center | Jam occurrence number of times |
| | | Self diagnosis abnormality number of times |
| | | Copy sheet number |
| | | Copier Condition |
| | Reporting Date Time ( Time : Minute ) | |
| | Foregoing Check Sum | |
| Total Counter Value Auto Reporting Operation | Total Copy Sheet Number Counter Value Collecting Time | |
| | Contact Destination Telephone Number | |
| | Reporting Date Time ( Time : Minute ) | |
| | Foregoing Check Sum | |
| Telephone Setting | Dial Mode Setting ( P : T ) | |
| | Dial Pulse Interval Setting | |
| | Foregoing Check Sum | |
| Remote Report by logging data | Contact Destination Telephone Number | |
| | Redial number of times | |
| | Redial interval | |
| | Foregoing Check Sum | |

Fig. 37

| Code | Operation Name | Contents of Operation |
|---|---|---|
| 30 | SC Call | Auto Report When SC |
| 31 | Manual Call | Auto Report When Manual SW is depressed |
| 32 | Alarm Transmission | Auto Report When Alarm Occurs |
| 22 | Block Billing | Auto Report When Reading Block Billing Number of Sheets |
| 02 | Data Read | Read internal Data of PPC |
| 04 | Data Write | Write internal Data of PPC |
| 03 | Execution | Test by way of Remote Operation |
| 08 | Device Code Confirming Operation | Operation for Checking Communication Function |

IMAGE-FORMING APPARATUS SYSTEM AND METHOD FOR REMOTELY SUPERVISING A PLURALITY OF IMAGE-FORMING APPARATUSES

CROSS REFERENCE TO RELATED APPLICATIONS

This application claims priority under 35 USC section 119 to Japanese Patent Application No. 11-89559 filed on Mar. 30, 1999, the entire contents of which are incorporated by reference herein.

BACKGROUND OF THE INVENTION

1. Field of the Invention

The present invention relates to an image forming system, and more particularly to an image-forming apparatus for a remotely supervising system connected to a plurality of image-forming apparatuses, such as copiers, and a monitoring terminal apparatus.

2. Discussion of the Background

A conventional image-forming system includes a collection of copiers connected over a network. Typically, the system is located at an office or the like (i.e., service center) in which an unspecified number of users, or customers, can access the service center via a communication line, for example a public line. In such a conventional supervising system, each of the copiers is situated remotely from the service center. The service system collects supervisory information, such as usage and maintenance data, from the copiers for servicing purposes. An example of usage data includes the number of copy sheets; maintenance data may include information on the various sections and parts of the copier. This information may be gathered by the service center by the copier executing an auto call generation function that is triggered by a self-diagnosis program within the copier itself. That is, the copier initiates a call to the service center on its own to report results of the self-diagnosis. Alternatively, the service center may initiate communication with the copier to obtain information. Once the information is collected, a center operator typically reviews the information in form of a report at a terminal and executes the proper measures remotely. For example, as described in Japanese Patent Application Laid Open Numbers 3-161763, 3-161766, and 3-162055, a report activity indicating an abnormality can be quickly and economically disseminated to multiple terminals. A drawback with such a system is that when a supervisory terminal is overwhelmed with report information, there can be considerable delay in acting upon these reports. This problem grows worse as greater number of copiers are deployed. The consequence of this delay is that potentially urgent maintenance cannot be timely performed, which results in poor response time for the users. In other words, the user or customer experiences a lower level of service. Therefore, to prevent degraded level of service for the customer, one approach is to increase the number of supervisory terminals and center operators. However, this approach entails significant costs; e.g., equipment and labor costs. SUMMARY OF THE INVENTION Accordingly, an object of the present invention is to overcome the above problems and to provide a novel image-forming apparatus remotely supervising system that includes a plurality of image-forming apparatuses; a monitoring terminal apparatus disposed in a service center and connected to the plurality of image-forming apparatuses via a public line; a report information-transmitting device configured to transmit report information from each image-forming apparatus to the service center; a report information-storing device configured to store the report information received form the image-forming apparatuses; a report information displaying device configured to display contents of report information stored in the report information-storing device, a not-yet-dealt-elapsing time counting device configure to count a not-yet-dealt-elapsing time period per report information stored in the report information-storing device; a comparing device configured to compare each not-yet-dealt-elapsing time period of the report information with a predetermined time period; and an informing device configured to inform through the displaying device an operator of the effect or report information whose not-yet-dealt-elapsing time period exceeds the predetermined time period.

In another embodiment, one or more service stations are configured to deliver a service person for dealing the report information transmitted from the plurality of image-forming apparatuses are connected to the image-forming apparatus supervising system.

In yet another embodiment, the comparing device periodically executes the comparison at a predetermined interval.

In yet another embodiment, the comparing device periodically executes the comparison at a predetermined interval.

In yet another embodiment, the predetermined Interval is changeable.

In yet another embodiment, said predetermined time is changeable.

In yet another embodiment, the report information-transmitting device is disposed in each of the plurality of image-morning apparatuses.

In yet another embodiment, the report activity includes abnormality of the image-forming apparatus which requires urgent maintenance.

In yet another embodiment, the report information-storing device is disposed in the monitoring terminal apparatus.

In yet another embodiment, the not-yet-dealt-elapsing time counting device is disposed in the monitoring terminal apparatus.

In yet another embodiment, the informing device is disposed in the monitoring terminal device.

In yet another embodiment, the monitoring terminal apparatus includes a confirmation information-transmitting device configured to transmit confirmation information indicating reception of report information by the report information-receiving device to an image-forming apparatus as a transmission source of the report information.

In yet another embodiment, the confirmation information-transmitting device transmits the confirmation information when report information is displayed on the report information-displaying device.

In yet another embodiment, each of the plurality of image-forming apparatuses includes an operation related information-transmitting device configured to transmit operation related information to the service center after said report information is transmitted to the service center by the report information-transmitting device and operation related information is inputted.

In yet another embodiment, the operation related information includes information-indicating completion of repair for the image-forming apparatus.

In yet another embodiment, the monitoring terminal apparatus includes a report information deleting device configured to delete report information stored in the report information-storing device when an operation related information corresponding to the report information is transmitted from one of the plurality of image-forming apparatuses.

In yet another embodiment, the informing device is configured to inform the effect or report information in accordance with either the first informing method or the second informing method, when each not-yet-dealt-elapsing time of the report information stored in the report information-storing device is compared with a predetermined time period in order, and any one of the not-yet-dealt-elapsing time s exceeds the predetermined time period.

In yet another embodiment, the monitoring terminal apparatus includes an informing method designating device configured to designate either the first informing method or the second informing method.

In yet another embodiment, the first informing method informs the operator of report information through the report information displaying device and the second informing method transmits report information to another terminal apparatus so that the report information is informed by the other terminal apparatus.

In yet another embodiment, the second terminal apparatus is the service station.

In yet another embodiment, the first and second informing methods are selectively predetermined depending on a customer of the image-forming apparatus.

In yet another embodiment, the first informing method and the second informing method is selectively predetermined depending on a model of the image-forming apparatus.

In yet another embodiment, the first informing method and the second informing method is selectively predetermined depending on a service station.

In yet another embodiment, the monitoring terminal apparatus includes a changing device configured to change the predetermined time period according to a customer of the image-forming apparatus.

In yet another embodiment, the monitoring terminal apparatus includes a changing device configured to change the predetermined time period according to a model of the image-forming apparatus.

In yet another embodiment, the monitoring terminal apparatus includes a changing device configured to change the predetermined time period according to a service station.

In yet another embodiment, a playing color of report information displayed on the report information displaying device is dynamically changed according to the not-yet-dealt-elapsing time period, when the first informing method is designated by the informing method designating device and a not-yet-dealt-elapsing time period corresponding to the displayed report information exceeds the predetermined time period.

In yet another embodiment, the report information is transmitted to a remote terminal apparatus via the public line, when the second informing method is designated by the informing method designating device and a not-yet-dealt-elapsing time period corresponding to any report information exceeds the predetermined time period.

In yet another embodiment, the remote terminal apparatus has a display for informing the effect or report information transmitted from the terminal apparatus.

In yet another embodiment, the remote terminal apparatus is a personal computer.

In yet another embodiment, the report information transmitted to the remote terminal device is discriminated from the other report information stored in the report information-storing device.

BRIEF DESCRIPTION OF THE DRAWINGS

A more complete appreciation of the present invention and many of the attendant advantages thereof will be readily obtained as the same becomes better understood by the following detailed description when considered in connection with the accompanying drawings, wherein:

FIG. 4 is a diagram of a list of parameters stored (set) in the RAM of the communication control apparatus of FIG. 2;

FIG. 37 is a table of operation codes indicating the types of communication objects, according to an embodiment of the present invention.

DESCRIPTION OF THE PREFERRED EMBODIMENTS

Figure 1:
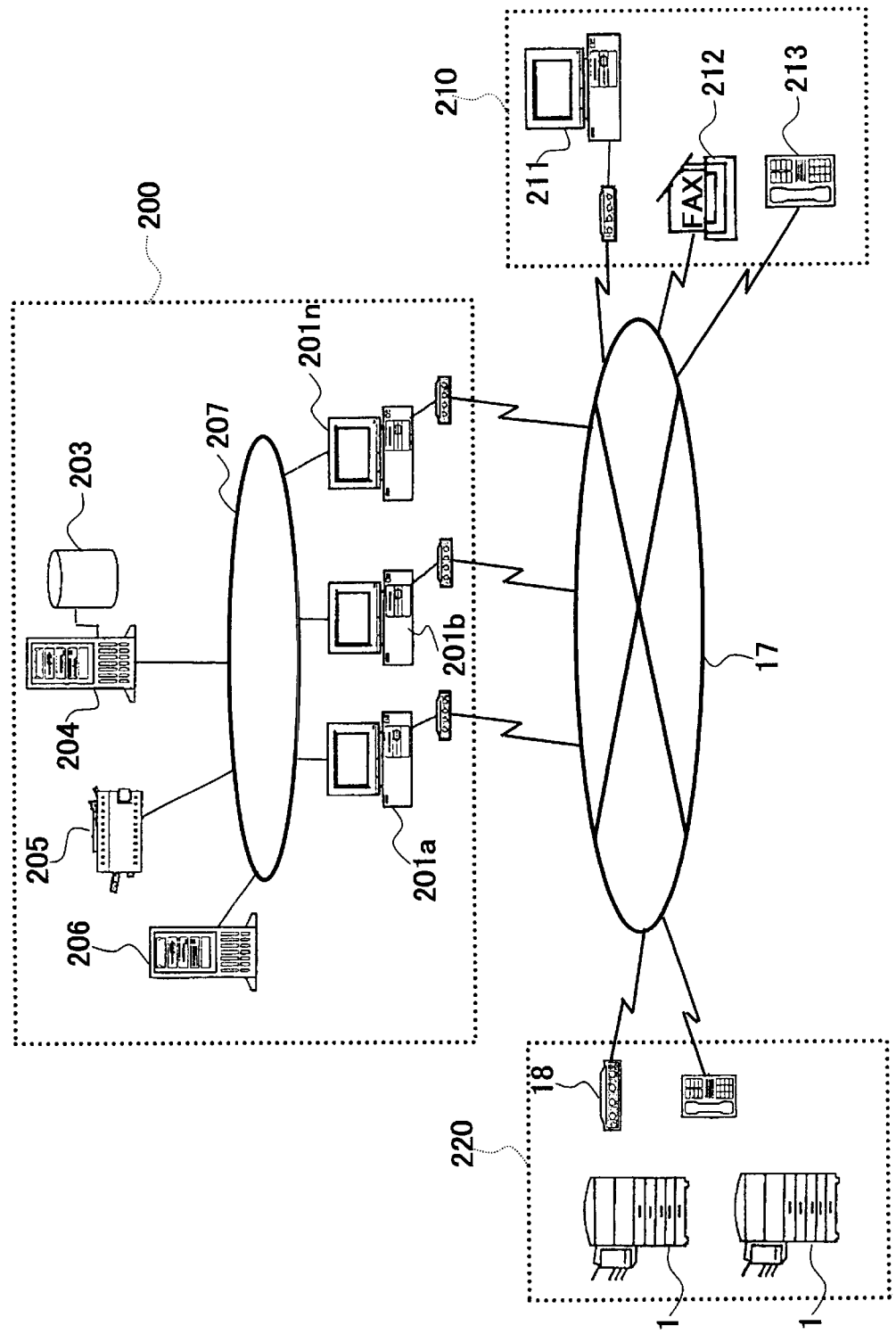
FIG. 1 is a diagram illustrating an exemplary image-forming apparatus remotely supervising system, according to an embodiment of the present invention.

Referring now to the drawings, wherein like reference numerals designate identical or corresponding parts throughout the several views, FIG. 1 illustrates an image-forming apparatus remotely supervising system, in accordance with an embodiment of the present invention.

As seen in FIG. 1, a plurality of clients (or monitoring terminals) 201a, 201b, and 201n are disposed in the service center 200 for executing general management. Copiers (i.e., image-forming apparatuses) 1 are located in a plurality of user regions (i.e., customer destinations) 220. A plurality of service stations 210 include personal computers 211 or similar device devices, which are connected via public line circuits to as a public line network 17. It is recognized by one of ordinary skill in the art that other types of networks can be utilized (e.g., private line networks, data communication networks, etc.).

The service center 200 encompasses a plurality of clients 201a, 201b, and 201n, and a file server 204 for controlling an external memory apparatus 203. The external memory apparatus 203 stores data received by each client 201a, 201b, and 201n, as more fully discussed below with respect to the managing table, and the master information. A duplicating apparatus 205 is capable of printing a variety of documents.

Further, a fax (i.e., facsimile) server 206 controls information to be transmitted to each service station 210 from each of the clients 201a, 201b, and 201n. A LAN (Local Area Network) 207 is provided for the exchange of a variety of information (i.e., data and control signal) among the devices within the service center 200.

In user region 220, copiers 1 are capable of transmitting through a communication control apparatus 18 a variety of information (e.g., report information). Report information can indicate report activity that a problem (i.e., abnormality) has occurred within the copier 1. This report information is sent to the service center 200 via the public line network 17. Additionally, copiers 1 can receive a variety of information transmitted from the service center 200 via the public line network 17.

In each of the plurality of service stations 210, a personal computer (or some other information processing apparatus) 211 controls reception of a variety of information transmitted from the service center 200 via the public line network 17. The personal computer 211 also controls the transmission of a variety of information to the service center 200. The service station 210 includes a fax (i.e., facsimile) 212 for communicating information with the service center 200, as well as a telephone 213. Within service center 210, a service person is designated to monitor the report information related to the copier 1 of the customer destination 220.

Each copier 1 performs a number of functions that provides information to the service center 200. First, the copier 1 possesses report information-transmission capability for reporting activity, such as abnormality, that occurs in the copier 1. Another function of the copier 1 includes processing operation information for transmitting operation related information. For instance, when operation related information that indicates that either a service person has arrived at an installing section of the copier 1 or that the service person is taking measure to address the cause of the report (i.e., report activity). The operation related information may include status information; e.g., whether the operational or maintenance activity has begun or has been completed, after the copier 1 has supplied report information to the service center 200. Further, each client 201a, 201b, and 201n, the file server 204, and the fax server 206 which includes an external memory 203 have a number of functional capabilities: (1) report information-receiving function for receiving report information transmitted from each copier 1; (2) report information-storing function for storing the report information received by the particular device from the copier 1; (3) report-information-displaying function for displaying contents of the stored report information; (4) a not-yet-dealt-elapsing-time-period counting function for counting not-yet-dealt-elapsing time period for each stored report information; (5) an informing function for informing the service center 200 when the not-yet-dealt-elapsing time period associated with each the report information (which is counted and stored by the particular device) exceeds a prescribed time period according to a first informing method and a second informing method (such methods are later described); (6) a confirmation information-transmitting function for transmitting confirmation information to acknowledge receipt of the report information to the particular copier as being the transfer source; (7) an operation related information-receiving function for receiving operation-related information transmitted from any one of copiers; (8) a report information deleting function for deleting report information received from the copier; (9) an informing method designating function for designating either the first informing method or the second informing method depending on respective customers of each copier 1 when a command is input externally (e.g., an input apparatus such as a keyboard of the clients 201a, 201b, and 201n), or depending on respective models of a copier 1, or depending on the respective service stations 210; (12) a changing function for changing the above-described predetermined time period according to respective customers of the copier 1 when a command is input externally, or depending on respective models of the copier 1, or depending on respective service stations 210.

In the case in which the first informing method is designated by the informing method designating function, a not-yet-dealt-elapsing time period of each report information is compared with the predetermined time period. As a result of the comparison, a displaying color is automatically changed based upon the increase in the not-yet-dealt-elapsing time period, if a not-yet-dealt-elapsing time period for any one of the report information exceeds the predetermined time period.

Further, in the case in which the second informing method is designated, the not-yet-dealt-elapsing time period of each report information is compared with the predetermined time period, and the report information is transmitted to a corresponding remote terminal (in this embodiment, a personal computer 211 and a fax 212 including a displaying apparatus in the service station). It should be noted that other terminals can receive the report information via the public line network 17, assuming the not-yet-dealt-elapsing time period for any one of the report information exceeds the predetermined time period.

In this embodiment, each copier 1 and each section of the service center 200 includes all of the functions described above. However, it should be noted that an appropriate subset of these functions can be utilized depending on the specific design requirements.

Figure 2:
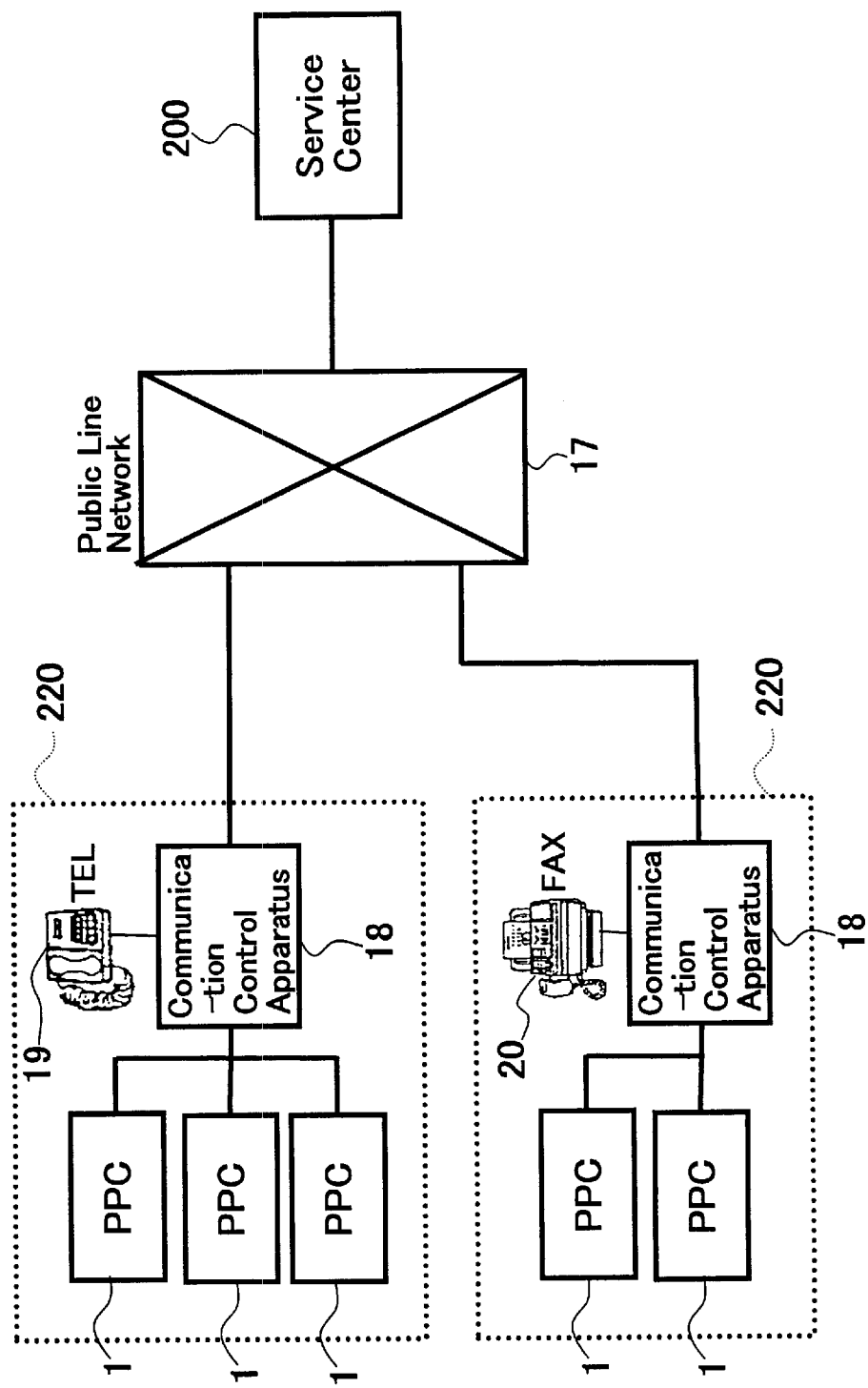
FIG. 2 is a block diagram illustrating a user region in the system of FIG. 1.

In an exemplary embodiment, a user region 220 in the system of FIG. 1 is illustrated in FIG. 2. In the user region 220, a communication control apparatus 18 has an interface apparatus for controlling communication with each client 201*a*, 201*b*, and 201*n* in the service center 200. Each copier (PPC) 1 is connected to the communication control apparatus 18. In the communication control apparatus, an external communication device such as a telephone 19 and a fax 20 or the like can be connected and installed with it being inserted into the existing network of a user.

Further, a single or multiple copiers 1 can connect with the communication control apparatus 18. It is not necessary for these copiers 1 to be of the same shape or model. For example, the copiers 1 can be any image-forming apparatus, such as a printer or the like. In an exemplary embodiment, a maximum of five copiers 1 have connectivity to a single communication control apparatus 18 for convenience of administration. Further, the communication control apparatus 18 and the plurality of copiers 1 are connected to each other in a manner of a multi-drop according to the RS-485 standard. Communication control between the communication control apparatus 18 and the each copier 1 is executed using a basic type data transmitting control procedure (BSC).

Namely, communication with an optional copier is enabled by establishing data linkage using a polling/selecting method, which is centralized control regarding the communication control apparatus 18 as a control station.

Each copier 1 is configured to set a unique value by using an address setting switch, and thereby both polling address and selecting address of each copier are determined.

Figure 3:
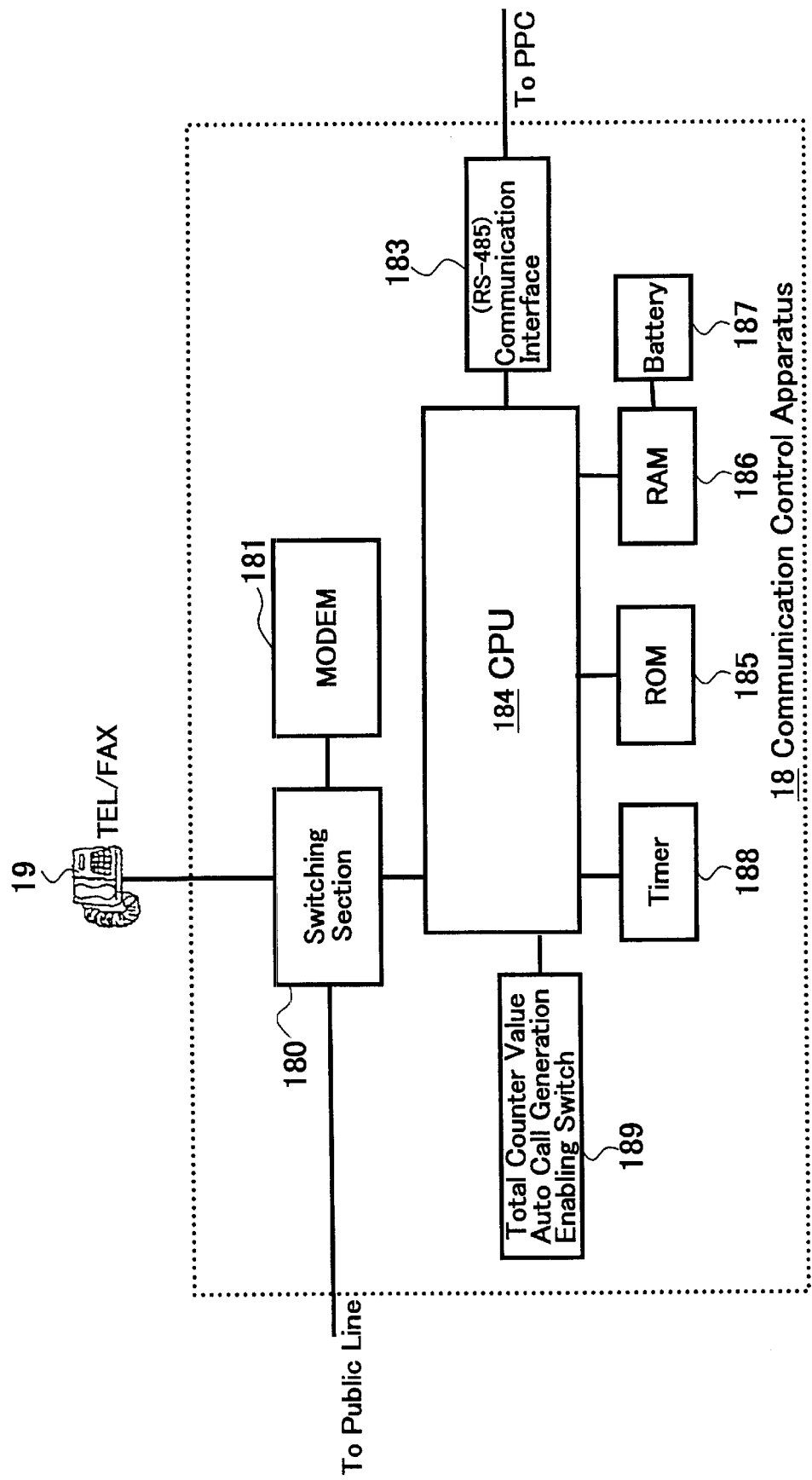
FIG. 3 is a block diagram of the communication control apparatus in the system of FIG. 1.

FIG. 3 shows the communication control apparatus 18 in the system of FIG. 1. A signal from the public line network 17 is preliminary inputted to a switching section 180. If communication from the public line network 17 is destined for the telephone 19 (or alternatively, a fax 20 in FIG. 2) that is connected to the communication control apparatus 18, the public line from the public line network 17 is connected to the telephone 19 (or a fax 20 in FIG. 2). If it is communication from the service center 200, the public line is connected to a MODEM 181.

Further, communication with the copier 1 is executed by a communication interface 183 using a transceiver for the RS-485. These control and operations are executed according to control program stored in a ROM 185 with a CPU 184 as the central controller. A RAM 186 is used for storing mid term result of an operation and also temporally storing communication text. Further, each parameter necessary for an operation of the communication control apparatus 18 from the service center 200 side is written in a RAM 186.

In general, the communication control apparatus 18 keeps its condition possible to communicate every time with the service center 200 by receiving all day continuous power supply. However, battery 187 backs up the RAM 186 not to lose contents of the parameter and the communication text because of accidental stoppage and stoppage for safety of supply of the power. Further, a timer 188 and a total counter value auto call generation enabling switch 189 are provided.

FIG. 4 is a diagram illustrating a list of a variety of parameters stored (set) in the RAM 186 of the communication control apparatus 18 of FIG. 2. Both a model number and a serial number (machine number) are registered for each copier of each address, and report information is transmitted with these numbers being put toward the service center 200 at a time of reporting (transmitting). Further, it is used to determine an address of a copier to be selected at a time of access from the service center 200.

Further, a reporting destination (i.e., contact destination) telephone number, a number of redial times and its interval, kind of data (i.e., report information) to be transmitted to the service center 200 (i.e., a number of jam occurrence times, a number of copy sheet or like), and report date and time are set for respective remotely reporting activities. A check sum is added to each block of the parameter, so that it is detected when parameter value is overwritten or lost because of a miss-operation of the communication control apparatus 18, exhaustion of battery 187 for back up use, and an error on communication.

These parameters are written from the service center 200 via the public line network 17. However, it is possible to write with a mobile apparatus for parameter setting use, which is directly connected to the communication control apparatus 18, or by providing an operation device on the communication control apparatus 18 and setting therethrough, and by setting from the copier. In this case, since setting a parameter is important, secrecy is enhanced if an ID (password) is added to communication data. The ID is not uniquely determined according to each communication control apparatus 18, and it is determined at a time of designating a parameter the first time (when a parameter in FIG. 4 is not yet determined). The ID cannot be changed after that by communication; however, it can be changed by manually initializing the communication control apparatus. Since the ID is confirmed with every communication, erroneous data cannot enter thereinto and it is not entered by a different system. When a different ID is received a predetermined number of times, its error is informed to a supervisor by automatically reporting to the service center 200. A hacker or the like is prevented by confirming the ID. Further, the above mentioned ID is not changed at a time of every communication. However, another ID (ID changing use) can be used to change ID, for example.

Figure 5:
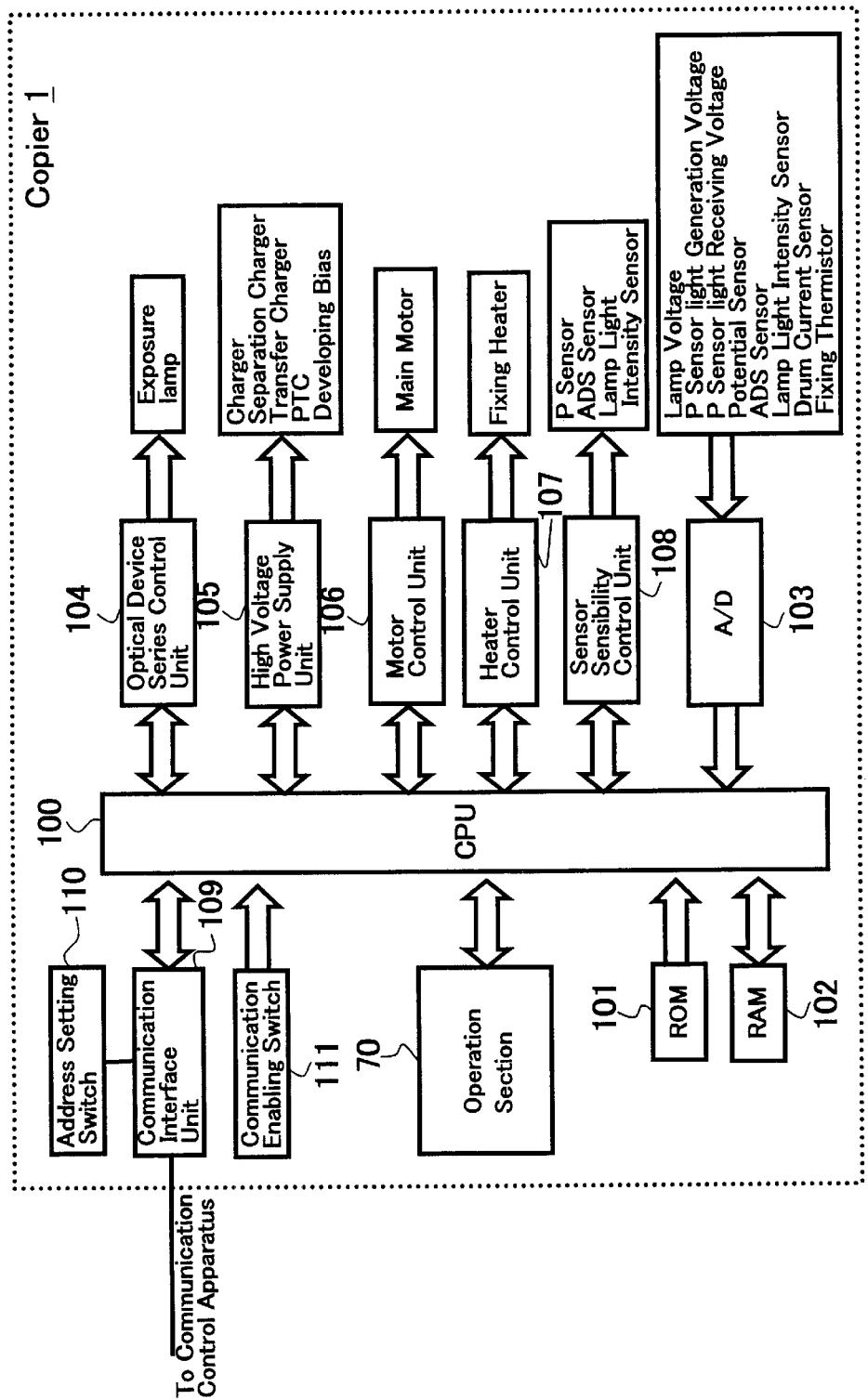
FIG. 5 is a block diagram of the controller series of the copier in the system of FIG. 1.

FIG. 5 is a block diagram illustrating a controller series of the copier 1 in the system of FIG. 1. Control of a body of the copier 1 is executed mainly by a CPU 100 based on data and control program stored in a ROM 101. Further, a RAM 102 is used for storing mid term result of an operation, a variety of setting values, and condition of the apparatus. An A/D converter 103 is utilized for inputting supply voltage of an exposure lamp (i.e., lamp voltage), an output of the ADS sensor, an output of the lamp intensity sensor for detecting intensity of light of the exposure lamp, an output of the drum current sensor for detecting current flowing the PC drum, and voltage of the thermistor (i.e., fixing thermistor) or the like. An optical device series control unit 104 executes driving control of the exposure lamp. A high voltage power supply unit 105 supplies, a separating charger, a transfer charger, and a pre-transfer charger (hereinafter referred to as a PTC) with high voltage, and a developing roller in the developing unit with developing bias voltage. A motor control unit 106 controls a main motor driving a PC drum, and a roller of each sheet feeding unit and a transfer unit or the like. A heater control unit 107 controls supplying of power to a fixing heater heating a fixing roller of the fixing device, and holds surface temperature within a predetermined range.

A communication interface unit 109 is a unit for communicating with a communication control apparatus 18. A unique address (i.e., a device code) of a copier can be set using an address setting switch 110 among a range ranging from 1 to 5. Further, admission/inhibition of communication with the communication control apparatus 18 can be set using a communication-enabling switch 111.

The communication-enabling switch 111 is configured by a dip switch. Thus, a service person turns ON when an image-forming apparatus having the dip switch is connected to an image-forming apparatus supervising system (i.e., remote diagnosis system). However, a general user can in principle not touch thereof. Accordingly, the communication enabling switch 111 holds ON state during the image-forming apparatus having the dip switch is connected to the image-forming apparatus supervising system.

Figure 6:
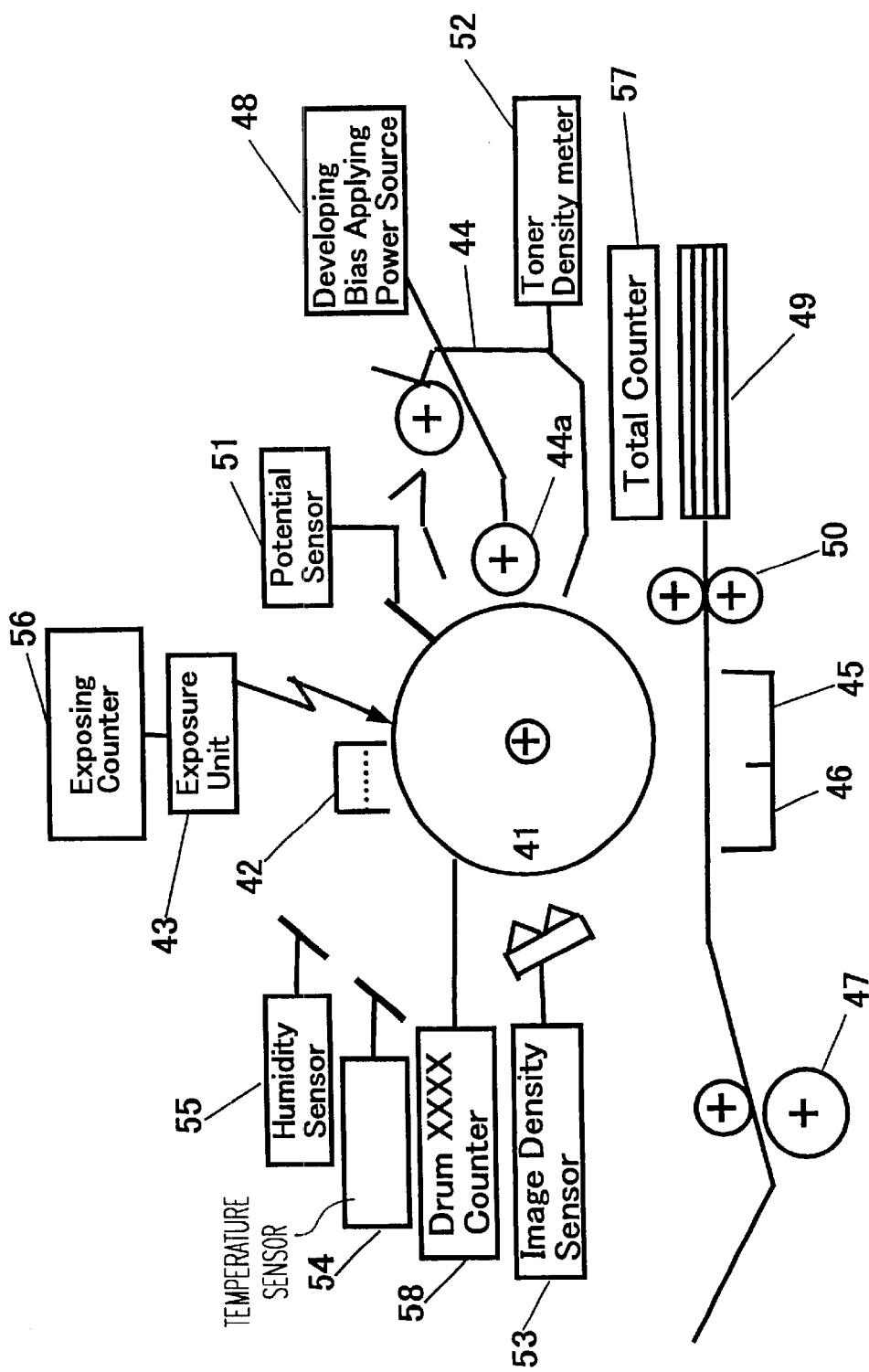
FIG. 6 is a diagram of the components around a drum of the copier in the system of FIG. 1.

FIG. 6 shows the components around a drum of the copier 1, according to one embodiment of the present invention. In the copier 1, a PC drum 41 is shown to be configured by an organic photo-conductive body, and process devices such as a charger 42, an exposure unit (scanner unit) 43, a developing unit 44, a transfer charger 45, a separating charger 46, and a fixing unit 47 or the like are arranged in order around the PC drum 41.

A main motor not shown rotates the PC drum 41. A surface of the PC drum 41 is exposed with a light corresponding to an original document image from the exposing unit 43, and a latent image is formed thereon. The developing roller 44e of the developing unit 44 applied with predetermined developing bias by the developing bias applying power supply 48 applies toner to the latent image and visualizes thereof (i.e., toner mage is formed). After that, the transfer charger 45 transfers the toner image on a transfer sheet fed from a sheet feeding cassette 49 via a registration roller 50.

After that, the transfer sheet is separated from the PC drum 41 and transferred toward the fixing unit (fixing roller) 47. The toner image is fixed with heat, and finally is ejected on an ejection tray. Remaining toner on the PC drum 41 is removed by a cleaning unit (not shown).

Further, in the copier 1, a variety of sensors (detecting sections), such as a potential sensor (i.e., surface potentiometer) 51, a toner density measure 52, an image density sensor 53, a temperature sensor 54, and a humidity sensor 55 or the like, and a variety of counters, such as an exposing time counter 56, a total counter 57, and a drum rotation number counter 58 or the like are provided.

The potential sensor 51 detects surface potential of the PC drum 41 (i.e., charge potential made by the charger and potential of an exposed section made by the exposure unit 43), the toner density measure 52 detects toner density in the developing unit 44, the image density sensor 53 detects a toner image (i.e., image) remaining on the PC drum 41, the temperature sensor 54 detects temperature of in the vicinity of the PC drum 41, and the humidity sensor 55 detects humidity in the vicinity of the PC drum 41.

The exposing time counter 56 counts an exposing time period by the exposure unit 43, the total counter 57 counts a copy sheet number (i.e., total copy sheet number) in synchronism with rotation of the registration roller 50, and the drum rotation counter 58 counts a rotation number of the PC drum 41.

Figure 7:
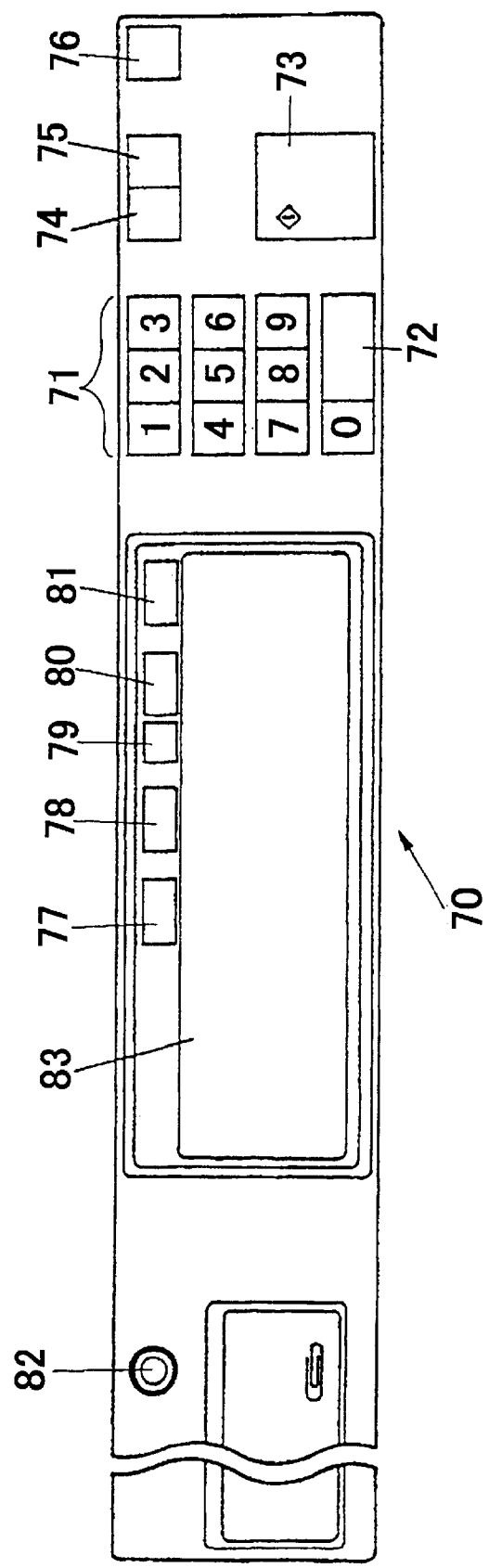
FIG. 7 is a diagram of an operating section of the copier in the system of FIG. 1.

FIG. 7 shows a layout of an operating section 70 of the copier 1, according to one embodiment of the present invention. The operating section is provided with a ten-key 71, a clear/stop key 72, a copy start key 73, an enter key 74, an interruption key 75, a pre-heat/mode clear key 76, a mode confirming key 77, a display switching key 78, a call key 79, a registration key 80, a guidance key 81, a display use contrast volume 82, and a character displaying device 83. The ten-key is a key for inputting a value such as a copy sheet number and a magnification rate. The clear/stop key 72 is a key for clearing a copy sheet number (i.e., set number) and stopping a copying operation. The copy start key 73 is a key for starting a copying operation. The enter key 74 is a key for fixing designation of a numerical value, such as a zoom magnification rate and a setting number for a margin.

The interruption key 75 is a key used when interrupting a copy operation and copying or the like pre-heat/mode clear key 76 is a key for canceling contents of all copy modes set and saving electricity by setting a pre-heat mode. The mode confirming key 77 is a key for confirming each copy mode on a list selectively displayed on the character-displaying device 83. The display switching key 78 is a key for switching a displaying form of the character display according to a mastery level of a user. The call key 79 is a key for calling user program. The registration key 80 is a key for registering user program. The guidance key 81 is a key for displaying guidance messages on the character-displaying device 83. The display use contrast volume 82 in one for adjusting contrast of the character-displaying device 83. The character displaying device 83 comprises full dot displaying elements such as fluorescent displaying tubes, and a transparent sheet state matrix touch panel overlaid on the full dot displaying elements and installing a plurality of touch sensors. The character displaying device 83 displays a copy mode setting screen indicating condition of an copier 1 (i.e., "copy is available", "copying is going on" and "no transfer sheet" or the like), a copy sheet number, and a variety of keys when electrical power is supplied.

When the copy mode setting screen is displayed, an ordinary copy mode can be set. Namely, by depressing the key on the copy mode setting screen, a variety of copy modes are set as follows and the key depressed changes its display to a white black reversed condition. Namely, a feeding sheet cassette (i.e., transfer sheet size), an auto sheet (i.e., a feeding cassette accommodating most preferable transfer sheets is automatically selected considering an original document size and magnification set), image density (i.e., copy density), auto density (image density is automatically selected corresponding to density of the original document), a magnification rate (i.e., same magnification, reduction, enlargement, sheet designated magnification, zoom magnification, size magnification), a duplex mode (i.e., a mode where an original document image is copied on front and rear side surfaces of the transfer sheet), a margin mode, and a sort mode or the like can be set.

Further, a service person mode can be set beside the ordinary copy modes, which a service person uses when executing a repairing operation and maintenance. In this case, a mode is shifted to a service person mode when a service person depresses the pre-heat/mode clear key, and then each key "1", "0", and "7" of the ten-key 71 in order, and finally the clear/stop key more than three second, and a service person mode is displayed on the character displaying device 83. The service person checks conditions of the variety of sensors, and operations of loads such as each motor and clutch or the like under the service person mode, and is possible to repair and execute maintenance.

Hereinbelow, general functions of the image-forming apparatus remotely supervising system are described. The system has three basic functions: (1) control with text from the service center 200; (2) control from the copier 1 with text; and (3) unique control of the communication control apparatus 18. As control of communication from the service center 200 with the text, reading and initializing (i.e., resetting) of a number of total copy sheets, a number of mis-feeding times, and setting and reading of an adjusting value of control voltage, current, resistance, and process timing for each unit of a specified image-forming apparatus, are exemplified.

These controls are executed by selecting from the communication control apparatus 18 to the copier 1. The selecting represents a function that one unit is selected among a plurality of copiers 1, and communication is executed.

Each copier 1 has a unique (specified) device code, respectively. The communication control apparatus 18 outputs a predetermined specified code indicating selecting, and a device code of an image-forming apparatus to be selected onto a serial communication interface RS-485. Each copier 1 recognizes itself as selected referring to a specified code indicating selecting, when comparing a device code following the selecting indicating specified code with its own device code, and when both codes accord with each other.

As control from the copier 1 with text, followings are exemplified. Namely, generation of a service person call (i.e., SC) as a self diagnosis abnormality report (i.e., self call generation is immediately executed in response to the generation); generation of precaution report (i.e., alarm) requiring prevention and preservation, such as events of closing to a designated number of usage times and a designated usage time period of spare parts, and arrival of a sensor at a standard level (i.e., a self call is generated at a designated time in the day); and a remote report key call for directly calling a service center when an operator at the image-forming apparatus side executes a specified operation (e.g., depressing a manual key) predetermined by the operating section 70 (i.e., a response of the service center 200 to that is generally made by a telephone), are exemplified.

The above-described communications are executed when polling. The polling represents a function that a plurality of copiers 1 connected is subsequently designated, and it is confirmed if a communication request from the designated copier 1 exists. The communication control apparatus 18 transmits a specified code indicating polling and a device code of an copier 1 to be selected onto the serial communication interface RS-485.

Each copier 1 recognizes itself as designated for polling referring to a polling indicating specified code, when its own device code accords with the device code following the polling indicating specified code. The communication control apparatus 18 selects either shifting to a selecting operation for the copier 1 or to a selecting operation for a next copier 1, based on the response of the copier 1 to the polling.

As unique control of the communication control apparatus 18, reading of a total counter value (i.e., integrated copy sheet number) is exemplified. The control is executed by selecting from the communication control apparatus 18 to the copier 1 once a day at a predetermined time (e.g., at noon, or at a time when electrical power source is firstly supplied).

The communication control apparatus 18 has two memories (assuming A and B respectively) for a total copy counter use for each copier 1 connected to its own machine, and a total counter value read by the above noted selecting one a day is written in the memory (A). Therefore, the value stored in the memory (A) the day before is overwritten every day (except for a case where electrical power source of a copier never turns ON all day, such as on Sunday).

The total counter value stored in the memory (A) is copied once a month to the memory (B) at the predetermined day and time (these are set by the service center 200, and are stored in a corresponding parameter region of the RAM 186 in the communication control apparatus 18 as illustrated in FIG. 4).

Further, the communication control apparatus 18 transmits a counter value stored in the memory (B) to the service center 200 via the public line network 17 when the service center goes and reads the total counter value after the above noted day and time.

Further, the communication control apparatus 18 has a plurality of combined memories (A) and (B) for each copier 1 connected to the own machine. Because, a variety of total counter values, such as a counter value for a mono-color copy, a full-color copy, and an application copy can possibly exist.

Figure 8:
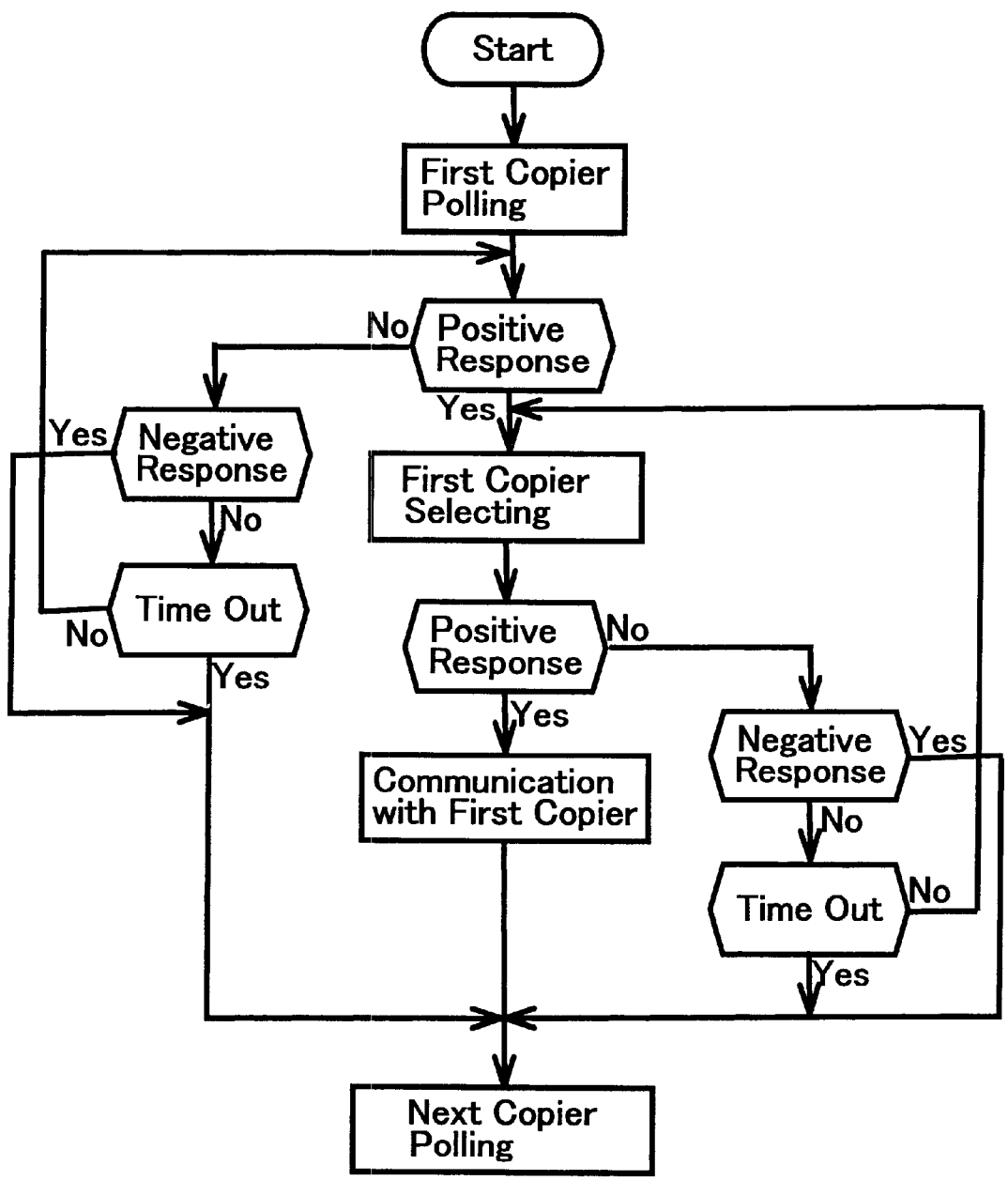
FIG. 8 is a flowchart of the polling and selecting operation executed in the communication con apparatus in the system of FIG. 3.

FIG. 8 is a flowchart of a selecting operation and a polling operation in the communication control apparatus 18. The communication control apparatus 18 executes polling for the plurality of copiers 1 connected thereto. The polling is executed to confirm a connecting request from the copier 1 as mentioned above. The copier 1, which is selected by the polling operation, outputs a response when its own device code is designated. In particular, copier 1 outputs a negative response with a prescribed code (or combination of codes) if there does not exist a transmitting request (i.e., no transmitting data), and a positive response with a prescribed code (or combination of codes) if there exists a transmitting request.

The communication control apparatus 18 shifts a polling turn to the next copier 1 and continues almost the same control as executed above, if receiving a negative response from a copier 1 is designated by the polling operation. When receiving a positive response, the polling operation is temporally stopped and is moved to a selecting operation. When the selecting operation is executed in response to reception of the positive response, the copier 1 having transmitted the positive response transmits a positive response if it is possible to respond to the selecting signal, or a negative response if it is impossible to respond thereto.

The communication control apparatus 18 outputs a communication enabling (or admission) signal with a predetermined specified code (or combination codes) to the copier 1 having transmitted the response and executes communication with the copier 1. Further, when the communication with the copier 1 according to a communication procedure is completed, the interrupted polling operation is restarted.

In the above-mentioned polling operation, there is a case when power supply of the copier 1 corresponding to the device code outputted by the communication control apparatus 18 is turned OFF or the copier 1 is not connected, thereby, neither a positive response nor a negative response can be obtained. Then, polling turn is shifted to the next copier 1 after a prescribed time has elapsed, and the similar control is continued.

Further, as self call generation from the communication control apparatus 18 to the service center 200, there exists items of immediately generating self call when a problem occurs as mentioned above, and generating self call at a designated time of the day when the problem occurs, items applicable to the above items are preset. Further, the communication control apparatus 18 temporary stops a polling operation and outputs a communication enabling signal with a predetermined specified code (or combination of codes), and starts communication with the copier when triggered by reception from the service center 200 via the public line network 17. The interrupted polling operation is restarted after the communication with the copier according to the communication procedure is completed.

Figure 9:
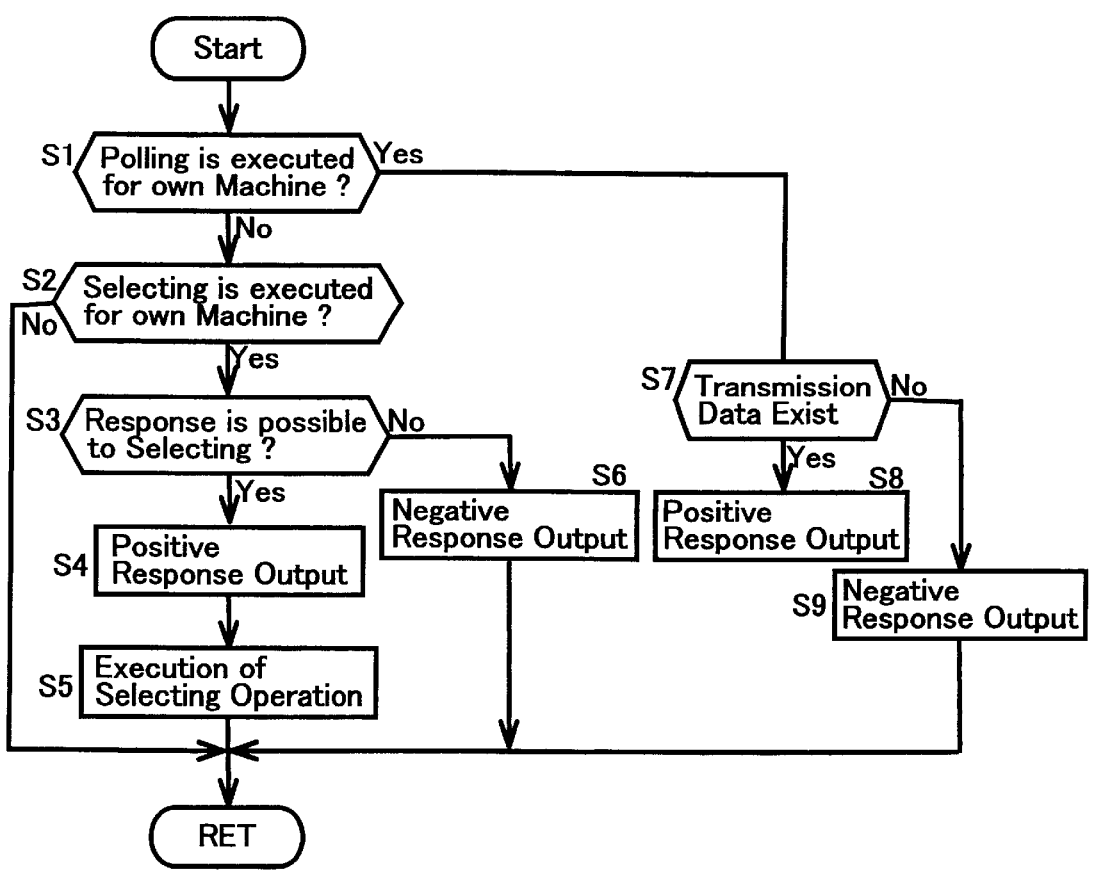
FIG. 9 is a flowchart of the polling and selecting operation executed in a copier, according to an embodiment of the present invention.

FIG. 9 is a flowchart of an operation relating to both polling and selecting in copier 1 in the system of FIG. 1. The operation is periodically executed after electrical power supply of the copier 1 is turned ON. Each copier 1 checks whether receiving polling or selecting from the communication control apparatus 18 in steps S1 and S2.

If it receives the polling, the process goes to step S7 by branching off, and whether transmission data (signal generation request) exist is checked. If the transmission data exists, the copier 1 outputs a positive response in step S8 and waits selecting from the communication control apparatus 18 while ending the operation. If no transmission data exists, the copier 1 outputs a negative response in step S9, and completes the operation.

On the other hand, if the copier 1 receives selecting from the communication control apparatus 18, it checks whether it is possible to respond to the selecting in step S3. The copier 1 outputs a positive response in step S4 if it is possible, executes a selecting operation (i.e., communication) in step S5, and finally completes the operation. If it is not possible to respond to the selecting by the reason that a copying operation is going on, for example, the copier outputs a negative response and completes the operation in step S6.

Figure 10:
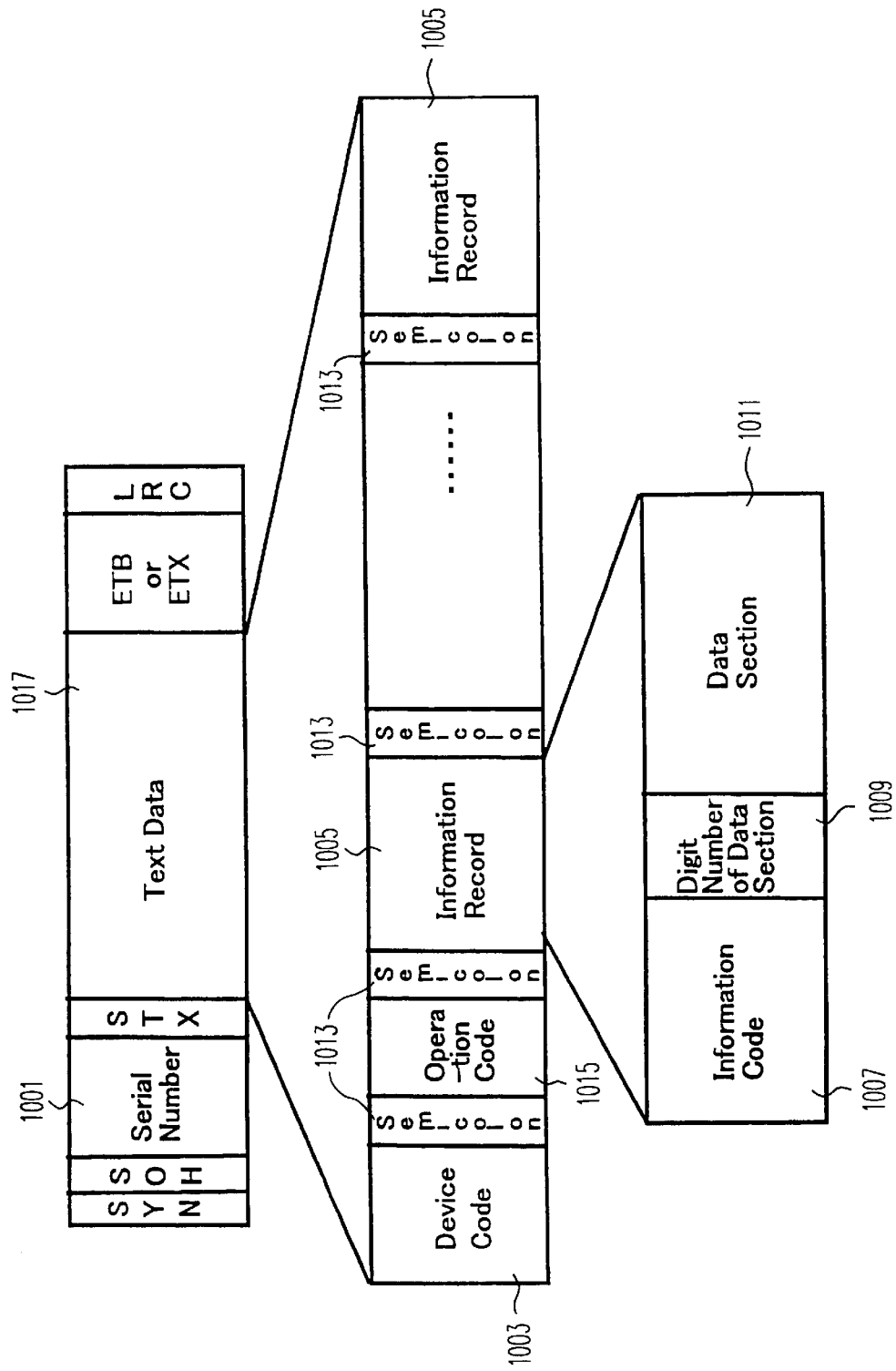
FIG. 10 is a diagram of the data structure of text data communicated between a copier and a communication control apparatus, according to an embodiment of the present invention.
Figure 11:
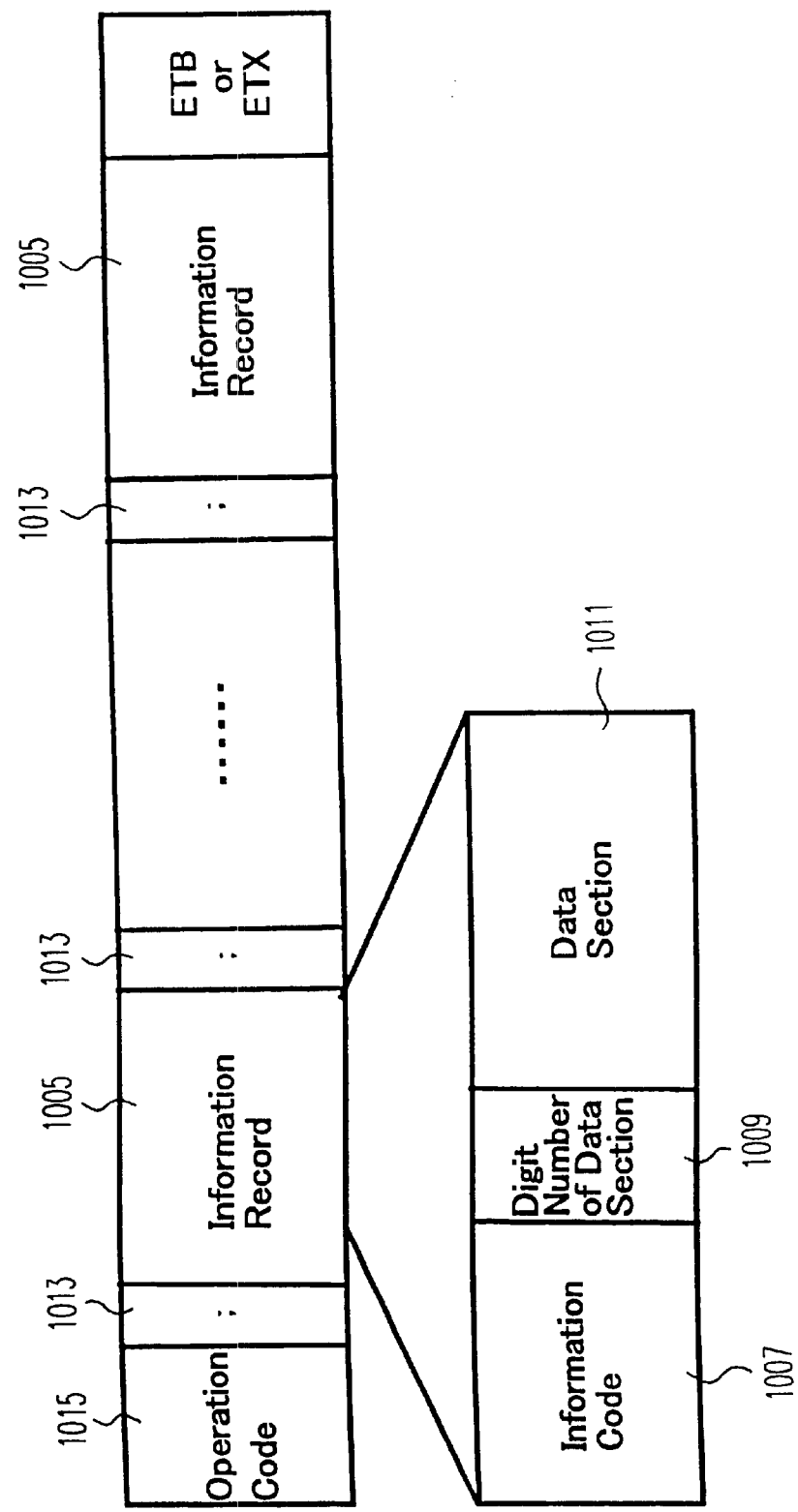
FIG. 11 is a diagram of the data structure of text data communicated between the interface unit and the CPU, according to an embodiment of the present invention.

FIG. 10 is a diagram of the data structure of the text data that is communicated between the copier 1 and the communication control apparatus 18, according to an embodiment of the present invention. In FIG. 10, a serial number 1001 indicates a communication block number used within one transmission (i.e., polling or selecting). The first block starts with "01", and it increases one by one thereafter, and it is assumed that "00" comes after "99".

A device code 1003 is used to be referred to and compared with a setting value set for respective copiers 1 by the address setting switch 110 (refer to FIG. 5), and used for judging whether polling or selecting is for its own copier 1. The operation codes are codes indicating kinds of the object of communication and are predetermined as illustrated in FIG. 37.

An information record 1005 comprises an information code 1007, a data section digit number 1009, and a data section 1011. The information code 1007 indicates a specific-report-information kind code (e.g., a total number of transfer sheet jams, a number of times of a respective SCs). The digit number of data section 1009 indicates data length of the data section, and represents an ASCII code. If no data exists, it is assumed as "00".

The data section 1011 indicates data representing detailed contents of the each information code 1007 (e.g., a counter value in case of a total number of transfer sheet jams, and a position and a name of parts in which self diagnosis abnormality (i.e., SC) occurs in case of a number of times of a SC). A separator 1013 with a semicolon (;) is inserted between the device code 1003 and the operation code 1015; and between the operation code 1015 and the information code. It is formed by deleting a header, a device code 1003, and a parity section from the text data 1017 communicated between the communication control apparatus 18 and the copier 1 illustrated in FIG. 10.

Figure 12:
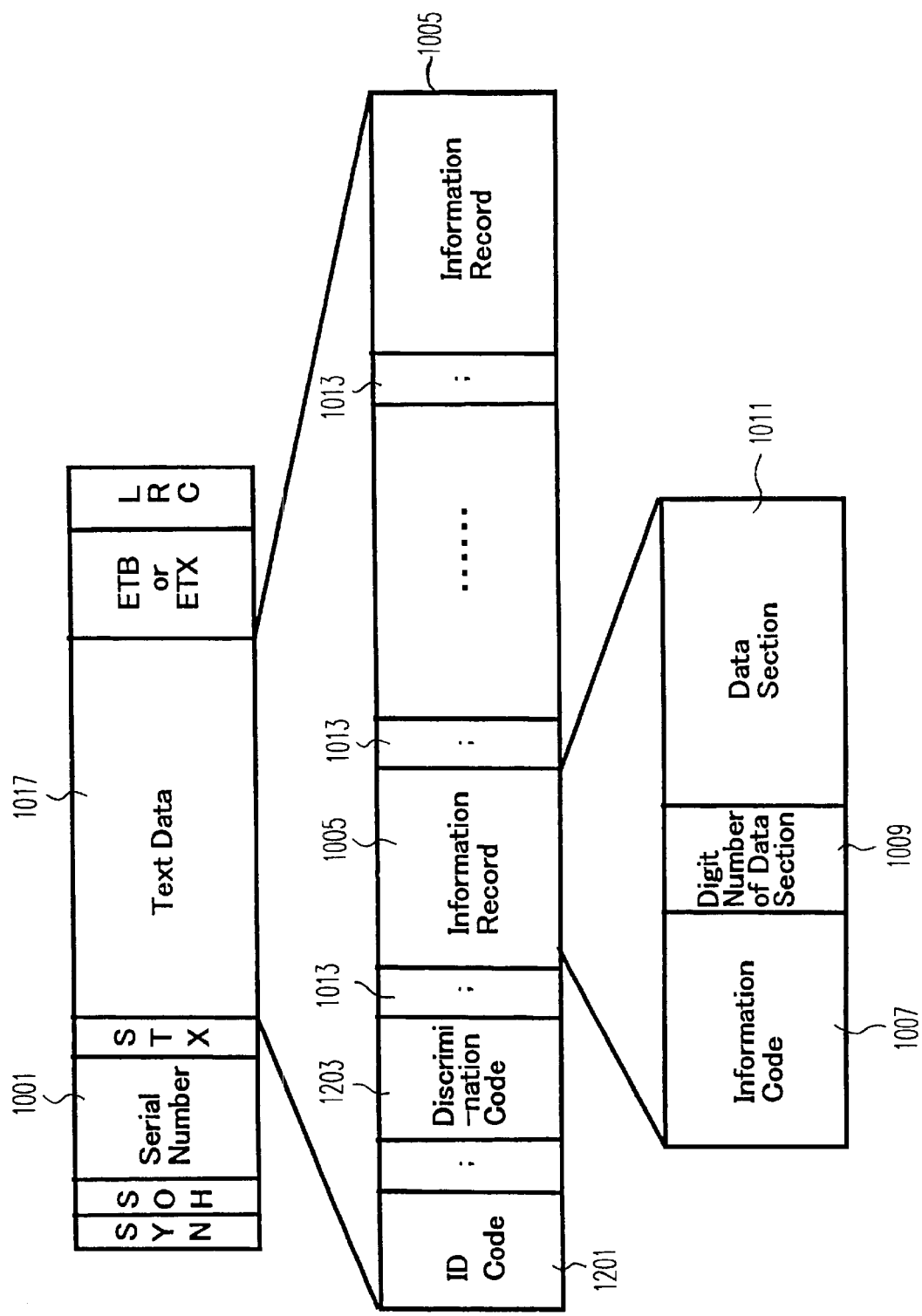
FIG. 12 is a diagram of the data structure of text data communicated between a service center and a communication control apparatus, according to an embodiment of the present invention.

FIG. 12 is a diagram of the data structure of the text data communicated between the service center 200 and the communication control apparatus 18, according to one embodiment of the present invention. The ID code 1201 illustrated in FIG. 12 has an object to specify a communication control apparatus 18 and one unit of a copier 1 among a plurality of copiers 1 connected to the communication control apparatus 18.

The ID code 1201 and the device code 1003 (FIG. 10) are stored in a parameter region of the RAM 186 of the communication control apparatus 18. The discrimination code 1203 is formed by adding a transmission source destination and a reception destination of text data 1017. Each of those is preferably added to and deleted from the text data 1017 according to a transmission direction of the text data 1017 by the communication control apparatus 18.

Figure 13:
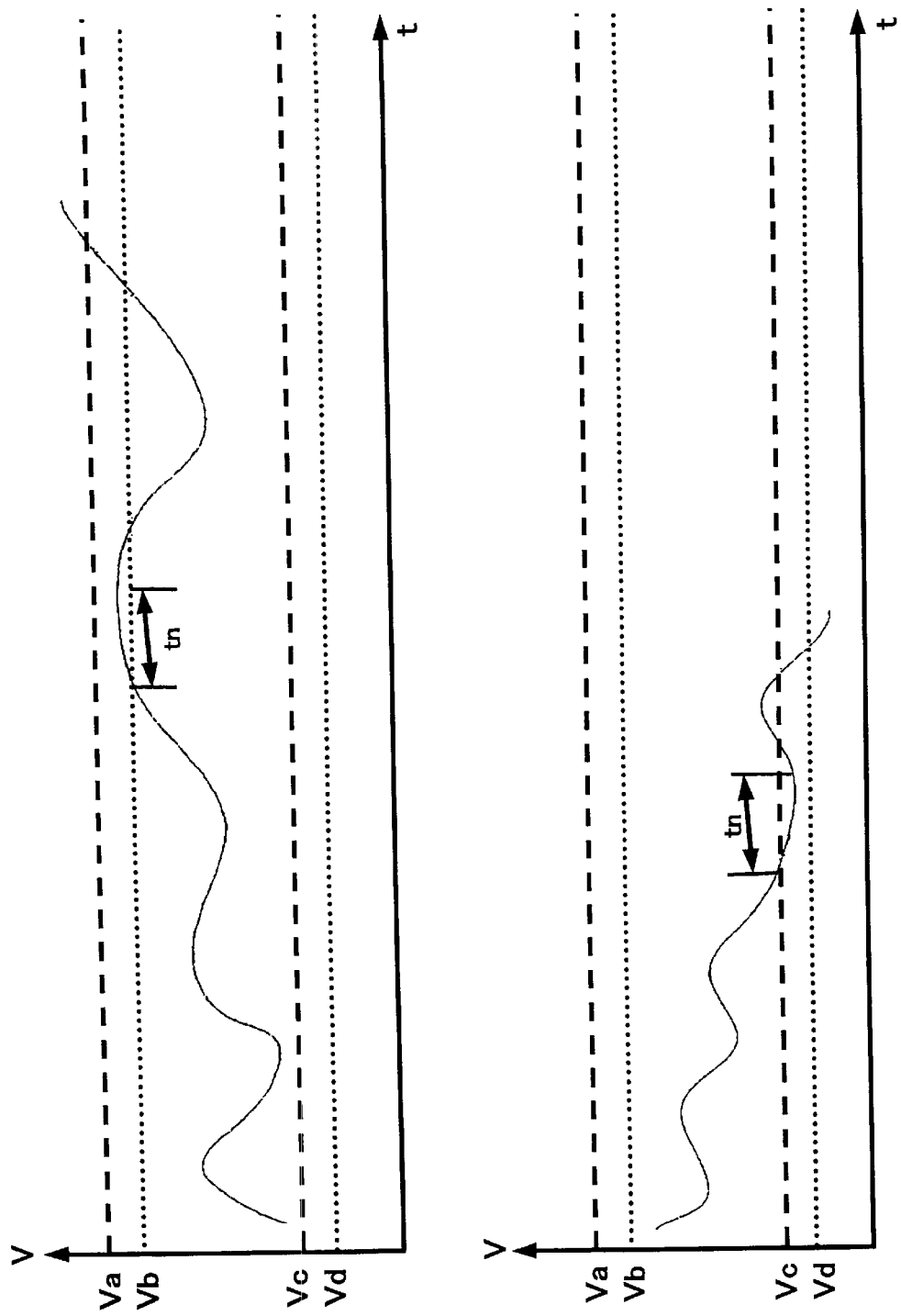
FIG. 13 is a line diagram illustrating the voltage of the output signal from a copier in the system of FIG. 1.

FIG. 13 shows the voltage graphs of the output signal of an image-forming apparatus, in accordance to an embodiment of the present invention. A CPU 100 of each copier 1 produces a variety of report information (e.g., function information, career information, and condition information [e.g., condition of consumable items, such as toner, oil, transfer sheets as copy sheets, an output value of a variety of sensors, a setting value for a variety of adjusting sections, connecting condition of a variety of units]), and a occurrence year/month/date at a time when an output signal value V of each sensor, such as potential sensor 51, an image density sensor 53, a temperature sensor 54, and a humidity sensor 55 exceeds a predetermined limiting value (i.e., Va, Vb, Vc, and Vd).

It is assumed that an output signal value (voltage value) V of each sensor, such as a potential sensor 51, an image density sensor 53, a temperature sensor 54, and a humidity sensor 55, is changing along with time elapsing of the time (t). (Va) represents an upper limit value of operation limit (self-diagnosis abnormality) of each copier 1, and (Vd) represents a lower limit value of the operation limit of each copier 1.

A CPU 100 of each copier 1 transmits self diagnosis abnormality report information with an operation code (e.g. SC call "30") of self diagnosis abnormality report (i.e., SC) being added thereto to a communication control apparatus 18 via a communication interface unit 109 when an output signal value V of the each sensor exceeds the operation limiting values Va and Vc, respectively during its work (copying operation).

When receiving the self diagnosis abnormality report information from any one of copiers 1, the communication control apparatus 18 calls the service center 200 generating a self call based on a contact destination telephone number (refer to FIG. 4) stored in a parameter region of the RAM 186, and transmits the already received self diagnosis abnormality report information to the service center 200 via the public line network 17. (Vb) represents an upper limit value for operation precaution precaution) of a copier 1, and Vc represents a lower limit value for operation precaution (precaution) of the copier 1, respectively.

A CPU 100 of each copier 1 transmits function information, career information, and condition information (e.g., condition of consumable items, such as toner, oil, transfer sheets as copy sheets, an output value of the variety of sensors, a setting value for the variety of adjusting sections, connecting condition of the variety of units) and precaution report information constituted by an operation code (i.e., alarm call "32") of precaution report and an occurrence year/month/date to a communication control apparatus 18 via the communication interface unit 109 when the output value (i.e., V) exceeds the precaution values Vb and Vc, respectively, and time (i.e., tn) has passed.

When receiving the precaution report information, the communication control apparatus 18 temporary stores the same in the RAM 186, and calls the service center 200 by generating a self call based on a contact destination telephone number stored in a parameter region, and transmits the stored precaution report information to the service center 200 via the public line network 17 at a time of a reporting day and time (refer to FIG. 4) stored in another parameter region of the RAM 186.

Figure 14:
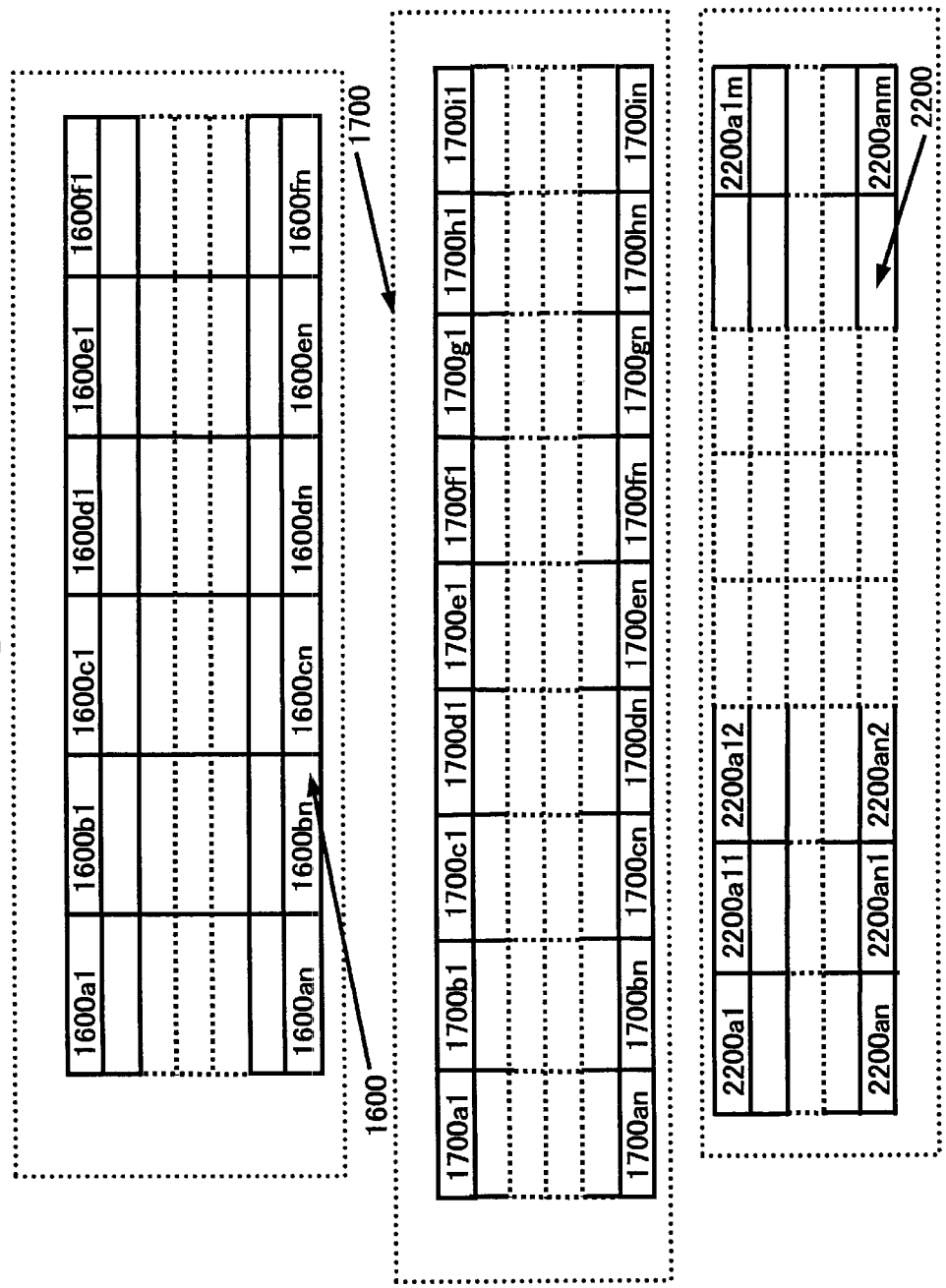
FIG. 14 is a diagram of a supervising table stored in the external memory apparatus in the system of FIG. 1.
Figure 15:
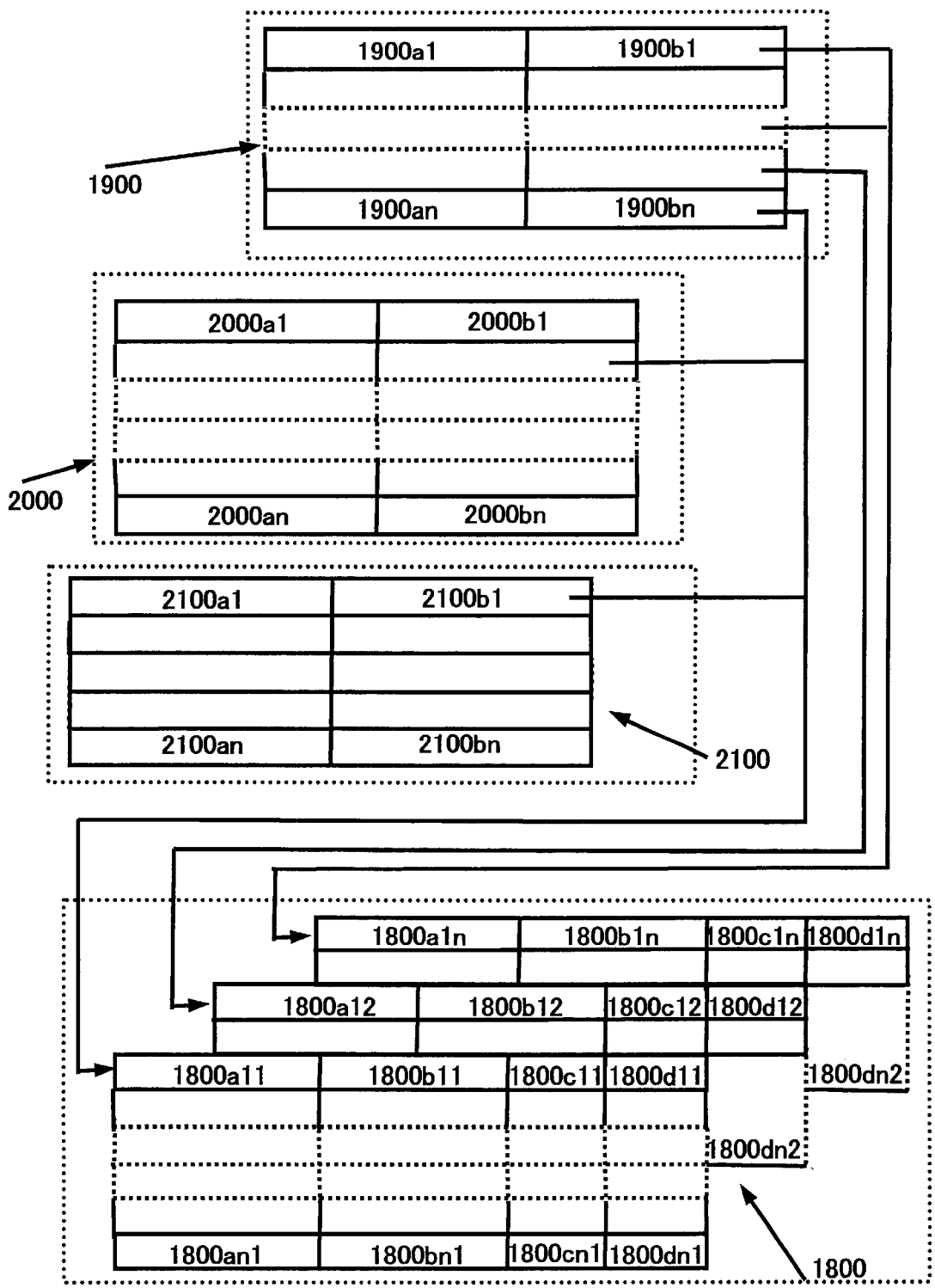
FIG. 15 is a diagram of another supervising table stored in the external memory apparatus in the system of FIG. 1.

Next, a supervising table used in the supervising system is described referring to FIGS. 14 and 15. FIGS. 14 and 15 are diagrams for exemplary embodiments of the supervising tables as utilized in the supervising system. Each entry of each customer copier (image-forming apparatus) table 1600 is particular to a customer, and thus, is prepared for each specific customer. An entry indicates all items on each line.

The model machine number item 1600a (i.e., 1600a1 through 1600an) stores the model number of the machine, e.g., copier, at the customer destination (refer to FIG. 4) and associated serial number. A customer name item 1600b (i.e., 1600b1 through 1600bn) stores the customer name. A terminal type item 1600c (i.e., 1600c1 through 1600cn) stores information specifying the type of terminal (e.g., personal computer 211 or fax 212) of a service station 210 executing maintenance (or a repair) of the copier 1. A telephone number item 1600d (i.e., 1600d1 through 1600dn) stores the telephone number for dialing to the terminal of the service station 210 that is responsible for performing maintenance on the copier 1. A telephone number item 1600e (i.e., 1600e1 through 1600en) stores a telephone number for calling a communication control apparatus installed in a customer destination. A ssID (i.e., service station ID) item 1600f (i.e, 1600f1 through 1600fn) stores a ssID code discriminating (or specifying) a service station 210 executing maintenance of a copier having a model machine number stored in a model machine number item 1600a.

The customer copier table 1600 is set using command inputted (externally) by a center operator by operating an inputting apparatus or the like, such as a keyboard, of clients 201a, 201b, and 201n, (FIG. 2) and is permanently stationed on an external memory apparatus 203 of the file server 204 in the service center 200.

The customer copier table 1600 is referred to when report information is received by the service center 200, when reception confirmation of the report information is informed, and when a remote terminal is informed. Each client 201a, 201b, and 201n of the service center 200 can fix a customer destination and a copier 1 by retrieving the customer copier table 1600 based on a model number (refer to FIG. 4) and a serial number as an ID code in the reception report information.

A report storing table 1700 is a table for storing supervising information of report information stored in the report storing file. A model machine number item 1700a (i.e., 1700a1 through 1700an) stores the model number (refer to FIG. 4) and the serial number of the copier 1 that has transmitted report information. A report information pointer item 1700b (i.e., 1700b1 through 1700bn) for storing an address (hereinafter referred to as a pointer) of the report information storing table of report information that have been transmitted. A start time item 1700c (i.e., 1700c1 through 1700cn) stores time and day when report information is stored in a report storing file. An elapsing time item 1700d (i.e., 1700d1 through 1700dn) for storing an elapsing time period (i.e., not-yet-dealt-elapsing time period) after storing report information in a report storing file. A pointer item 1700e (i.e., 1700e1 through 1700en) for storing a physical pointer of a report storing file storing actual report contents of stored report information. A client number item 1700f (i.e., 1700f1 through 1700fn) stores a client number displaying contents of report information stored. An information designation item 1700g (i.e., 1700g1 through 1700gn) for storing designation of informing way for informing stored report information. A code item 1700h (i.e., 1700h1 through 1700hn) stores information code of information record following a discrimination code of report information and storing a code of specific report information. A dealing item 1700i (i.e., 1700i1 through 1700in) stores information indicating that measure taking is presently going on for report information. Each entry of the report-storing table 1700 is formed per each reception of the report information, and an applicable entry is deleted when a service person starts repair of a copier 1 located remotely. The report-storing table 1700 is permanently stationed in the external memory apparatus 203 of the file server 204 in the service center 200.

A report information table 1800 defines an informing method for informing a code of the report information, and a designation value. It is a supervising table representing an informing method for report information. A code item 1800a (i.e., 1800a11 through 1800ann) stores a code of specific report information. A designation item 1800b (i.e., 1800b11 through 1800bnn) stores the designation of an informing method for informing a code that is stored in a code item 1800a. A designation value first item 1800c (i.e., 1800c11 through 1800cnn) stores a designation value (i.e., a prescribed time) relating to the first informing method to be set beforehand. A designation value second item 1800d (i.e., 1800d11 through 1800dnn) stores a designation value (a prescribed time) relating to the second informing method to be set beforehand. The designation item 1800b can designate whether the informing method is the first informing method, the second informing method, or the both. It should be noted that an informing method can be selected based on the respective customers and models by defining such that the first report information table 1800 is allocated to a customer X company, and the n-th report information table 1800n is allocate to a Y model. Such a report informing table 1800 is set by using a command input by a center operator operating through an inputting apparatus of clients 201a, 201b, and 201n, and is permanently stationed in the external memory apparatus 203 of the file server 204.

A customer information table 1900 is a supervising table defining an informing method for informing report information according to a customer. A model machine number item 1900*a* (i.e., 1900*a*1 through 1900*an*) stores a model machine number of a copier 1 installed in a customer destination. A pointer item 1900*b* (i.e., 1900*b*1 through 1900*bn*) stores a pointer of a report information table 1800 indicating an informing method for informing report information transmitted from a copier 1 of the model machine number stored in the model machine number item 1900*a*.

A model information table 2000 is a table for defining an informing method of report information of a model. A model machine number item 2000*a* (i.e., 2000*a*1 through 2000*an*) stores a model machine number of a copier 1 installed in a customer destination. A pointer item 2000*b* (i.e., 2000*b*1 through 2000*bn*) stores a pointer of a report information table 1800 indicating an informing method for informing report information transmitted from a copier 1 of the model machine number stored in the model machine number item 2000*a*.

The service station information table 2100 is a supervising table for defining an informing method for informing report information of the service station. A ssID code item 2100*a* (i.e., 2100*a*1 through 2100*an*) stores a ssID code for discriminating (or identifying) a service station. A pointer item 2100*b* (i.e., 2100*b*1 through 2100*bn*) storesa pointer of a report information table 1800 indicating an informing method for informing report information transmitted from a copier 1 for which a service center 210 having a ssID code stored in the ssID code item 2100*a* executes maintenance and repair. A service station master table 2200 is a supervising table for defining a maintenance executing section of a copier 1 of a customer. A ssID code item 2200*a* (i.e., 2200*a*1 through 2200*an*) stores a ssID code for discriminating (or identifying) a service station. A model machine number item 2210*am* (2210*a*11 through 2210*anm*) stores a model machine number of a copier 1 for which a service center 210 having a ssID code stored in the ssID code item 2200*a* executes maintenance. The service station master table 2200 is referred to when designation of either the first information or the second information is executed according to a service station 210. Further, the above-mentioned each supervising table is set by using command inputted by a center operator operating an inputting apparatus of clients 201*a*, 201*b*, and 201*n*, and is permanently stationed on an external memory apparatus 203 of the file server 204.

Next, the relationship among the above-mentioned supervising tables is specifically described. After completing a reception operation of report information of the format illustrated in FIG. 12 (i.e., text data), each of the clients 201*a*, 201*b*, and 201*n*retrieves a customer copier table 1600 in the external memory apparatus 203 of the file server 204 based on a model number and a serial number (refer to FIG. 4) put in the text data as an ID code.

Subsequently, each suitability of a customer destination and a copier 1 in a retrieved model machine number item 1600*a* of the copier table 1600 is checked (by a system). If it is reasonable, the above mentioned model number and serial number are stored in the model machine number item 1700*a* of an applicable entry of the report storing table 1700. After that, check of the discriminating code of the received report information is executed, and the report information is stored in a report-storing file corresponding to the discriminating code.

Further, when the operation storing the report information is normally completed, a physical pointer of the report storing file having stored contents of the report information is stored in a pointer item 1700*e* of the report information storing table 1700. The time and date when the report information is stored in the report storing file is also stored in the start time item 1700*c*. Further, the information code, which is included in the information record and stores the code of the specific report information, and follows the discriminating code of the report information, is stored in the classification code item 1700*h*.

Next, a retrieving operation for retrieving from the customer copier table 1600 is executed using the model number and the serial number stored in the model machine item 1700*a* as a query key, and whether a ssID code for identifying a service station 210 is stored in the ssID code item 1600*f* having a pointer of the table entry according (with the key) is checked. If the ssID code is stored, a retrieving operation for retrieving from service station information table 2200 is executed using the ssID code as a query key.

Further, a pointer of an entry of the report information table 1800 is obtained from the pointer item 2100*b* having the pointer of the table entry according (with a key), and is stored in the report information pointer 1700*b* of an applicable entry of the report storing table 1700. If the ssID code for identifying a service station 210 is not stored, a retrieving operation for retrieving from the each customer information table 1900 is executed using the model number and the serial number stored in the model machine number item 1700*a* as a query key.

Thus, a pointer of an entry of the report information table 1800 stored in the pointer item 1900*b* of a table entry according with the key is stored in a report information pointer 1700*b* of an applicable entry of the report storing table 1700. Further, if table entry according with the key does not exist, a retrieving operation from the each model information table 2000 is executed, and an operation similar to the above is executed after that.

If an table entry according with the key is not found by the above mentioned retrieving operation for retrieving the customer information table 1900 and the model information table 2000 in this order, a zero "0" is stored in the report information pointer item 1700*b* of an applicable entry in the report storing table 1700.

Further, information indicating that a dealing operation for report information is going on (e.g., remote dealing flag) is set (or stored) in a dealing operation item 1700*i* of an applicable entry of the report storing table 1700, and contents of the report information is displayed on the display area, and thereby, the center operator is informed. After which, when any dealing operation is executed by the center operator (by operating the keyboard), a flag representing that a dealing operation is being performed is set. Counting an elapsing time period is not executed when such an item is set.

Figure 16:
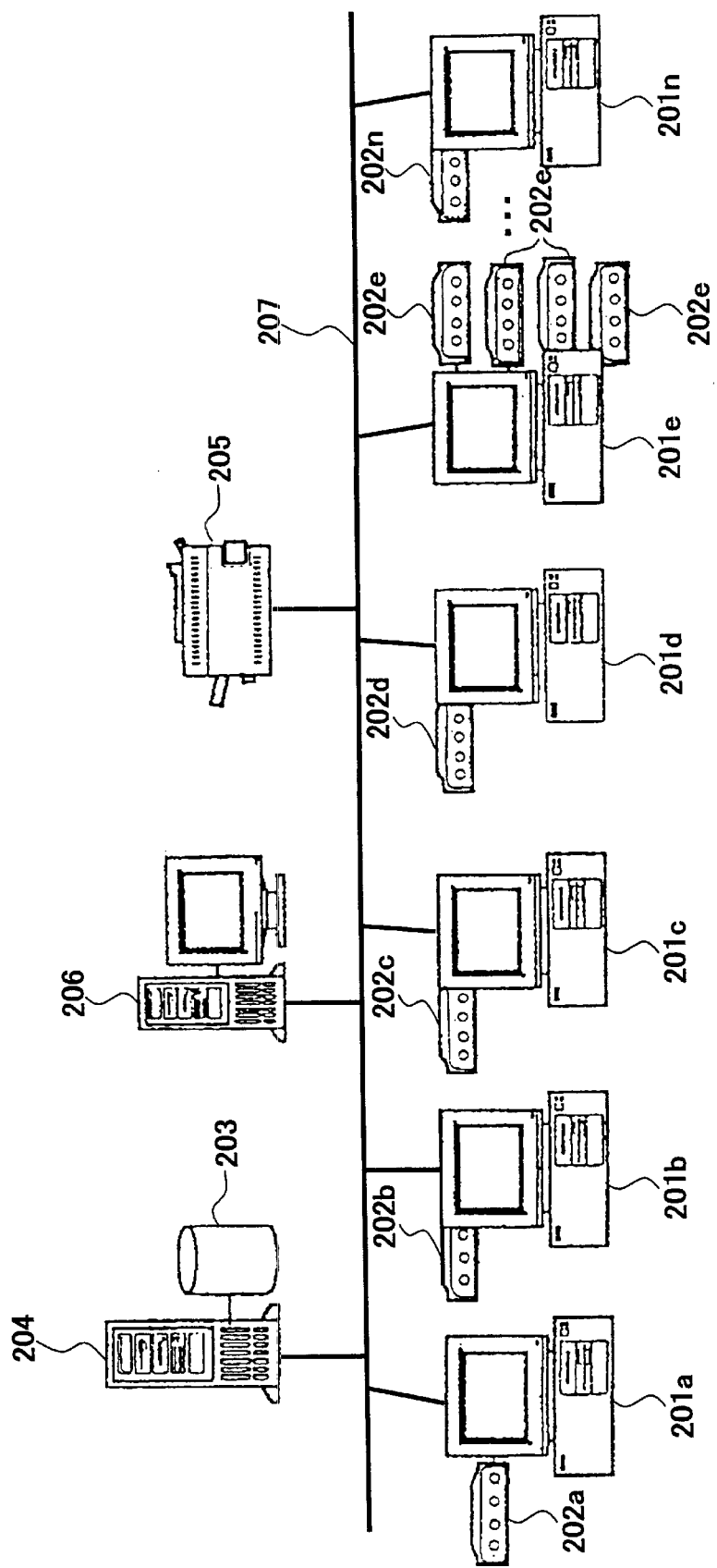
FIG. 16 is a diagram of a network within the service center, according to an embodiment of the present invention.

Next, a principle section of the service center 200 side in the embodiment is described. FIG. 16 is a diagram specifically illustrating an exemplary constitution of the service center 200.

Each MODEM 202*a*, 202*b*, 202*c*, 202*d*, 202*e*, and 202*n* is connected to each client 201*a*, 201*b*, 201*c*, 201*d*, 201*e*, and 201*n* installed in the service center 200, and the each MODEM is connected to the communication control apparatus 18 of a customer destination via a public line network 17. Each MODEM 202*a*, 202*b*, 202*c*, 202*d*, 202*e*, and, 202*n* is connected to each client 201*a*, 201*b*, 201*c*, 201*d*, 201*e*, and 201*n*. In this case, one unit or a plurality of units of a MODEM is connected to one unit of a client. When only one unit of a MODEM is connected to one unit of client, the MODEM is directly connected to a serial port (COM 1) of the client. When a plurality of units of a MODEM are connected to one unit of a client, the MODEM is connected via a RIC board inserted into a MCA slot of the client. The RIC board runs a small OS (operating system), and downloads a protocol driver 301 (refer to FIG. 18) into its memory. The protocol driver 301 can execute multiple tasks and can operate asynchronously. In general, to lower the load of a CPU of a client in the case in which a plurality of ports are used, the RIC board is loaded with a communication protocol.

Figure 17:
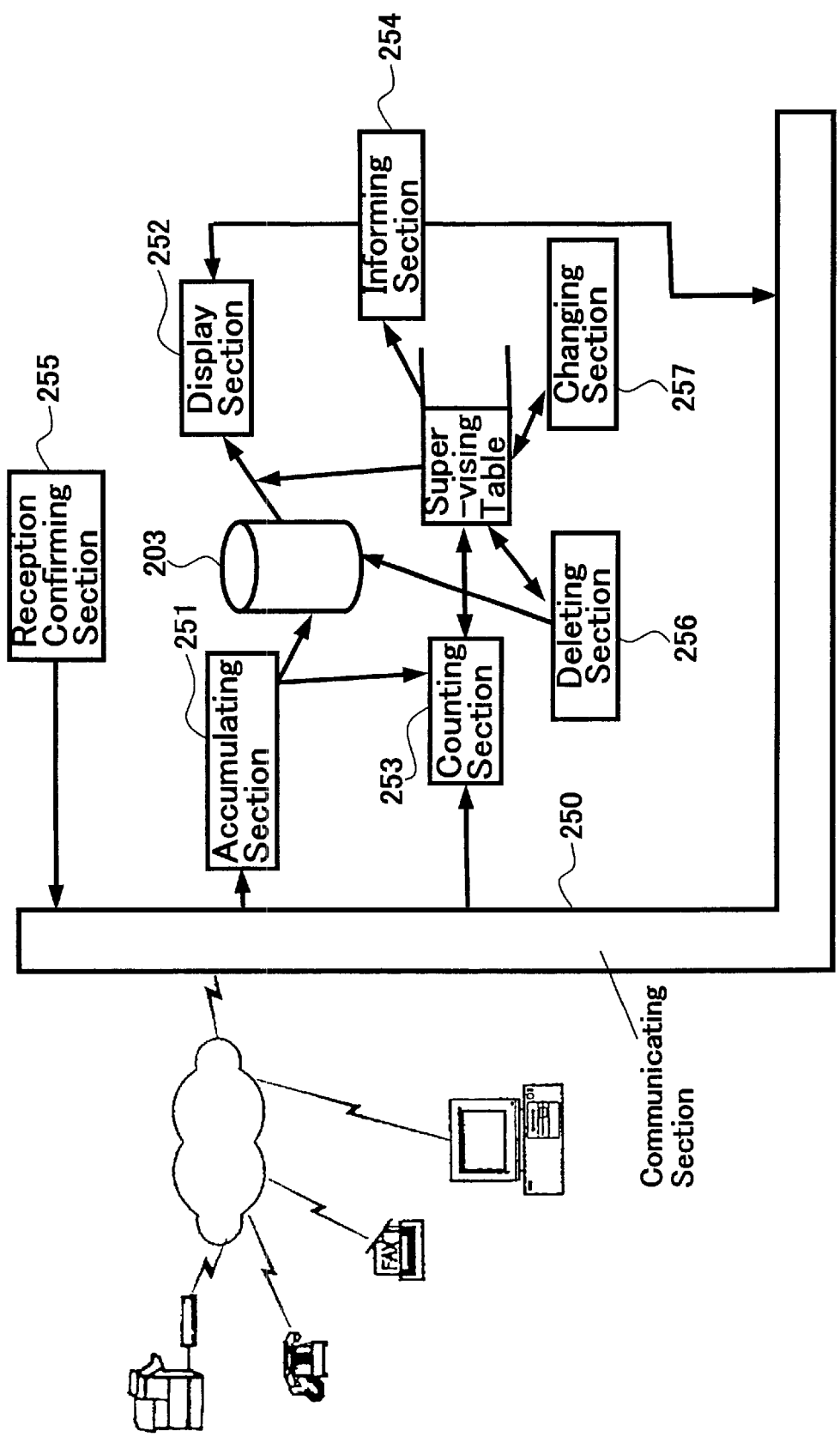
FIG. 17 is a functional block diagram illustrating the principle section of the service center, according to an embodiment of the present invention.

FIG. 17 is a functional block diagram illustrating a specific example of the principle section of the service center 200. Functionally, the service center 200 includes a communication section 250, a storing section 251, a display section 252, a counting section 253, an informing section 254, a reception confirming section 255, and a changing section 257. These functional capabilities interoperate with those functions described above with respect to the image-forming apparatuses.

Figure 18:
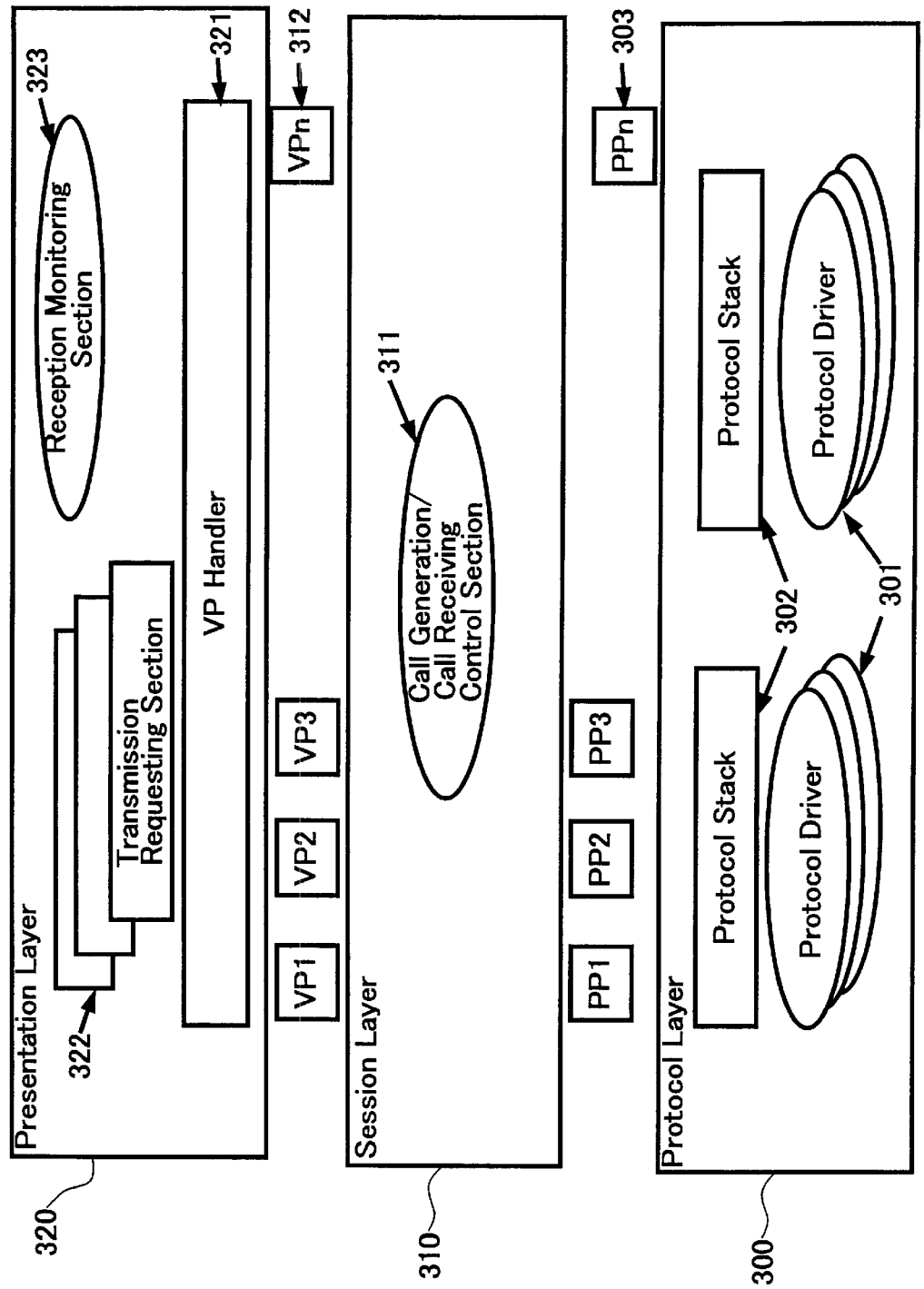
FIG. 18 is a diagram of the communication section in the system of FIG. 17.

FIG. 18 shows the communication section 250 in the system of FIG. 17. The communication section 250 executes data communication between the communication control apparatus 18 in each client 201a through 201, using a three-layer architecture. A protocol layer 300 is included therein and is one for realizing a communication protocol between the communication control apparatus 18, and positions at an upper lank of a serial driver. The protocol layer 300 is implemented for each communication hardware, and absorbs a difference in communication hardware when viewing from a session layer 310.

A protocol driver 301 and a protocol stack 302 constitute the protocol layer 300. The protocol driver 301 is loaded as much as a number of ports (MODEMs). In case of using the RIC board, the protocol driver 301 is downloaded in the internal memory of the RIC board, and executes following controls when receiving a call generation request. Namely, it starts a series of protocol sequence with the communication control apparatus 18 in relation to the MODEMs (202a through 202n). Also, it continually monitors the MODEM, and promptly receives data from the communication control apparatus 18 according to the protocol sequence when data transmission exists from the communication control apparatus 18. When the reception is completed, the protocol layer 300 informs the session layer of completion of the reception via the protocol stack 302. The protocol stack 302 positions between the protocol driver 301 and a call generation and call reception control section 311, and executes transferring of transmission data, reception data, and control data.

The session layer 310 supervises a plurality of PPs (physical ports) realized by the protocol layer 300, retrieves the PPs 303 in response to a communication request (a call generation operation, a call reception operation), and starts communication. Also, it monitors completion of reception from the communication control apparatus 18, and transfers data by informing the presentation layer 320 of the effect when the completion of the reception.

The presentation layer 320 has access to a VP (virtual port) 312 linked in the session layer 310 without directly referring to the PP303. The last presentation layer 320 positions at an upper lank of the session layer 310. Specifically, the presentation layer 320 has a VP handler 321 for handling the VP 312, a transmission request section 322 for executing a dealing operation of a transmission request from a client body, and a reception monitoring section 323 for conveying reception data to the upper lank function by polling the VP 312. Effectively, the presentation layer 320 realizes data communication with the communication control apparatus 18. The reception request 322 executes transmission communication to the VP 312. From the upper lank function, it is not required to be aware of the actually implemented protocol driver 301, or of the physical port by leaving the supervision of the PP 303 that is available to use to the session layer 310. In the reception operation, the VP 312 is polled without the need to know the physical reception port.

Figure 19:
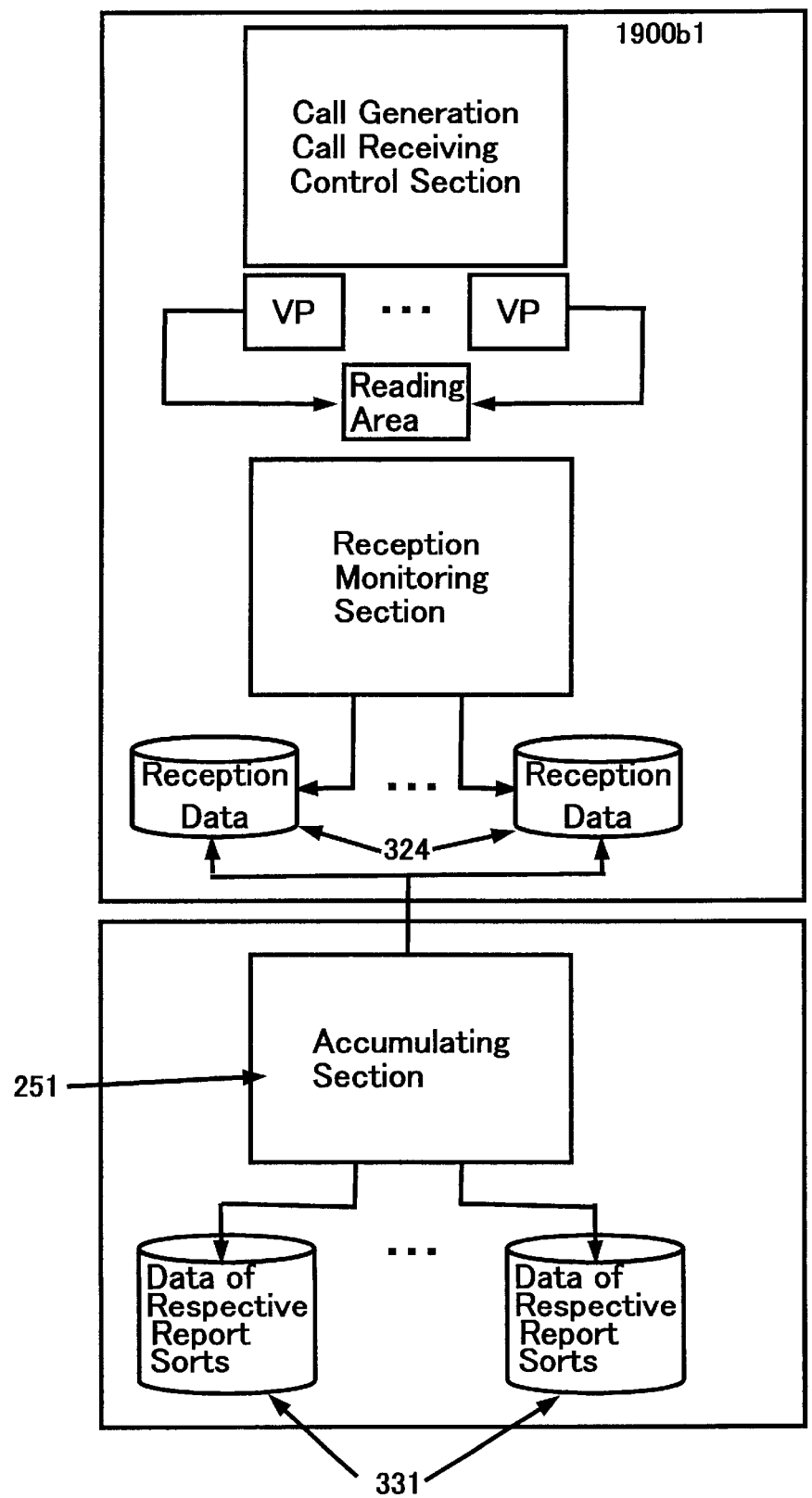
FIG. 19 is a block diagram illustrating the flow of reception data in the communication section and the storing section in the system of FIG. 17.
Figure 20:
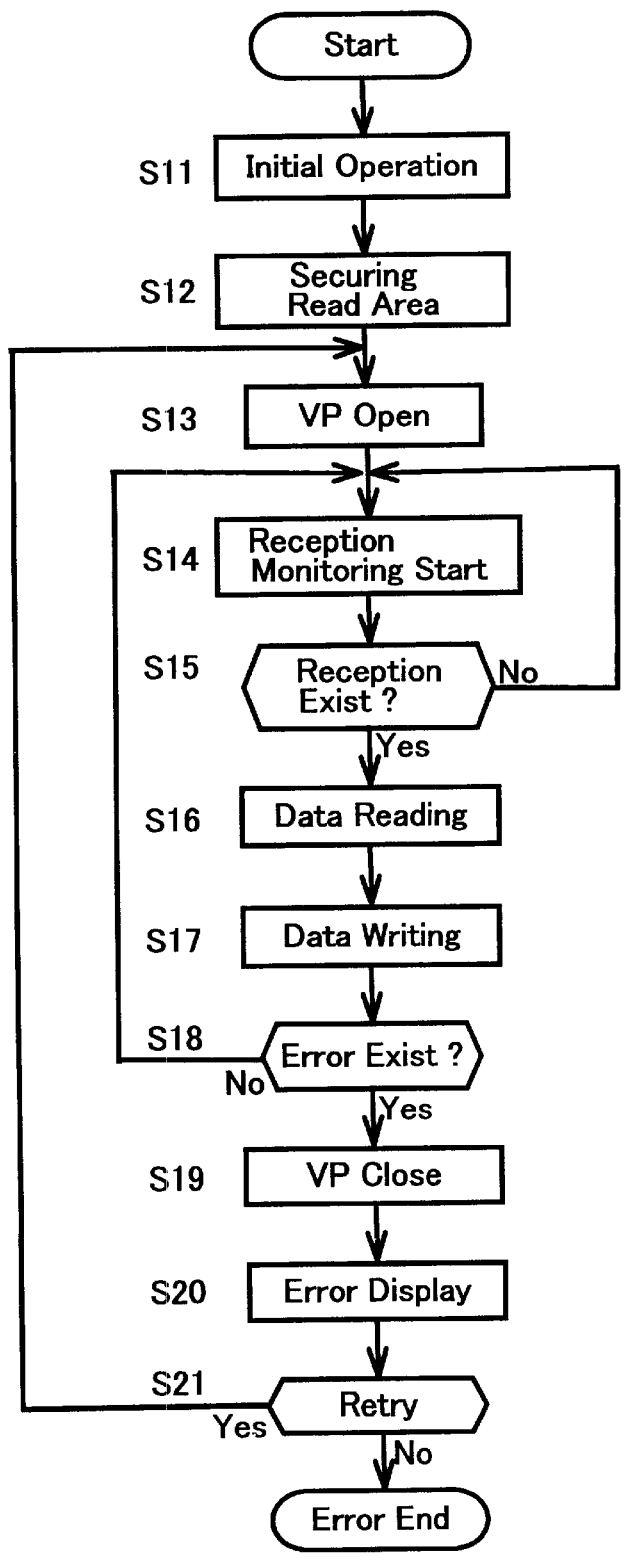
FIG. 20 is a flowchart illustrating other data receiving operation executed in the reception section in the system of FIG. 17.
Figure 21:
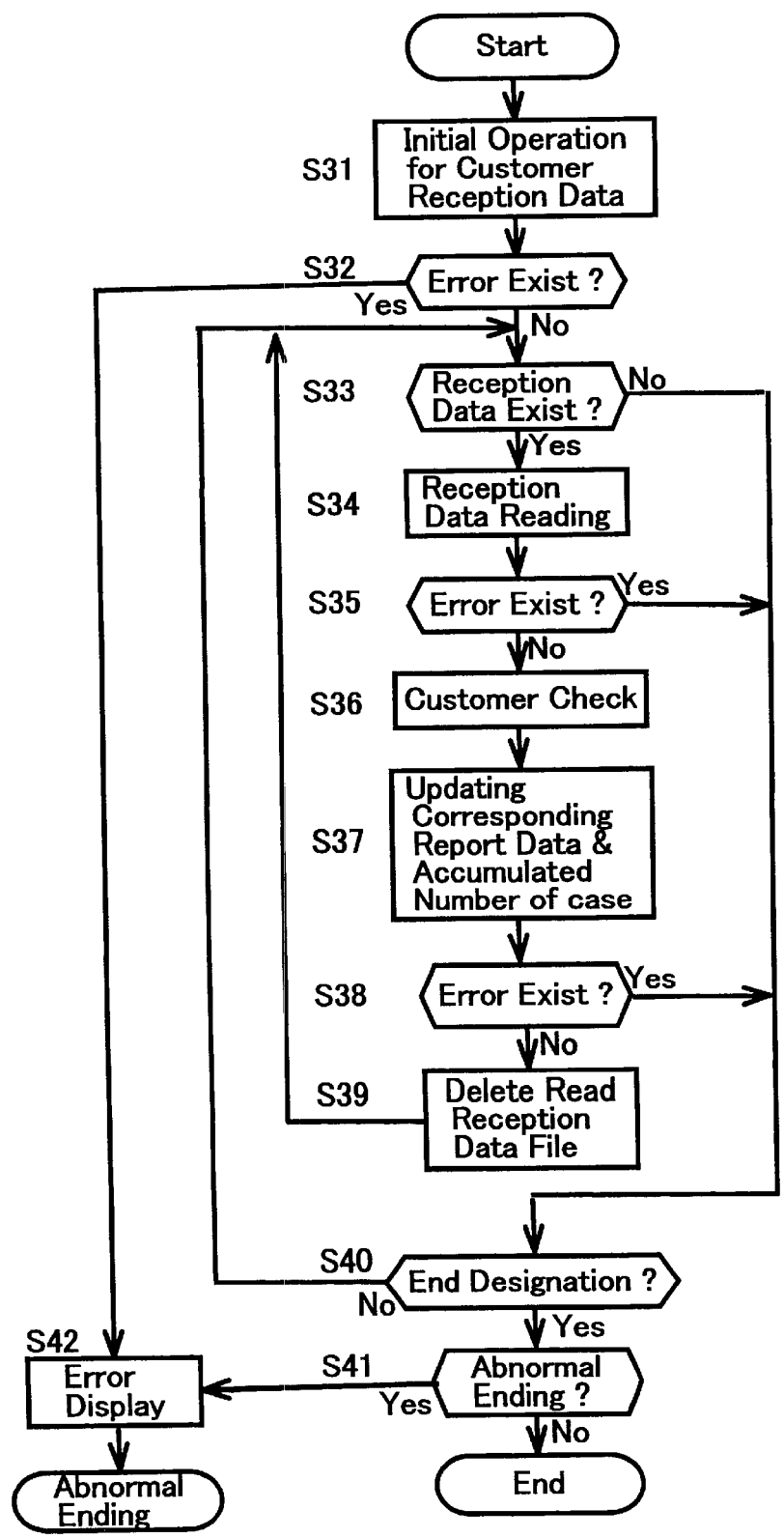
FIG. 21 is a flowchart illustrating the data storing operation executed in the storing section in the system of FIG. 17.

FIG. 19 shows the flow of the reception data in the communication section 250 and the storing section 251, according to an embodiment of the present invention. FIG. 20 is a flowchart of the data receiving operation executed in the reception section 250, according to an embodiment of the present invention. FIG. 21 is a flowchart of a data storing operation executed in the storing section 251, according to an embodiment of the present invention. FIGS. 19–21 are collectively discussed below for the purposes of clarity.

The reception monitoring section 323 within the presentation layer 320 of the communication section 250 firstly executes an initial operation, and secondly, secures a reading region for reading data from the communication control apparatus 18 (or the personal computer 211) connected to the copier 1. The reception monitoring section 323 then executes opening of the call reception VP312, and starts monitoring data from the communication control apparatus 18 (or the personal computer 211) (i.e., steps S11 through S14).

Further, monitoring of the reception condition is continued whether reception data from the communication control apparatus 18 (or the personal computer 211) is normally completed, or an abnormality event occurs. If the call reception VP312 is a reception completing state, and reception data exists in a buffer of the call reception VP 312, the reception data is read from the buffer of the call reception VP312 and is written into the reading region secured in the step S12 (i.e., steps S15 through S16).

Next, the written reception data into the reading region is written into the reception data file 324, and the reception condition is continuously monitored for dealing (operating) the next reception data when the writing operation is normally completed (in steps S17, S18, S14 and S15). If writing operation is not normally completed (i.e., an error occurs), the reception call VP312 is closed, an error displaying operation is displayed on the displaying apparatus of each client (i.e., 201a, 201b, and 201n). Further, if there exists a retry designation, and the opening of the call reception VP312 is executed again, and the monitoring of the reception condition is continued (in steps S19 through S21, and in steps S13 through S15).

The storing section 251 operates asynchronously with the reception monitoring section 323, and executes an initial operation (i.e., an initial operation of a customer destination reception data) for internal data, such as a securing operation for securing a common memory.

Further, if the initializing operation is not normally completed (e.g. an error occurs), an error display is executed on the displaying apparatus of the clients and the operation is completed (in steps S31, S32 and S42). However, if the initial operation is normally completed, a checking operation checking whether there exists a reception data file 324 produced in the reception monitoring section 323 (reception data is stored) is executed. If there exists the same, reading of the reception data in the reception data file 324 is executed, and an error is displayed if an error occurs during the reading operation (i.e., in case of an abnormal completion of the reading operation) and the operation is completed (in steps S33 through S35, in steps S40 through S42).

If the reading operation for reading the reception data is normally completed, suitability of a copier (i.e., an image-forming apparatus) and a customer destination is checked referring to a model number and a serial number added to as an ID code of the read data. Next, a kind checking operation for checking whether a discrimination code indicates remote report through the remote report key, the same of self diagnosis abnormality, and the same of precaution (in steps S35 and S36).

If the discrimination code indicates the remote report through the remote report key, the same of self diagnosis abnormality, or the same of precaution, an updating operation for updating a report storing file 331 and the report storing table 1700 as a corresponding report data, and a counting operation (i.e., updating operation) for counting a stored number of cases of the reception data (report information) are executed. (However, if the discrimination code indicates an operation start time and that of operation completing time, the below-described operation is executed).

If an error occurs during this updating operation (if the updating operation result in abnormality ending), an error is displayed on the display of the clients (in steps S37, S38, S40 through S42). If the updating operation normally completes, deletion of the file 324 of the read reception data is executed, and after that it is checked whether there exists a reception data file 324 produced in the reception monitoring section 323 again. If there does not exist the reception data file 324, it is checked if a terminating instruction is designated by operating a keyboard of the like on the inputting apparatus of the client. If the terminating instruction is designated, it is checked whether the termination is either normal or abnormal (in steps S38, S39, S33, S40 and S41).

Further, if it is the normal termination, the operation is completed. If it is the abnormal termination, an error is displayed on the displaying apparatus of the client and the operation ends (in steps S41 and S42). If the terminating instruction is not designated, the process returns to a checking operation whether there exists a reception data file 324 produced in the reception monitoring section 323 again, and the similar judgement and operation are continued (in step S40 and S33).

Figure 22:
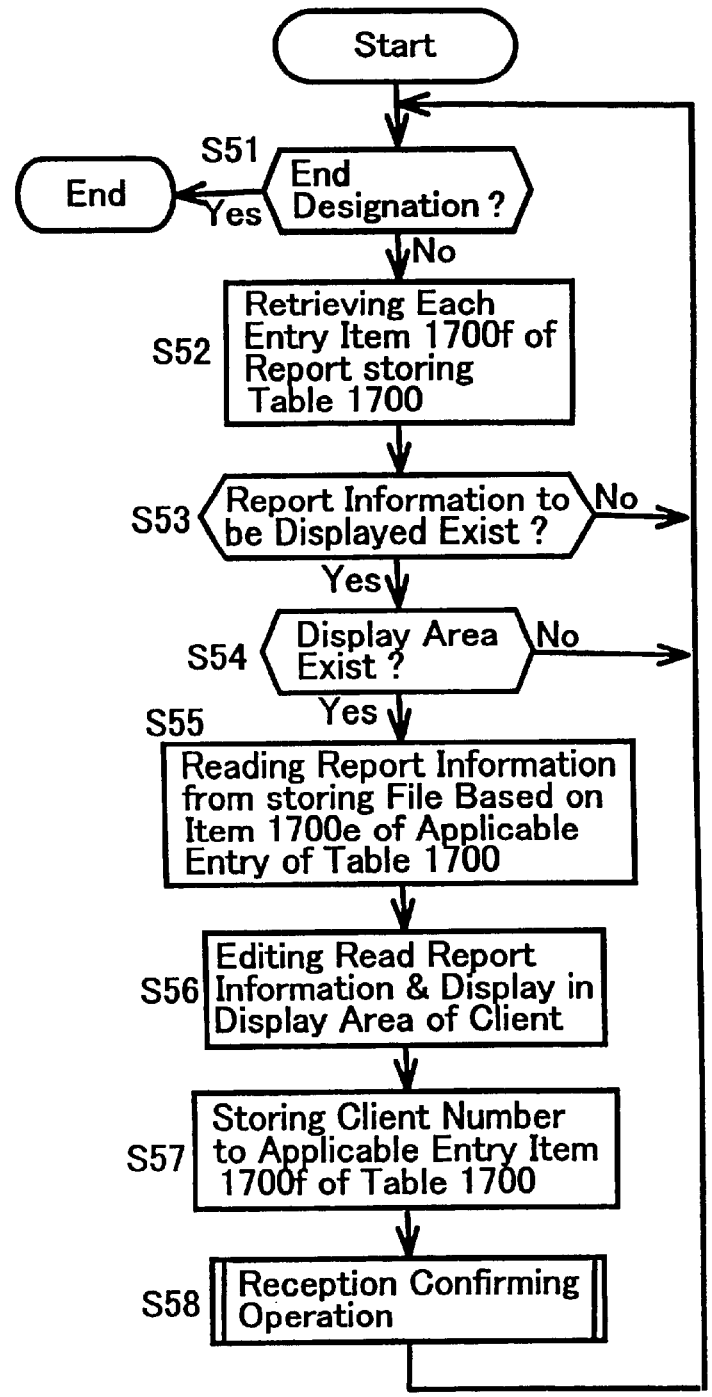
FIG. 22 is a flowchart of the data displaying operation executed by the displaying section and the informing section sectionin the system of FIG. 17.

FIG. 22 shows the data displaying operation executed by the displaying section 252 and the informing section 254, according to an embodiment of the present invention. The displaying section 252 operates asynchronously with the above-mentioned storing section 251. Further, the displaying section 252 starts retrieving the client number item 1700f of each entry in the report storing table 1700 for the purpose of checking whether the report information stored in the report storing file 331 is displayed on the displaying apparatus (in steps S51 and S52). If contents of the report information stored in the report storing file 331 are being displayed on the displaying apparatus of the client, it is stored in the client number item 1700f of an entry corresponding to the client number. Next, a checking operation to determine whether there are report information to be displayed is executed. Additionally, the checking operation to determine whether there exists an area (i.e., a displaying area) on the displaying apparatus of the client is executed (in steps S53 and S54). If there are displaying area report information, then such report information is edited into display use data after reading thereof based on a physical pointer (i.e., address) of the report storing file 331 that is stored in the pointer item 1700e of a corresponding entry of the report storing table 1700. Further, an information designating item 1700g of a corresponding entry of the report storing table 1700 is checked, and the edited report information is displayed on a displaying area of the displaying apparatus of the client based on the result of the checking operation (in steps S55 and S56).

When the first informing method is stored (and a not-yet-dealt-elapsing time period exceeds a predetermined designated value), the informing section 254 changes a displaying color of the report information edited into the display use data in the displaying area. When the second informing method is stored in the information designating item 1700g (and a not-yet-dealt-elapsing time period exceeds a predetermined designated value), the informing section 254 displays a transfer destination of the report information edited into the display use data in the above mentioned displaying area.

Next, the displaying section 252 stores a client number displayed in the client number item 1700f of a corresponding entry of the report-storing table 1700. Further, the process returns to the step S51, after the displaying section 252 executes a reception confirmation operation (explained later in detail) for confirming that a reception confirming section 255 returns (i.e., transmits) reception confirmation information indicating the effect of reception of report information to an applicable copier 1 (i.e., a copier of a destination of transmission of report information displayed on the displaying area of the displaying apparatus of the client).

Further, the process returns to the step S51 if the displaying area does not exist. The displaying section 252 checks whether termination designation is designated (or executed) by operation of the inputting apparatus of the client in step S51, and its terminates its operation if the termination designation is designated. Further, the similar operation and judgment are continued if the termination designation is not executed (or designated).

In this embodiment of the present invention, the first informing method is a method for informing a center operator that report information is left non-dealt for a long time, and a red color is displayed on the displaying apparatus of the client. However, it is possible that a displaying color or a displaying manner is dynamically changed (e.g. from yellow to red, and then flashing) step by step (according to an amount of a not-yet-dealt-elapsing time period)

Figure 23:
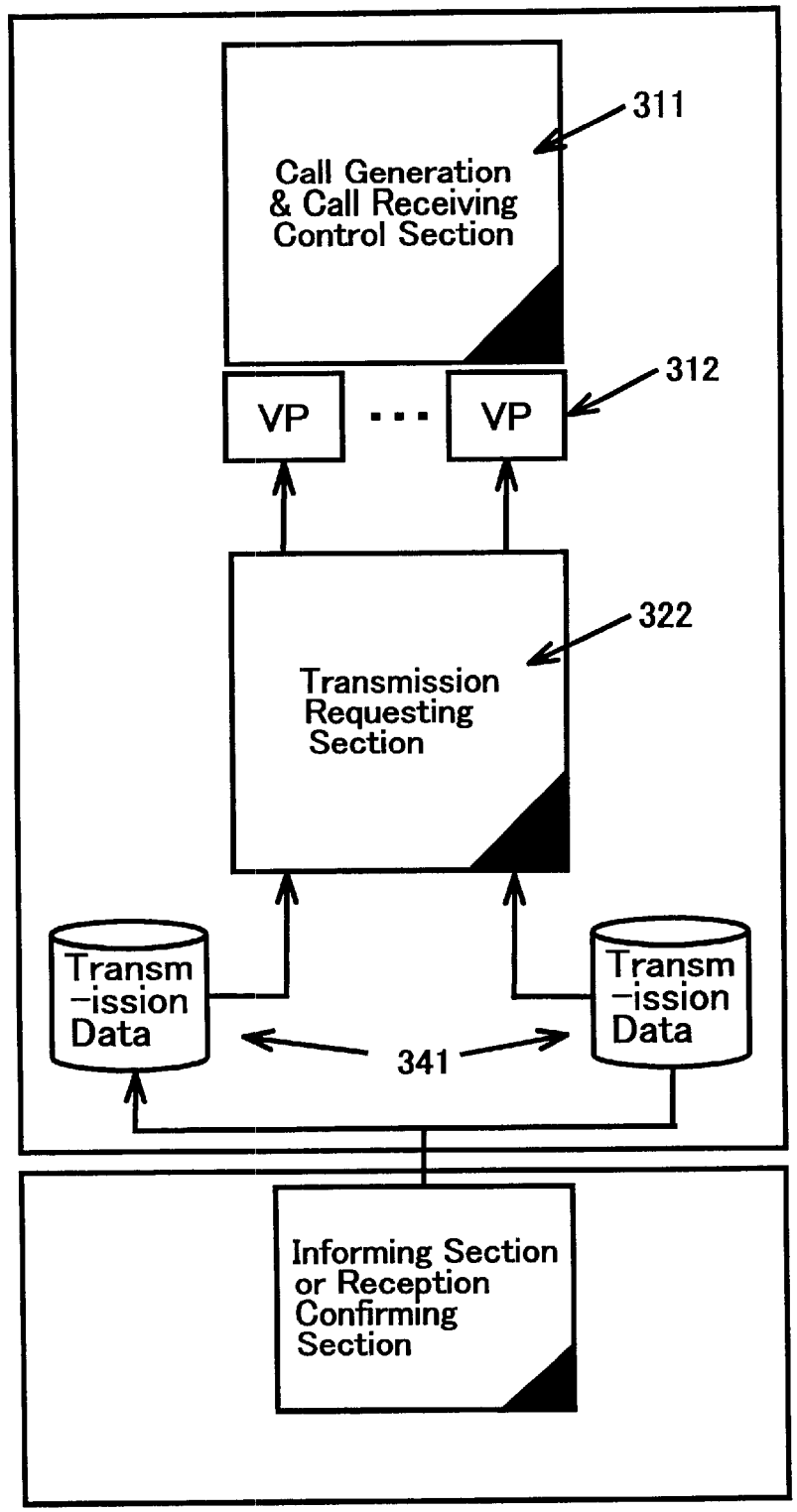
FIG. 23 is a block diagram illustrating the flow of transmission data by the communication section and the informing section and the reception confirming section in the system of FIG. 17.
Figure 24:
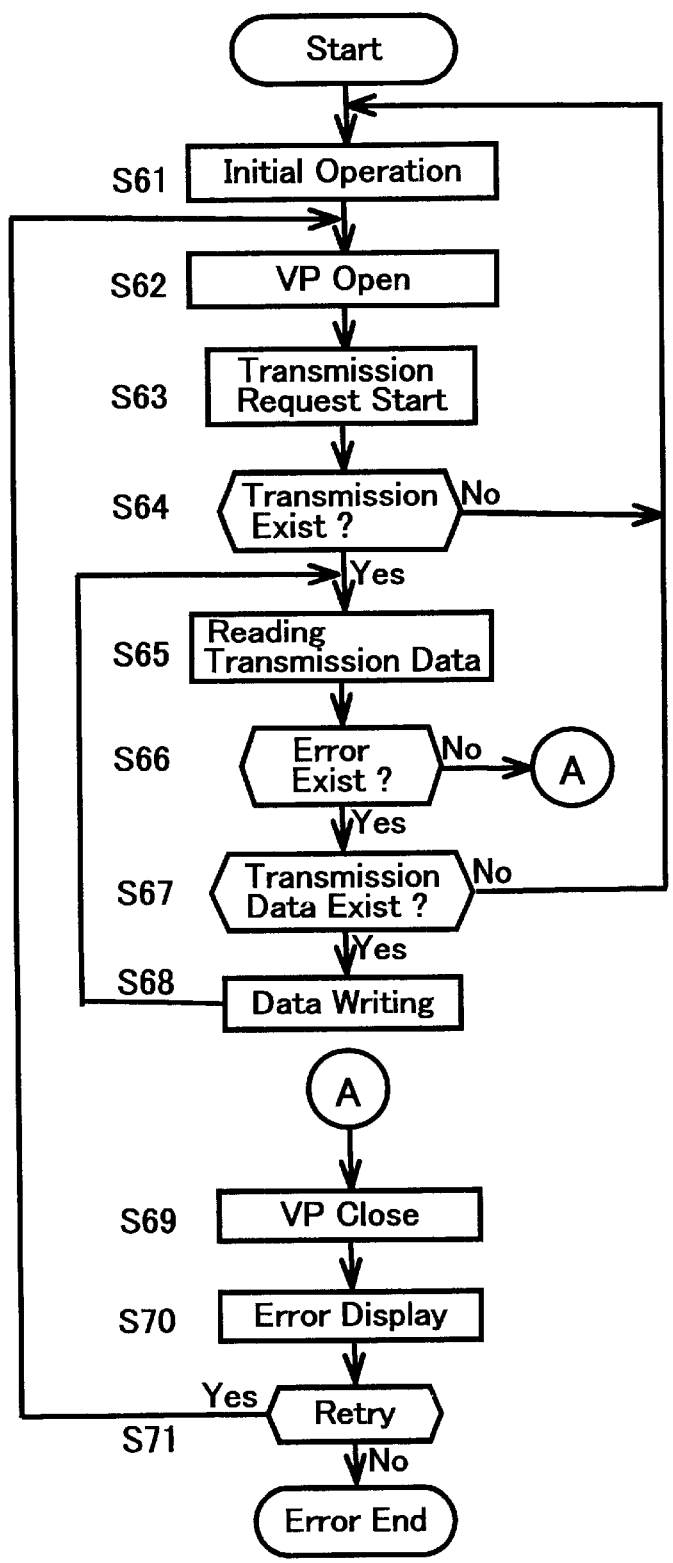
FIG. 24 is a flowchart of a data transmission operation by the communication section in the system of FIG. 17.

FIG. 23 shows the flow of transmission data transmitted by the communication section 250 and the informing section 254 (or the reception confirming section 255) in the system of FIG. 17. FIG. 24 is a flowchart of a data transmission operation executed by the communication section 250, according to an embodiment of the present invention.

The transmission requesting section 322 locating on the presentation layer 320 of the communication section 250 firstly executes an initial operation, such as securing of a number of ports of the call generation VP 312 or the like. The transmission requesting section 322 executes opening (securing) for transmitting data from an upper lank function of the presentation layer 320 (informing section 254 and reception confirming section 255), and starts requesting for transmission (in steps S61 through S63).

Next, the transmission requesting section 322 monitors whether data transmission to the communication control apparatus 18 (or a personal computer 211) is normally completed, and an abnormal event occurs, and verifies whether there exists a transmission request from the upper lank function. If there exists a transmission request from the upper lank function, the transmission requesting section 322 reads transmission data from the transmission data file 341 and verifies whether the reading operation is normally completed (if an error occurs) (in steps S64 through S66). Thereafter, the transmission requesting section 322 writes read data into the buffer of the call generation VP 312 opening in step S62 (in steps S64 through S66). Next, the process returns to the step S65 and the operation similar to the above is continued until no transmission data exists.

Further, the reading operation does not normally terminate; the transmission requesting section 322 closes the call generation VP 312 opened in step S62, displays an error, executes opening of the call generation VP 312 again if a re-try designation exists, and continues a transmission request (in steps S69 through S71, S62 through S63). If no transmission data exists, a communication request is continued for operating the next transmission data.

Figure 25:
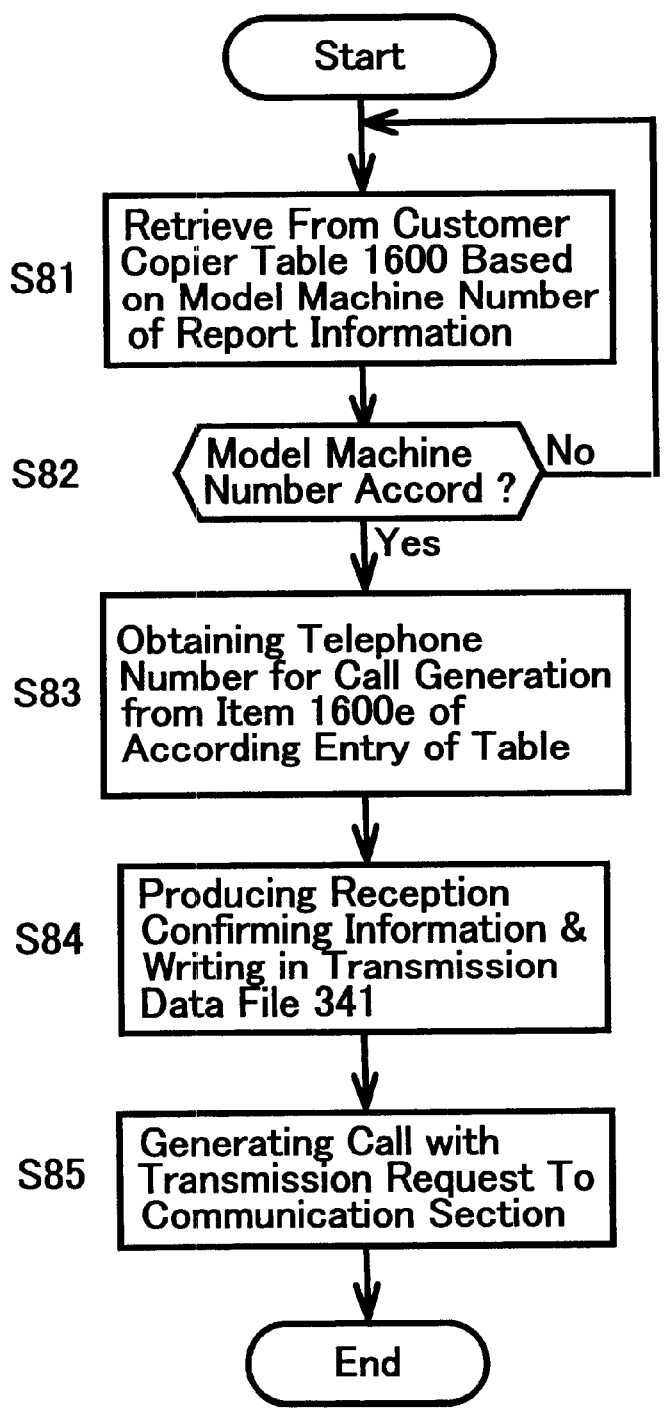
FIG. 25 is a flowchart of a reception confirming operation executed by the reception confirming section in the system of FIG. 17.

FIG. 25 is a flowchart of a reception confirming operation (i.e., a sub routine of the reception confirming operation illustrated in FIG. 22) executed by the reception confirming section 255 in the system of FIG. 17. The reception confirming section 255 obtains a model machine number (i.e., a model number and a serial number) added to an ID code (refer to FIG. 12) of the report information displayed on the displaying section 252, and retrieves from a customer copier table 1600 using the model machine number as a query key. Further, the reception confirming section 255 obtains a call use (or call generation) telephone number of the communication control apparatus 18 installed in the customer destination from a telephone number item 1600e of an entry according with the model machine number (in step S81 through S83).

Next, the reception confirming section 255 produces reception confirmation messages telling, for example, that taking measure for report information is going on as reception confirming information indicating the effect of reception of the report information, and writes the reception confirming message in the transmission data file 341. The reception confirming section 255 is the communication section 250 executes call generation for a transmission request based on the obtained telephone number and transmits the reception confirmation massages written in the transmission data file 341 to a copier 1 as a report information transmitting source via the public line network 17 and the communication control apparatus 18 of the telephone number obtained. The process then terminates.

Actual call generation to the communication control apparatus 18 of a remote place is executed by the communication section 250. Namely, the communication control apparatus 18 receiving the reception confirmation massages under a control of text from the service center transmits the received reception confirmation messages to copiers 1 (i.e., copiers as report information transmitting souse) connected to its own machine. The copier 1 receiving the reception confirmation messages displays the same on a character displaying device of the operating section 70 illustrated in FIG. 70, and informs the user (i.e., customer).

Figure 26:
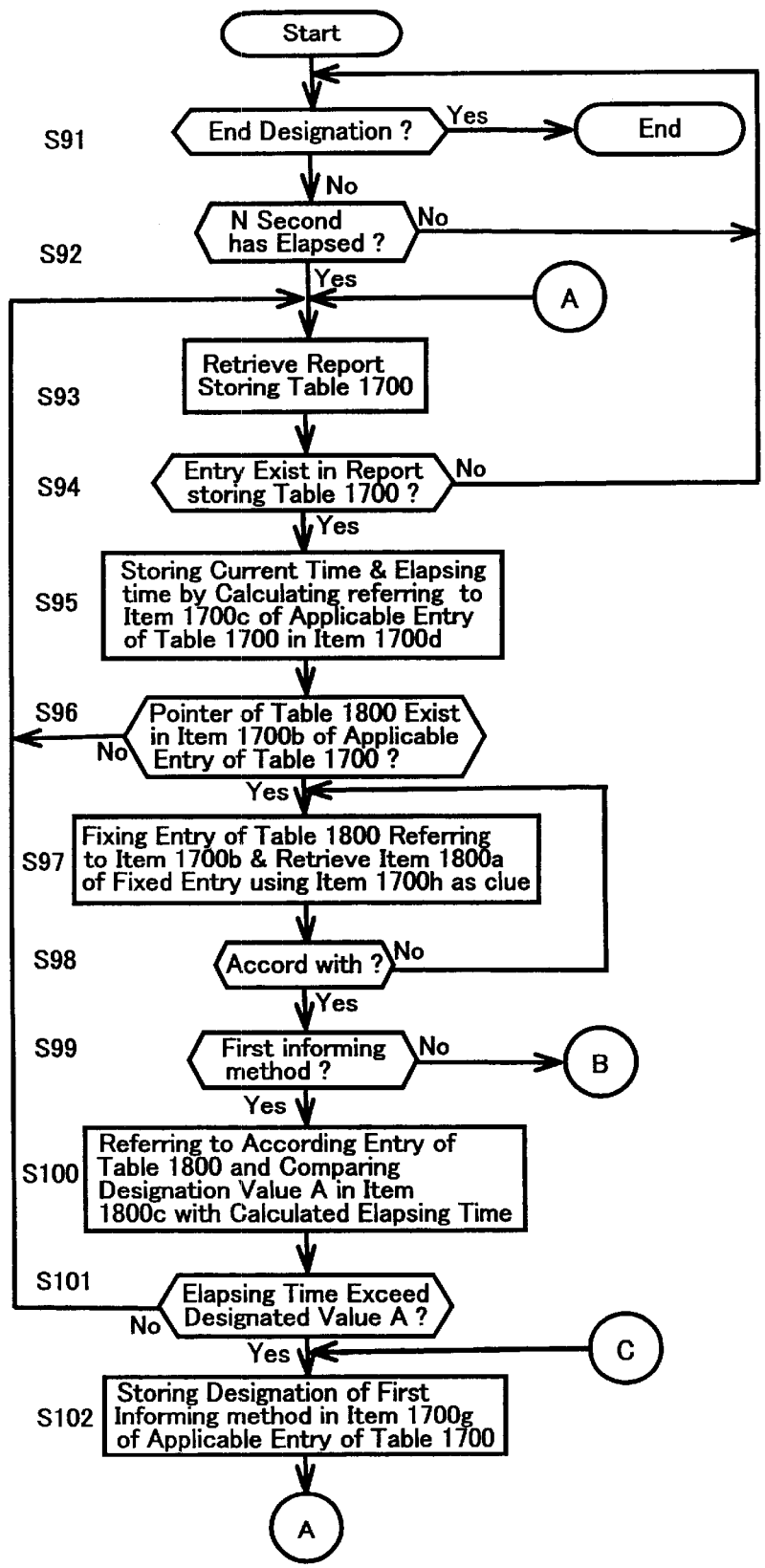
FIG. 26 is a flowchart of a counting and information designating operations executed by the counting section in the system of FIG. 17.
Figure 27:
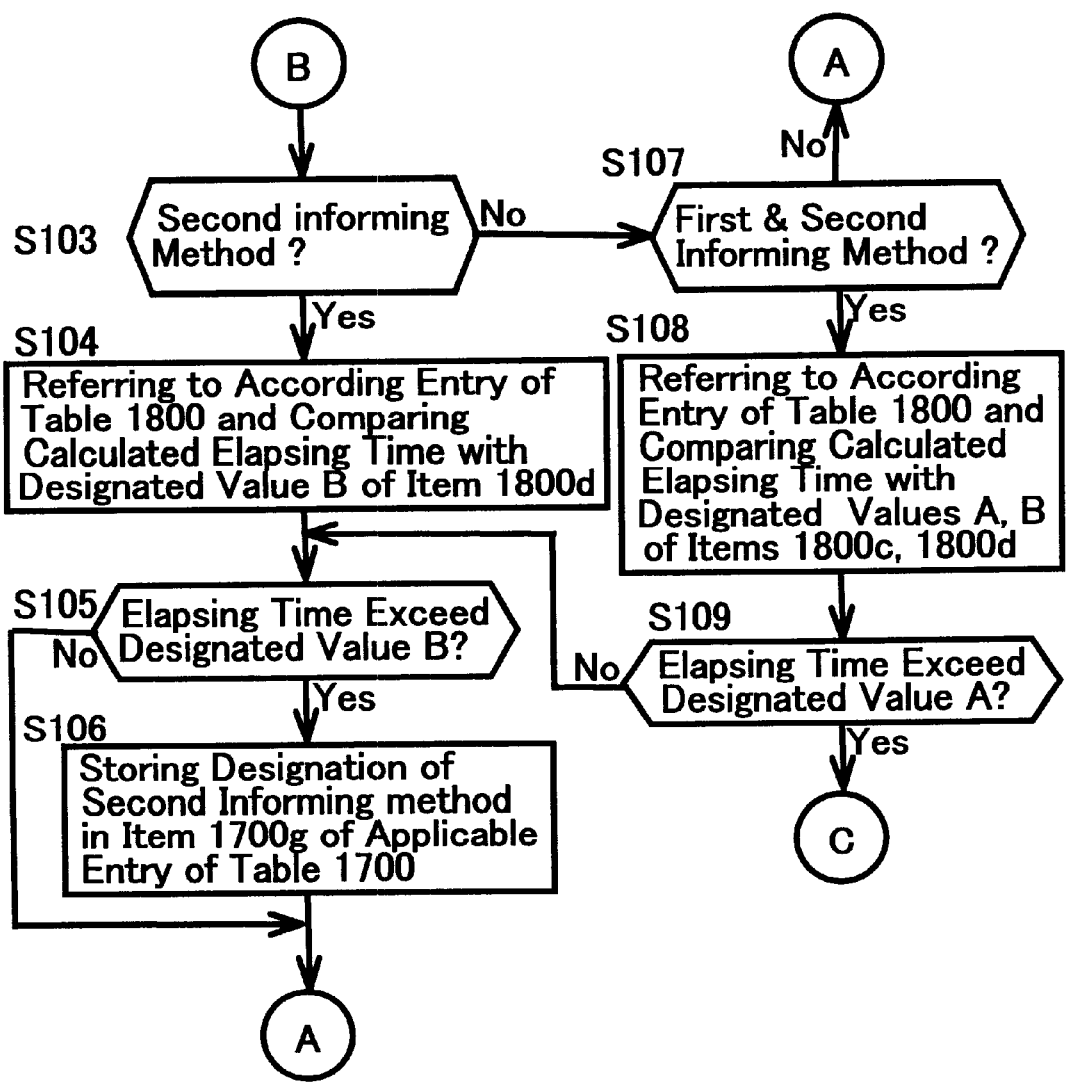
FIG. 27 is a flowchart of the counting and information designating operations illustrated in FIG. 26.

FIGS. 26 and 27 are flowcharts respectively of the storing operation of a counted number or an information designating operation, according to an embodiment of the present invention. The counting section 253 firstly checks if a terminating designation is designated by an operation of the inputting apparatus of the client, and executes check if N seconds has elapsed after the previous operation when the termination designation is not designated (in steps S91 and S92). The operation interval of N seconds is automatically adjusted considering an area (i.e., displaying area) capable of displaying on the displaying apparatus of each client 201a through and 201n installed in the service center 200, and a stored number of report information reported to the report storing file 331. Namely, the displaying area of the displaying apparatus of the each client 201a through and 201n installed in the service center 200 is compared with a number of report information, and the operation interval N second is adjusted longer if all of the stored number of cases of report information can be displayed. The operation interval N second is adjusted shorter if the display area is decreased.

If N second has not yet elapsed after the last operation, the report storing table 1700 is retrieved after waiting elapsing of N second, and it is checked if there exists not-yet-dealt-report information (i.e., entry in the report storing table 1700) in the report storing file 331. If there exists not-yet-dealt report information, a storing start time (a time period when not-yet-dealt report information is stored in the report storing file 331) stored in the start time item 1700c of a corresponding entry in the report storing table 1700 is subtracted from a present time period (date and time), and a time period (a not-yet-dealt time period) elapsing from when the not-yet-dealt report information is stored in the report storing file 331 is counted, and is stored in the elapsing time item 1700d (in steps S93 through S95). Next, it is checked whether a pointer of a report information table 1800 is stored in a report information pointer 1700b of a corresponding entry of the report-storing table 1700. If the pointer is not stored therein, the process returns to step S93 and an operation similar to the above is continued. If it is, however, stored therein, an entry from the pointer to the report information table 1800 is fixed, and the kind code item 1800a of the entry previously fixed is retrieved using a kind code corresponding to an information code stored in the kind code item 1700h as a query key (in steps S96 and S97).

Then, designation of an informing method stored in the designation item 1800b is obtained from the entry of the report information table 1800 which accords with the kind code, and the informing method is checked. If the informing method is the first informing method, the designated value (assuming an information designating value as A) stored in the item 1 of designation value 1800c from the entry of the report information table 1800 according with the kind code is compared with a calculated elapsing time period. If the elapsing time period exceeds the information designating value A, the designation of first informing method is stored in an information designation item 1700g of the applicable entry of the report storing table 1700 (in steps S98 through S102).

If the informing method is the second informing method, a designation value (assuming an information designating value as B) stored in an item 2 of the designation value 1800d from the entry of the report information table 1800 according with the kind code is compared with a calculated elapsing time period. If the elapsing time period exceeds the information designating value B, the designation of second informing method is stored in an information designating item 1700g of the applicable entry of the report storing table 1700 (in steps S103 through S106). If the informing method is both the first and the second informing methods, both the designation values A and B stored in the items 1 and 2 of the designation values 1800c and 1800d, respectively, from the entry of the report information table 1800 accorded are compared with a calculated elapsing time period. If the elapsing time period exceeds the information designating value A, the designation of first informing method is stored in an information designating item 1700g of the applicable entry of the report storing table 1700 (in steps S107 through S109, and S102). If the elapsing time period does not exceed the information designating value A, but exceeds the information designating value B, designation of second informing method is stored in an information designating item 1700g of the applicable entry of the report storing table 1700 (in steps S109 an S105, and S106). If the elapsing time period exceeds neither the information designating value A nor B, the process returns to step S93 and an operation similar to the above is executed.

Further, if there is not-yet-dealt report information (entry) in the report-storing file 331, the process returns to step S91, and a check if terminating designation is designated is executed. If the process is completed if the terminating designation is designated, and an operation similar to the above is continued if it is not designated.

Figure 28:
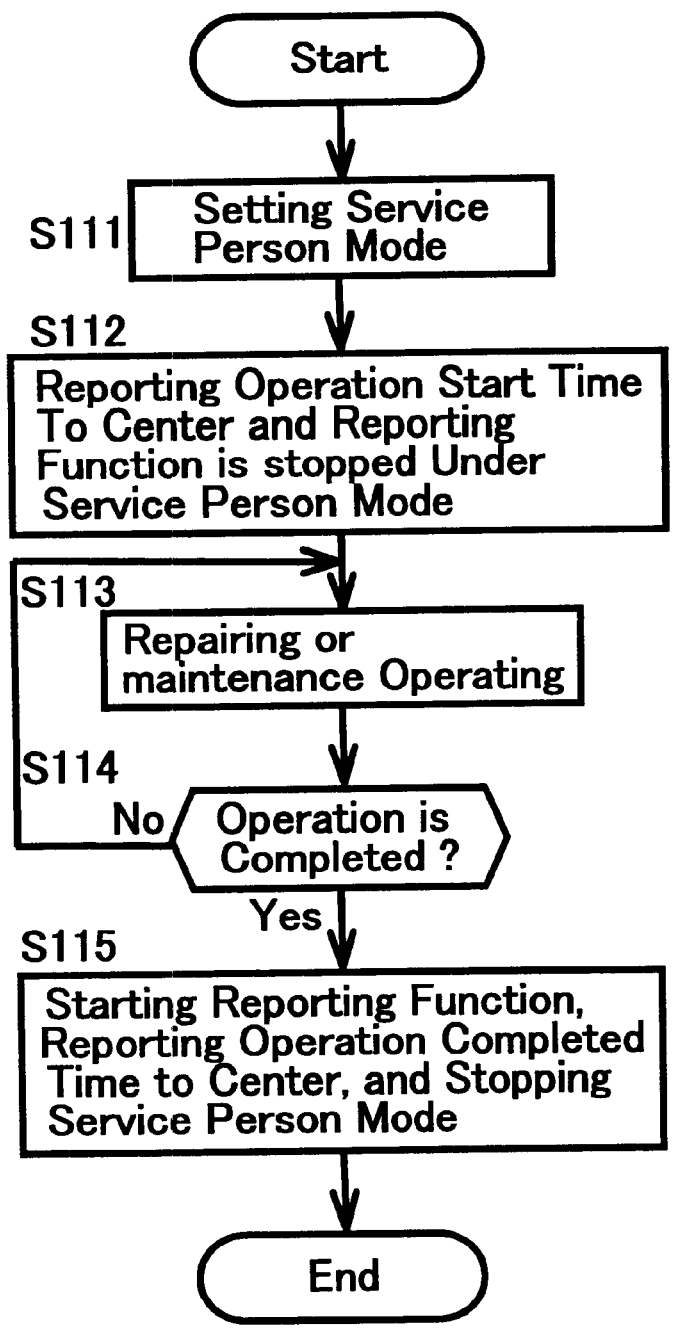
FIG. 28 is a flowchart of the operating procedure that is executed by a service person, according to an embodiment of the present invention.

FIG. 28 is a flowchart of an operating procedure executed by a service person, in accordance with an embodiment of the present invention. When receiving a request for repair and maintenance and arriving at a place in which a copier 1 of a customer destination is installed, the service person sets a service person mode (i.e., manual operator) as an operation mode by operating the above-mentioned key on an operating section 70 illustrated in FIG. 7 (in step S111). Next, the service person instructs the copier 1 to issue an operation start time report command (i.e., the copier 1 inputs operation related information indicating the effect that the service person arrives at the copier 1 installing place or that taking measure for resolving a report activity is started) by operating a key (including depressing a remote report key) on the operating section 70. The copier 1 transmits report information (i.e., inputted operation related information) indicating an operation start time (i.e., a present time when an operation is started) to the service center 200 when the operation start time report command is issued. The operation start time report command issues by operating the key on the operating section 70. Thereafter, the service person instructs the copier 1 to stop its report function so that report information (i.e., SC information) caused by self diagnosis abnormality occurring during the operation is not transmitted to the service center 200 (in step S112). The service person starts repair or maintenance operation for the copier 1; thereafter, a report function is started by operating the key on the operating section 70 when the operation is completed. Further, the service person triggers the copier 1 to issue a operation termination time report command (the service person instructs the copier to input operation related information indicating the effect that the service person completes taking measure for resolving the occurred report activity) by operating a key (including depression of a remote report key) on the operating section 70.

The copier transmits report information (i.e., operation related information inputted) indicating an operation terminating time (i.e., a present time when the operation is completed) to the service center 200, when the operation terminating time report command is issued. After the operation terminating time report command is issued, the service person changes (or stops) setting of the service person mode, and returns the operation mode of the copier 1 to a user mode (in steps S113 through S115).

Figure 29:
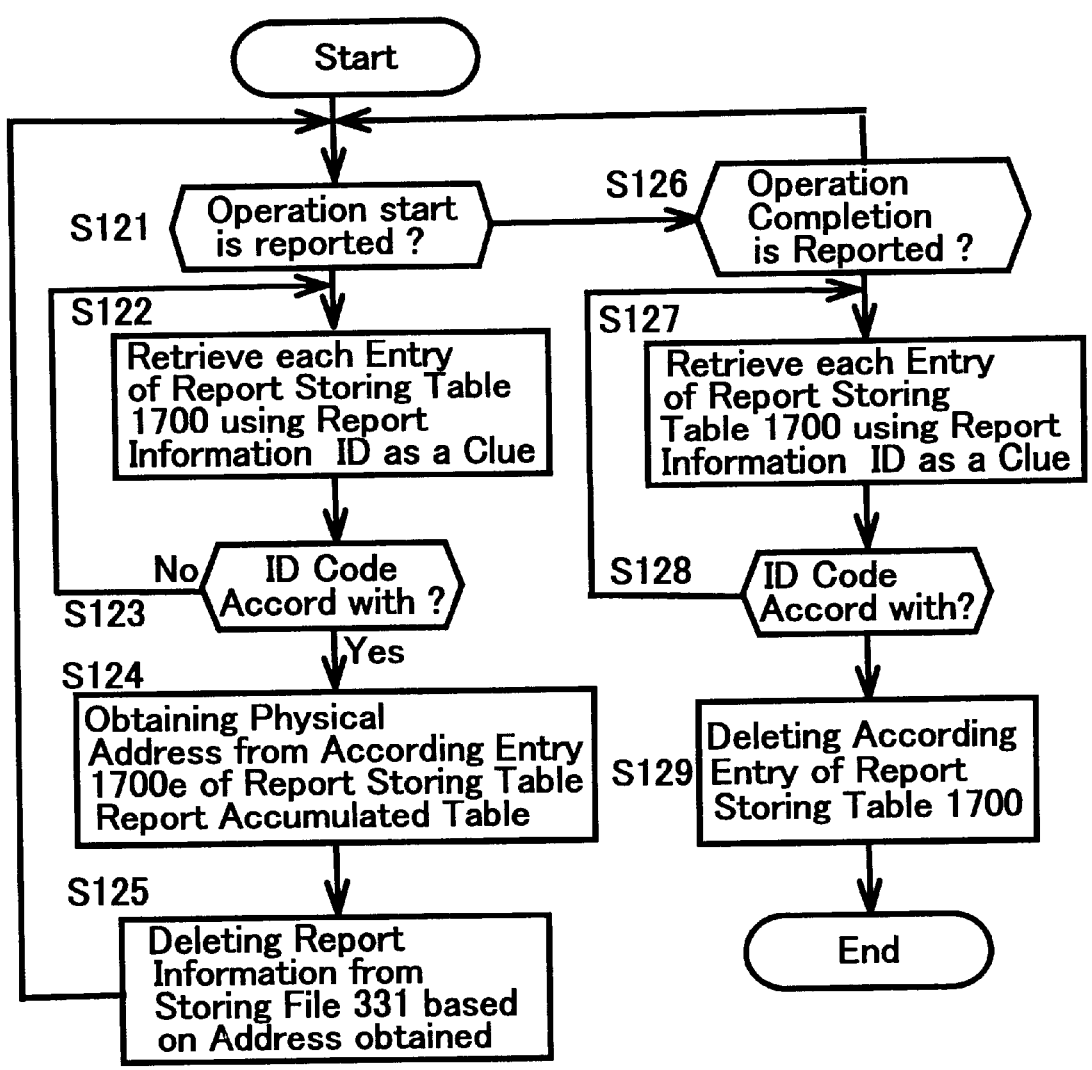
FIG. 29 is a flowchart of a deleting operation executed by the deleting section in the system of FIG. 17.
Figure 30:
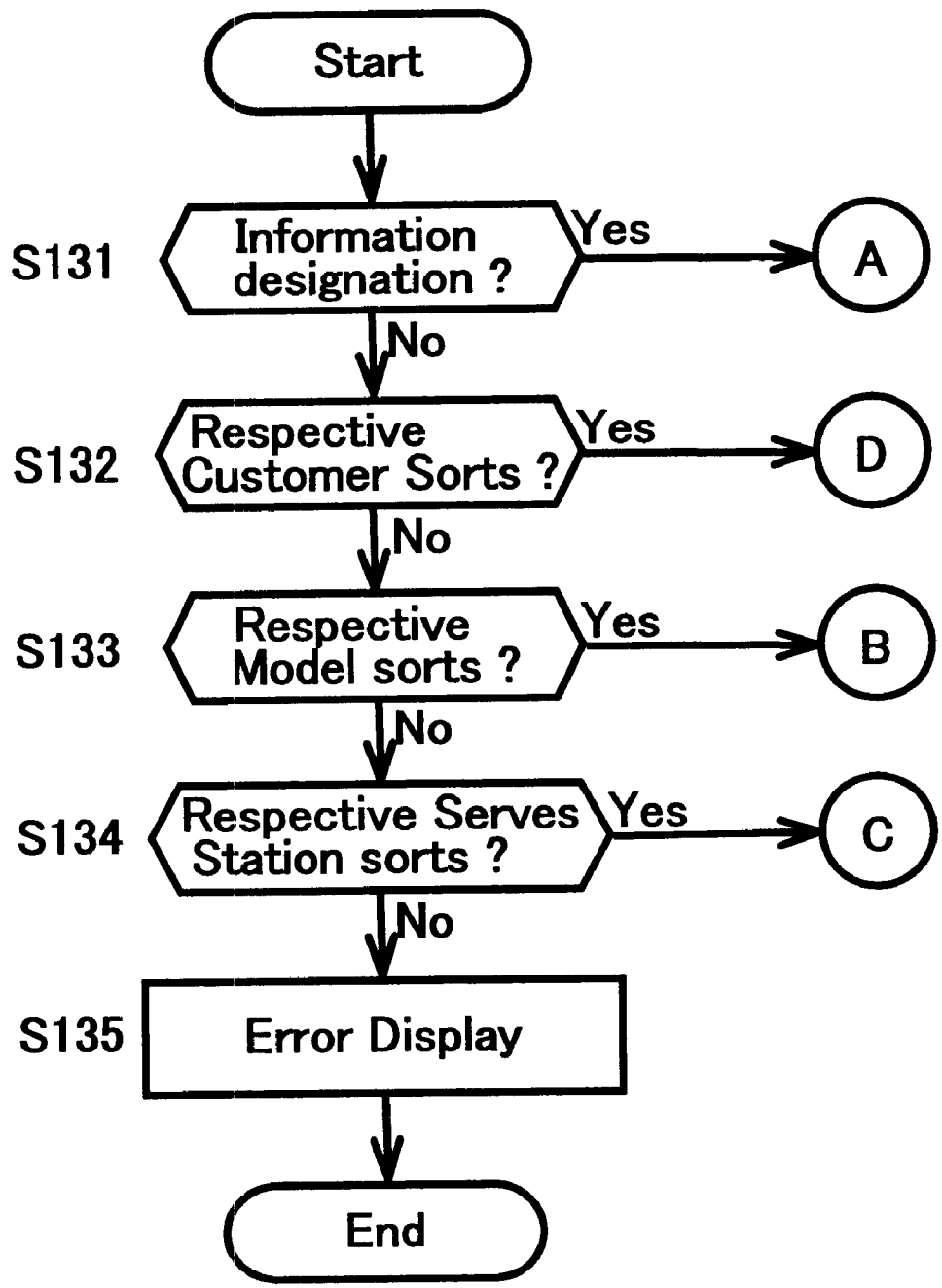
FIGS. 30–34 are flowcharts of a changing operation executed by the changing section in the system of FIG. 17.
Figure 31:
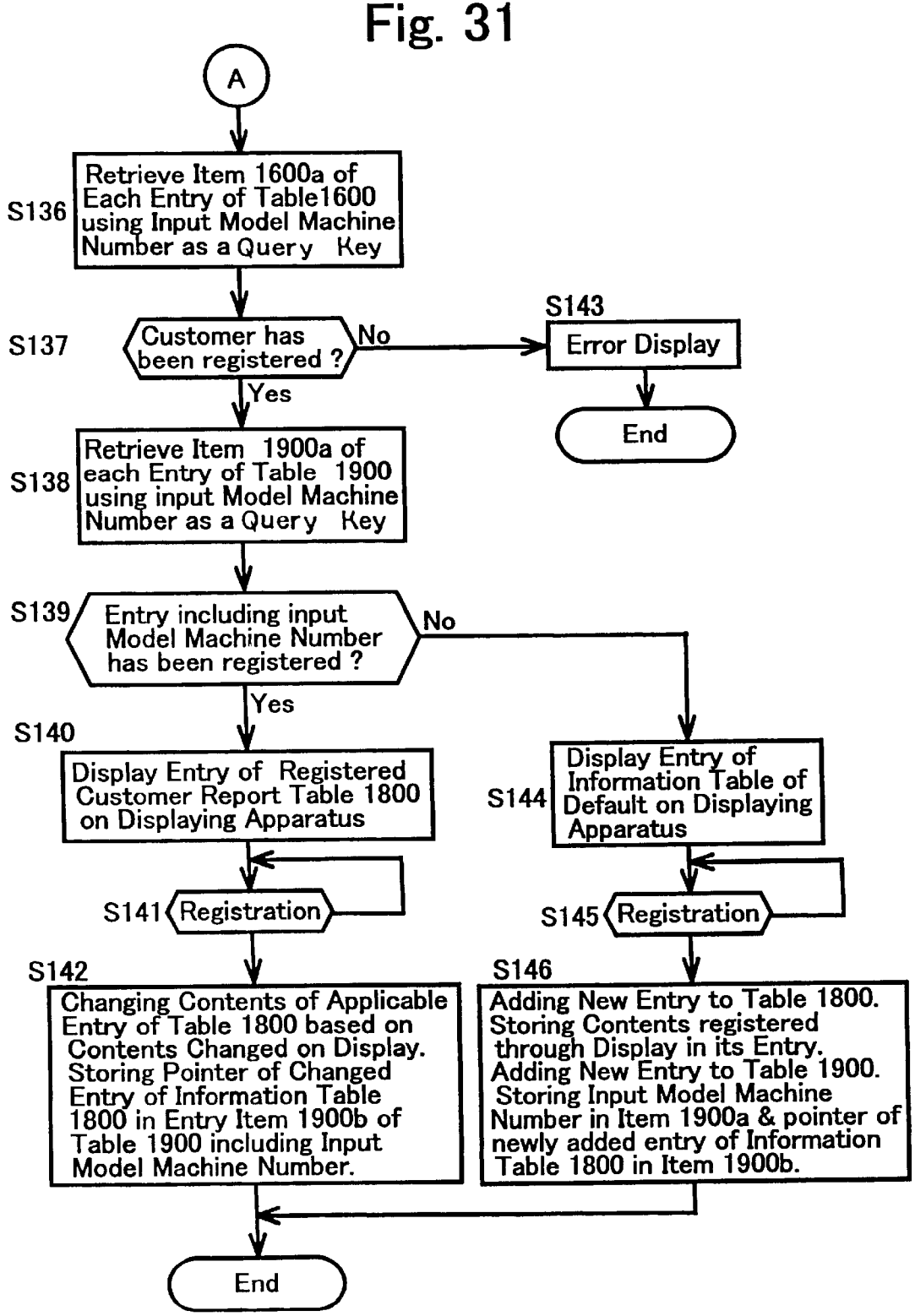
Figure 32:
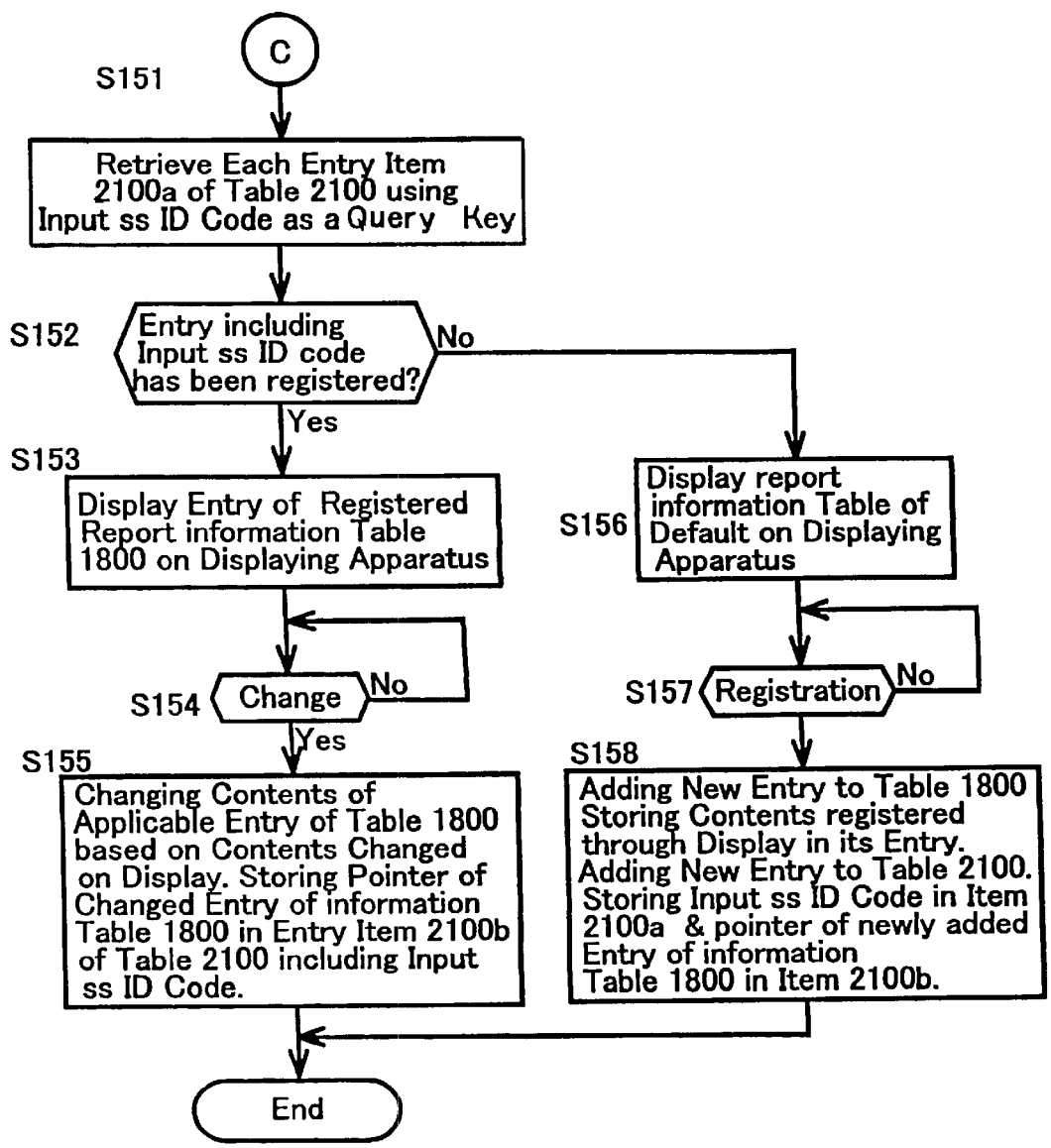
Figure 33:
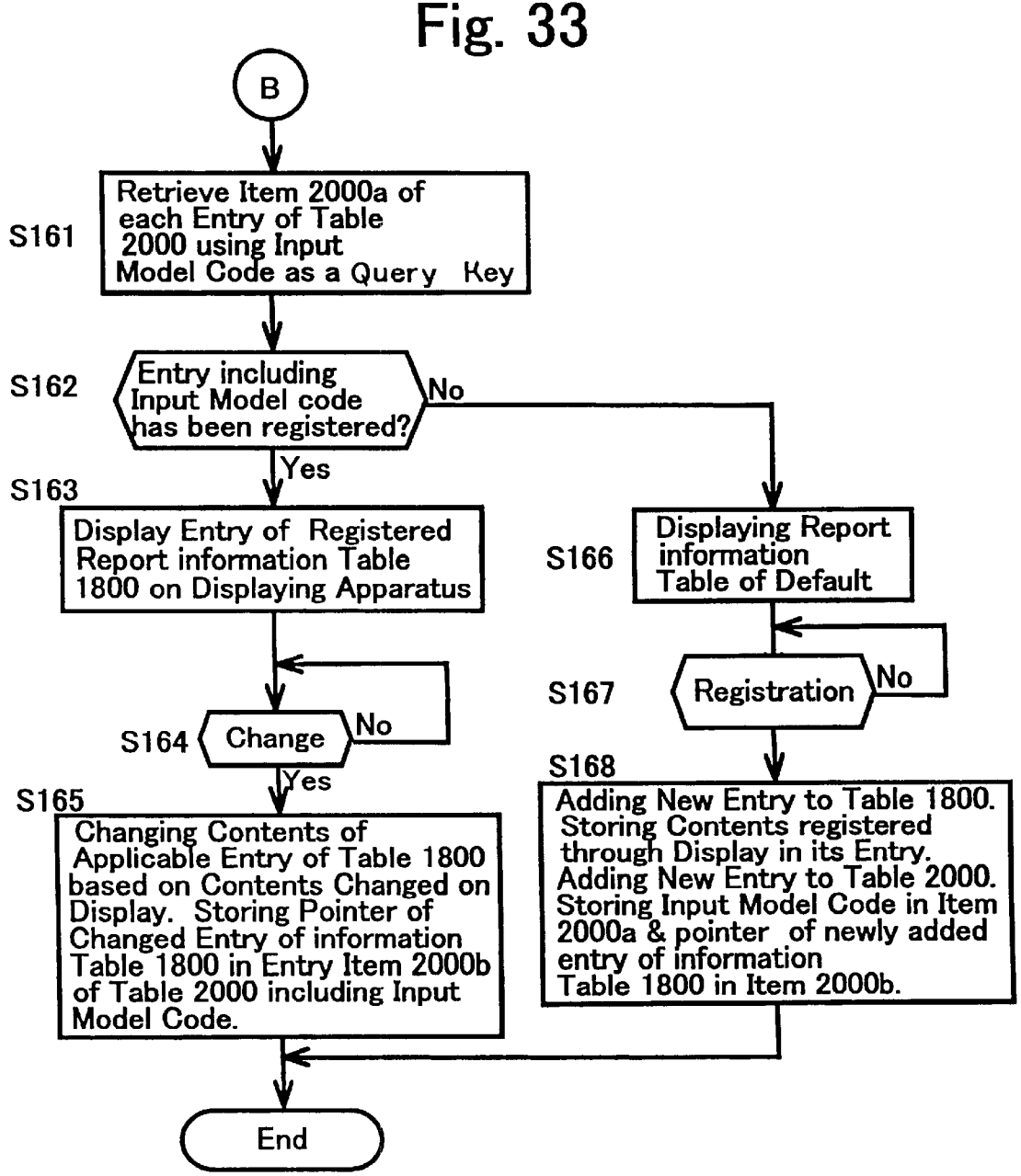
Figure 34:
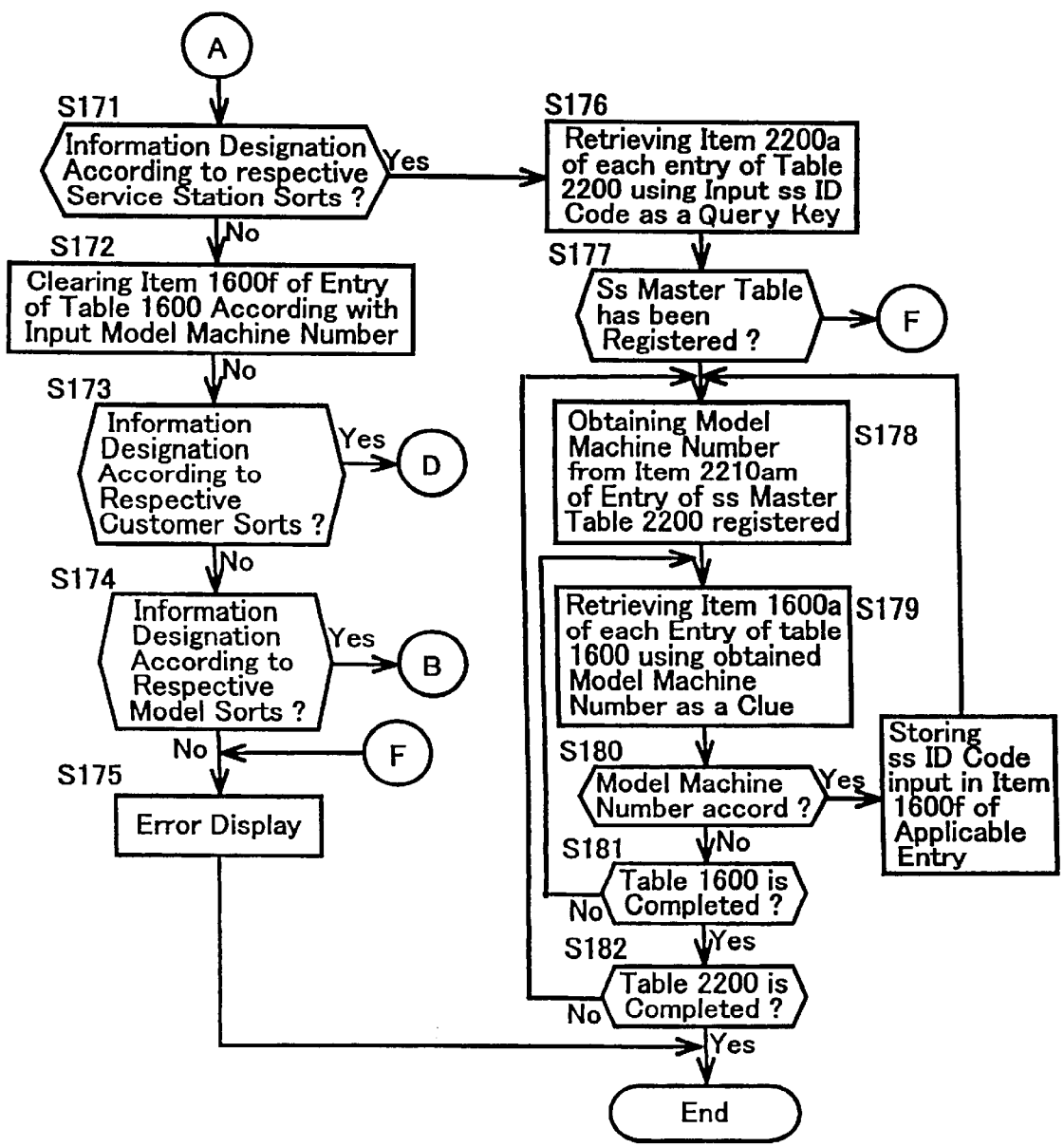

FIG. 29 shows a deleting operation executed by a deleting section 256 in the system of FIG. 17. The deleting section 256 starts an operation illustrated in FIG. 29 when report information indicating an operation-start time is stored at a time of the updating operation executed in step S37 illustrated in FIG. 21 (in the event that an discrimination code of the report information indicates operation start time information).

Further, the deleting section 256 obtains a model machine number (i.e., a model number and a serial number) added as an ID code (refer to FIG. 12) of report information indicating operation start time, and retrieves the model machine number item 1700a in each entry of the report storing table 1700 using the model machine number as a query key. The deleting section 256 obtains a physical pointer (i.e., a physical address) of a report storing file 331, in which report information has been written, from a pointer item 1700e of an entry in the report storing table 1700, which accords with the model machine number (i.e., ID code). The deleting section 256 then deletes the applicable report information from the report storing file 331 based on the physical address obtained (in steps S121 through S125).

Thereafter, when report information indicating an operation-terminating time is stored as a time of the updating operation in step S37 (illustrated in FIG. 21), the deleting section 256 obtains the model-machine number added as the ID code of the report information, and retrieves model machine-number item 1700a of the each entry of the report-storing table 1700 using the model-machine number as a query keyquery key. The deleting section 256 then deletes the entry of the report storing table 1700, which accords with the model machine number (i.e., ID code) (in steps S126 through S129).

In this embodiment of the present invention, the deleting section 256 deletes the report storing file 331 (i.e., report information) received from the copier 1 as an information transmitting source of the information and stored when the report information indicating an operation start time (i.e., the operation related information indicating the effect that the service person arrives at the copier 1 installed place or that he starts taking measure for resolving the occurred report activity is installed) is received by the communication section 250. Also, the deleting section 256 deletes the entry of the report storing table 1700, which corresponds to the above-mentioned report storing file 331 when the report information indicating the operation terminating time (i.e., the operation related information indicating the effect that taking measure for resolving the occurred report activity is completed) is received. Timing for deleting entries of a report storing file 331 and the corresponding report storing table 1700, which stores report information indicating an operation start time or an operation terminating time from the copier 1 as an information transmitting source and stores thereof, can be optionally changed. For example, when report information indicating an operation start time is received by the communication section 250, an entry of a report storing file 331, which is received from the copier 1 as an information transmitting source and stored, and an entry of the report storing table 1700 corresponding thereto can be deleted. Further, when report information indicating an operation terminating time is received, an entry of the report storing file 331, which is received from the copier 1 as an information transmitting source and stored; the entry of the report storing table 1700 corresponding thereto can be deleted.

FIGS. 30–34 are flowcharts respectively illustrating one example of a changing operation executed by the changing section 257 illustrated in FIG. 17. The changing section 257 switches over a screen on a displaying apparatus of a client when a prescribed command, such as CMD-CHG instruction command (refer to a screen A indicated in FIG. 35(*a*)) is inputted. The center operator clicks an item on a screen B which is desired to be changed by moving a mouse thereto. At which time, when a "customer" portion of a "informing method change" portion is clicked, the changing section 257 switches over the screen on the displaying apparatus of the client to a screen C, illustrated in FIG. 35(*c*), because a corresponding command is inputted. The changing section 257 requests the center operator for input of a model machine number of a copier 1 installed in a customer destination as an object for which an informing method is changed (including registration), and executes the following operation when the model machine number is inputted.

The center operator retrieves a model machine number item 1600*a* of each entry from each customer copier table 1600 using the inputted model machine number as a query key, and checks suitability of the inputted model machine number (i.e., whether it has been registered). If the inputted model machine number is not proper (i.e., the customer destination has not been registered), error messages are displayed on the displaying apparatus, and the operation is completed (in steps S132, S136, S137 and S143).

If the inputted model machine number is proper (i.e., the customer destination has been registered), a model machine number item 1900*a* of an entry of each information table 1900 is retrieved using the inputted model machine number as a query key, and it is checked whether an entry including the inputted model machine number has already been registered. If it has been registered, a pointer of the entry of the report information table 1800 is obtained from the pointer item 1900*b*, and the contents of the entry is edited into a screen as illustrated on the screen D in FIG. 35(*b*). Then, the screen on the displaying apparatus is switched over to a screen such as the screen D (in steps S137 through S140).

Figure 35:
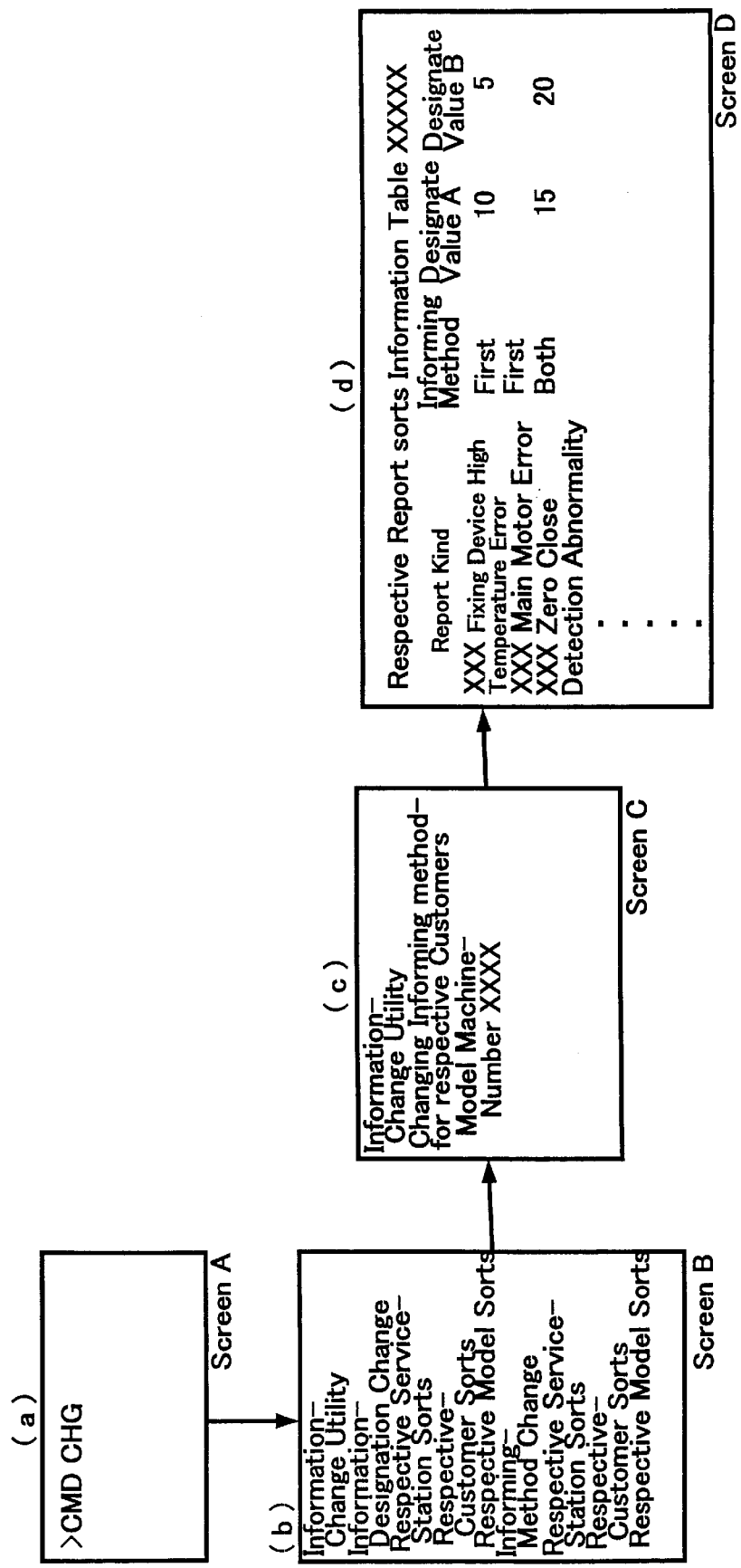
FIG. 35 is a diagram of a counter value confirming an not-yet-obtained list stored in the data file, according to an embodiment of the present invention.

When the screen B illustrated in FIG. 35(*b*) is displayed on the displaying apparatus of the client, and a "model" portion of an "informing method change" portion is clicked, the changing section 257 switches over the screen on the displaying apparatus of the client to a screen similar to the screen C illustrated in FIG. 35(*c*), because a corresponding command is inputted. The changing section 257 requests the center operator for input of a model code to be an object of informing method change. Upon an input of the model code (i.e., model number) is inputted, each model item 200*a* of an entry of the model information table 200 is retrieved using the inputted model code as a query keyquery key, and it is determined whether an entry including the inputted model code has been already registered. If it has been registered, a pointer of the entry of the report-information table 1800 is obtained from the pointer item 2000*b*, and contents of its entry is edited into such as a screen D illustrated in FIG. 35(*d*), and finally, the screen on the displaying apparatus of the client is switched over to a screen similar to the screen D (in steps S133, and S161 through S163). The center operator can change an informing method and information values A and B per each kind of report information by moving the mouse to an information designating value item on the displaying apparatus of the client which is desired to be changed, and inputting a corresponding command.

Further, when the changing operation is completed and a termination command is issued by operating the inputting apparatus of the client, an applicable entry of the report information table 1800 is rewritten based on the contents changed on the screen. At same time, a pointer of the newly added entry of the changed report information table 1800 is stored in the pointer item 1900*b* of an entry of the customer information table 1900 including the inputted model machine number, and the operation is completed (in steps S141 and S142).

If an entry of the information table 1900 including the inputted model machine number has not been registered, contents of the report table of default is edited into such as a screen D illustrated in FIG. 35(*d*), and the screen on the displaying apparatus is switched over to a screen such as the screen D (in steps S139 and S144). Then, the center operator can register an informing method and information designation values A and B per each kind of report information by moving the mouse to an information designation value item on the displaying apparatus of the client, which is desired to be registered, and inputting a corresponding command by operating the keyboard.

When the changing operation is completed and a terminating command is issued by the operation of the inputting apparatus of the client, a new entry is added to the report information table 1800, and contents registered through the screen is stored in a new entry. Further, the inputted model machine number is stored in the model machine number item 1900*a* and a pointer of an entry of the report information table 1800 newly added is stored in the pointer item 1900*b*. The operation is then completed (in steps S145 and S146).

When the screen B illustrated in FIG. 35(*b*) is displayed on the displaying apparatus of the client, and a "model" portion of an "informing-method-change" portion is clicked, the changing section 257 switches over the screen on the displaying apparatus of the client to a screen similar to the screen C illustrated in FIG. 35(*c*), because a corresponding command is inputted. The changing section 257 requests the center operator for input of a model code to be an object of informing method change. Upon input of the model code (i.e., model number), each entry having the model item 2000*a* in the model information table 2000 is retrieved using the inputted model code as a query key, and it is determined whether an entry including the inputted model code has been already registered. If it has been registered, a pointer of the entry of the report information table 1800 is obtained from the pointer item 2000*b*, and contents of its entry is edited into such as a screen D illustrated in FIG. 35(*d*). Finally, the screen on the displaying apparatus of the client is switched over to a screen similar to the screen D (in steps S133 and S161 through S163).

The center operator can change over an informing method and information designation values A and B per each kind of report information by moving a mouse to an information designation value item on the displaying apparatus of the client, which is desired to be changed over, and inputting a corresponding command by operating the keyboard.

When the changing operation is completed and a terminating command is issued by an operation of the inputting apparatus of the client, contents of an applicable entry of the report information table 1800 is changed based on the contents changed on the screen. At the same time, a pointer of the entry of the changed report information table 1800 is stored in the pointer item 2000*b* of the entry of the model information table 2000 including the model code inputted, and the operation is completed (in steps S164 and S165).

If an entry of the model information table 2000 including a model code inputted has not been registered, contents of the table of a default is edited into such as a screen D illustrated in FIG. 35(*d*), and a screen of the displaying apparatus is switched over to such as the screen D (in steps S162 and S166).

Then, the center operator can register an informing method and information designation values A and B per each kind of report information by moving a mouse to an information designation value item on the displaying apparatus of the client, which is desired to be registered, and inputting a corresponding command by operating the keyboard.

Further, when the changing operation is completed and a termination command is issued by operation of the inputting apparatus of the client, a new entry is added to the report information table 1800, and contents registered through the screen is stored in the new entry. At the same time, the new entry is added to a model information table 2000, a model code is stored in the model item 2000*a*, a pointer of the newly added entry of the report information table 1800 is stored in the pointer item 2000*b*. Then, the operation is completed (in steps S167 and S168).

When the screen B illustrated in FIG. 35(*b*) is displayed on the displaying apparatus of the client, and a "service station" portion of an "informing method change" portion is clicked, the changing section 257 switches over the screen on the displaying apparatus of the client to a screen similar to the screen C illustrated in FIG. 35(*c*), because a corresponding command is inputted. The changing section 257 requests the center operator for input of an ID code (i.e., ssID code). Upon input of the ssID code, each ssID item 2100*a* of an entry of the service station information table 2100 is retrieved using the inputted ssID code as a query key, and it is determined whether an entry including the inputted ssID code has been already registered. If it has been registered, a pointer of the entry of the report information table 1800 is obtained from the pointer item 2100*b*, and contents of its entry is edited into such as the screen D illustrated in FIG. 35(*d*), and finally, the screen on the displaying apparatus of the client is switched over to a screen similar to the screen D (in steps S134, S151 through S153).

Then, the center operator can change an informing method and information values A and B per each kind of report information by moving the mouse to an information designating value item on the displaying apparatus of the client which is desired to be changed, and inputting a corresponding command.

When the changing operation is completed and a termination command is issued by an operation of the inputting apparatus of the client, contents of the applicable entry of the report information table 1800 is changed based on the contents changed through the screen.

If an entry is newly used, a pointer of the entry of the changed report information table 1800 is stored in the pointer item 2100*b* of the entry of the service station information table 2100 including the inputted ssID code. The operation is then completed (in steps S154 and S155). The operation is then completed (in steps S154 and S155).

If an entry of the service station information table 2100 including the inputted ssID code has not been registered, contents of the service station information table of a default is edited into such a screen D illustrated in FIG. 35(*d*), and the screen on the displaying apparatus is switched over to the screen such as a screen D (in steps S152 and S156).

Then, the center operator can change an informing method and information values A and B per each kind of report information by moving the mouse to an information designating value item on the displaying apparatus of the client which is desired to be changed, and inputting a corresponding command.

When the changing operation is completed and a termination command is issued by an operation of the inputting apparatus of the client, a new entry is added to the report information table 1800 and contents registered through the screen are stored in the new entry. At the same time, the new entry is added to the service station information table 2100. Further, the inputted ssID code is stored in the ssID item 2100*a* and a pointer of the newly added entry of the report information table 1800 is stored in the pointer item 2100*b*. The operation is then completed (in steps S157 and S158).

When the screen B illustrated in FIG. 35(*b*) is displayed on the displaying apparatus of the client and a "service station" portion of an "informing method change" portion is clicked, the changing section 257 switches over the screen on the displaying apparatus of the client to a screen C illustrated in FIG. 35(*c*), because a corresponding command is inputted. The changing section 257 requests the center operator for input of an ID code (i.e., ssID code) which is an object of information designation change. Upon input of the ssID code, a ssID item 2200*a* of each entry of a service station master table 2200 is retrieved using the ssID code as a query key, and the suitability of the inputted ssID code is checked (whether an entry including the inputted ssID has been registered). If the inputted ssID code is not proper, namely, the ssID code has not been registered, error messages are displayed on the displaying apparatus, and the operation is completed (in steps S131, S171, S176, S177 and S175). If the inputted ssID code is proper, namely, the ssID code has been registered, a model machine number is obtained from the model machine number item 2200*am*. The model machine number item 1600*a* of an entry of the customer copier table 1600 is retrieved using the model machine number as a query key, and the inputted ssID) code is stored in the ssID) item 1600*f* of the entry according with model machine number. After that, the process returns to step S178 and an operation similar to the above is continued (in steps S177 through S183).

Figure 36:
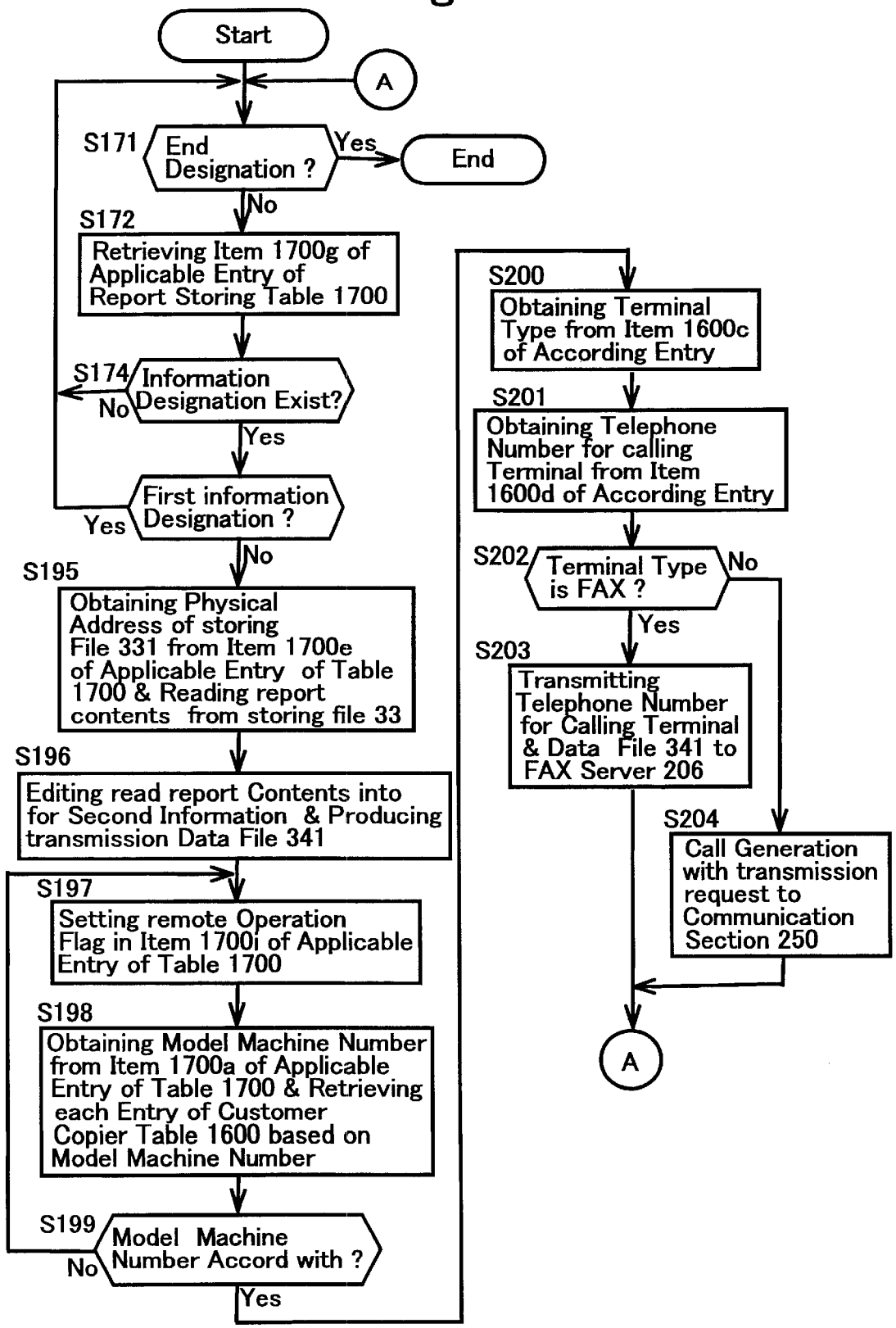
FIG. 36 is a flowchart of an informing operation executed by the informing section in the system of FIG. 17.

FIG. 36 is a flowchart of an informing operation that is executed by the informing section 254 in the system of FIG. 17. The informing section 254 operates asynchronously with the above mentioned each section, and checks whether a terminating instruction is designated by an operation of the inputting apparatus of the client. If the terminating instruction is designated, it completes the operation (in step S191). If the terminating instruction is not designated, an information designation item 1700*g* of an applicable entry of the report storing table 1700 (i.e., corresponds to report information presently displayed) is retrieved (in step S192). At this time, a client number item 1700*f* of each entry of the report storing table 1700 is retrieved, and a client displaying the report information and an entry corresponding to the report information are recognized.

Further, it is verified whether designation of an informing method is stored (i.e., information designation exists) in the information designation item 1700*g* of the applicable entry. If it is not stored, the process returns to step S191, and an operation similar to the above is continued. If it is stored, it is verified whether the informing method is either the first informing method (i.e., the first information designation) or the second informing method (i.e., the second information designation) (in steps S193 and S194).

Further, if the informing method is the first informing method, the process returns to step 191 and an operation similar to the above is continued. However, if the informing method is the second informing method, a physical address (a physical pointer) of the report storing file 331 storing actual contents of the report information is obtained from the pointer item 1700*e* of an applicable entry of the report storing table for the purpose of transmitting the report information to a remote terminal (e.g. a personal computer 211 or a fax 212 of each service station). Further, the report contents are read from the report-storing file 331 (in step S195).

Next, a type of the terminal (terminal type) of the service station 210 executing maintenance (or repair) of a copier is obtained from the terminal type item 1600c of an entry according with a model machine number. At same time, a call use telephone number of the terminal of the service station 210 executing maintenance of a copier (i.e., terminal call use telephone number) is obtained from the telephone number item 1600d of an entry according with the model machine number (in steps S199 through S201).

Next, the obtained terminal type is verified, and if the terminal type is the fax, both the transmission data file produced in step S196 and the terminal call use telephone number obtained in step S201 are transmitted to a FAX server 06. The operation is then completed (in steps S202 and S203). The FAX server 206 generates a call based on the received terminal call use telephone number, and transmits the received transmission data file 341 (i.e., report information) to a fax 212 as a call generating destination via a public line network 17.

Further, if the obtained terminal type is the personal computer, the communication section 250 generates a call of a transmission request based on the terminal call use telephone number obtained in step S201. The communication data file (i.e., report information) produced in step S196 are transmitted to the personal computer 211 is transmitted via the public line network 17, and the operation is completed (in steps S202 and S204).

To summarize the operation relating to this invention according to this embodiment of the supervising system, each of the plurality of a copier 1 transmits report information indicating the effect that a report activity such as abnormality or the like occurs in the machine to the service center 200 via communication control apparatus 18 and the public line network 17 using predefined communication protocol.

When receiving report information from each of the plurality of copiers 1, each client 201 through and 201n of the service center stores the report information in the external memory apparatus 203 of the file server 204, and displays the same on the displaying apparatus. Also, each client counts a not-yet-dealt-elapsing time period per each report information stored in the external memory apparatus 203, and compares the each not-yet-dealt time period with a predetermined time period (i.e., information designation value) in order. If a not-yet-dealt time periods for any one of report information exceeds the predetermined time period, a client informs that effect or the report information according to a prescribed method (i.e., the first informing method or the second informing method).

At this time, if the first informing method is designated, a displaying color for the report information, whose not-yet-dealt time period exceeds the predetermined time period, is changed (i.e., it can be dynamically changed according to elapsing of a time). If the second informing method is designated, the report information, whose not yet measuring time period exceeds the predetermined time period, is transmitted to a remote terminal (e.g. a personal computer 211 having a display apparatus or a fax 212) using predefined communication protocol (to be dealt there).

However, the first informing method or the second informing method can be designated according to a customer of a copier 1, a model, and each service station 210 by a command inputted from an outside. Further, the above mentioned predetermined time period can be changed according to a customer of a copier 1, a model, and each service station 210 by a command inputted from an outside.

Each of the clients 201 through and 201n transmits confirmation information indicating the effect of reception of report information to the copier 1 as a transmission source of the received report information. After transmitting the report information to the service center 200, each copier 1 transmits operation related information to the service center 200 via the public line network 17 and the communication control apparatus 18 using the predefined communication protocol, when the operation related information, which indicates the effect that a service person arrives at the copier installed place or that taking measure for resolving the occurred report activity is either started or completed, is inputted.

When receiving the operation related information transmitted from any one of the plurality of a copier 1, each client 201 through and 201n of the service center 200, deletes the report information transmitted from the copier as a transmission source of the operation related information and stored in the external memory apparatus 203.

Numerous additional modifications and variations of the present invention are possible in light of the above teachings. It is therefore to be understood that within the scope of the appended claims, the present invention may be practiced otherwise that as specifically described herein.

What is claimed as new and desired to be secures by Letters Patent of the United States is:

1. A system for supervising over a public line network, comprising:
   an image-forming apparatus configured to transmit report information when a report activity is initiated; and
   a monitoring terminal communicating with the image-forming apparatus over the public line network to receive the report information,
   the monitoring terminal being configured to store the received report information, to display contents of the stored report information, to count a not-yet-dealt-elapsing time period per stored report information, the not-yet-dealt-elapsing time period starting when the report information is stored at the monitoring terminal, to compare the not-yet-dealt-elapsing time period of the report information with a predetermined time period, and to inform selectively of the report information and associated effect based upon the not-yet-dealt-elapsing time period exceeding the predetermined time period.

2. The system as in claim 1, further comprising a service station configured to dispatch a service person to address the report information transmitted from the image-forming apparatus.

3. The system as in claim 1, wherein the monitoring terminal periodically compares between the not-yet-dealt-elapsing time period and the predetermined time period at a predetermined interval.

4. The system as in claim 3, wherein the predetermined interval is adjustable.

5. The system as in claim 1, wherein the predetermined time period is adjustable.

6. The system as in claim 1, wherein the report activity indicates an abnormality associated with the image-forming apparatus that requires urgent maintenance.

7. The system as in claim 1, wherein said monitoring terminal is configured to transmit confirmation information indicating reception of report information.

8. The system as in claim 1, wherein the monitoring terminal transmits the confirmation information when the report information is displayed.

9. The system as in claim 1, wherein the image-forming apparatus is configured to transmit operation related information to the monitoring terminal in response to the report information being transmitted to the monitoring terminal and operation related information.

10. The system as in claim 9, wherein the operation related information includes information-indicating completion of repair of the image-forming apparatus.

11. The system as in claim 10, wherein the monitoring terminal is configured to delete the stored report information based upon the operation related information corresponding to the report information being transmitted from the image-forming apparatus.

12. The system as in claim 1, wherein the monitoring terminal is configured to forward selectively the report information and associated effect based upon either a first informing method or a second informing method, when the not-yet-dealt-elapsing time period exceeds the predetermined time period.

13. The system as in claim 12, wherein the monitoring terminal is configured to designate at least one of the first informing method and the second informing method.

14. The system as in claim 12, wherein the first informing method includes informing an operator of the report information, wherein the system further comprises:
    another monitoring terminal configured to receive the report information based upon the second informing method.

15. The system as in claim 14, wherein the other monitor terminal is a part of a service station.

16. The system as in claim 13, wherein the first and second informing methods are selectively predetermined based upon customer information associated with the image-forming apparatus.

17. The system as in claim 13, wherein the first informing method and the second informing method is selectively predetermined based upon model of the image-forming apparatus.

18. The system as in claim 13, wherein the first informing method and the second informing method are selectively predetermined based upon service station information.

19. The system as in claim 1, wherein the monitoring terminal is configured to change the predetermined time period based upon customer information associated with the image-forming apparatus.

20. The system as in claim 1, wherein the monitoring terminal is configured to change the predetermined time period based upon model of the image-forming apparatus.

21. The system as claimed in claim 2, wherein the monitoring terminal is configured to change the predetermined time period based upon the service station corresponding to the image-forming apparatus.

22. The system as in claim 12, wherein the monitoring terminal displays the report information by using color images that dynamically change based upon the not-yet-dealt-elapsing time period exceeding the predetermined time period when the first informing method is designated.

23. The system as in claim 12, further comprising:
    a remote monitoring terminal connected to the public line network, wherein the image-forming apparatus transmits the report information to the remote monitoring terminal via a public line of the public line network when the second informing method is designated and the not-yet-dealt-elapsing time period corresponding to any report information exceeds the predetermined time period.

24. The system as in claim 23, wherein the remote terminal selectively displays the report information and associated effect.

25. The system as in claim 24, wherein the remote terminal is a personal computer.

26. The system as in claim 24, wherein the report information transmitted to the remote monitoring terminal is discriminated from other stored report information.

27. A method for supervising over a public line network, comprising:
    transmitting report information from an image-forming apparatus when a report activity is initiated;
    receiving the report information in a monitoring terminal;
    storing the received report information;
    displaying contents of the stored report information by the monitoring terminal;
    counting a not-yet-dealt-elapsing time period per stored report information, the not-yet-dealt-elapsing time period starting when the report information is stored at the monitoring terminal;
    comparing the not-yet-dealt-elapsing time period of the report information with a predetermined time period; and
    selectively informing an operator of the report information and associated effect based upon the not-yet-dealt-elapsing time period exceeding the predetermined time period.

28. The method as in claim 27, wherein the comparing step is periodically executed at a predetermined interval.

29. The method as in claim 28, wherein the predetermined interval is optionally changed.

30. The method as in claim 27, wherein said predetermined time is optionally changed.

31. The method as in claim 27, wherein the transmitting step is executed when an abnormality which requires urgent maintenance occurs in the image-forming apparatus.

32. The method as in claim 27, further comprising:
    transmitting confirmation information indicating reception of the report information to the image-forming apparatus as to identify the image-forming apparatus as a transmission source of the report information.

33. The method as in claim 32, wherein the step of transmitting confirmation information is executed when report information is displayed.

34. The method as in claim 27, further comprising:
    inputting operation related information; and
    transmitting operation related information to the monitoring terminal in response to the step of transmitting report information and the step of inputting operation related information.

35. The method as in claim 34, further comprising:
    deleting the stored report information based upon the step of transmitting operation related information.

36. The method as in claim 27, wherein the step of selectively informing is based upon at least one of the first informing method and the second informing method.

37. The method as in claim 36, wherein the first informing method includes displaying the report information to an operator, and the second informing method includes transmitting the report information to another monitoring terminal.

38. The method as in claim 36, wherein the other monitoring terminal is a service station.

39. The method as in claim 36, wherein the first and second informing methods are selectively predetermined depending on customer information associated with the image-forming apparatus.

40. The method as in claim 36, wherein the first informing method and the second informing method are selectively predetermined depending on model of the image-forming apparatus.

41. The method as in claim 36, wherein the first informing method and the second informing method are selectively predetermined depending on a service station corresponding to the image-forming apparatus.

42. The system as in claim 36, further comprising:
changing the predetermined time period according to customer information associated with the image-forming apparatus.

43. The method as in claim 42, further comprising:
changing the predetermined time period according to model of the image-forming apparatus.

44. The method as in claim 42, further comprising:
changing the predetermined time period according to a service station corresponding to the image-forming apparatus.

45. The method as in claim 36, wherein the step of displaying displays the report information by using color images that dynamically change based upon the not-yet-dealt-elapsing time period exceeding the predetermined time period when the first informing method is designated.

46. The method as in claim 36, further comprising:
transmitting the report information to a remote terminal via a public line of the public line network when the second informing method is designated and the not-yet-dealt-elapsing time period corresponding to any report information exceeds the predetermined time period.

47. The method as in claim 46, further comprising:
displaying the report information on a display on the remote monitoring terminal.

48. The method as in claim 46, further comprising:
discriminating the report information transmitted to the remote monitoring terminal from other stored report information.

49. A system for supervising over a public line network, comprising:
an image-forming apparatus configured to transmit report information when a report activity is initiated; and
a monitoring terminal communicating with the image-forming apparatus over the public line network to receive the report information, the monitoring terminal comprising:
report information receiving means for receiving report information transmitted from the image-forming apparatus,
report-information-storing means for storing the report information received by the report information receiving means,
report-information-displaying means for displaying contents of report information stored in the report information-storing means,
not-yet-dealt-elapsing time counting means for counting a not-yet-dealt-elapsing time period per report information stored in the report information-storing means, the not-yet-dealt-elapsing time period starting when the report information is stored at the monitoring terminal,
comparing means for comparing the not-yet-dealt-elapsing time period of the report information with a predetermined time period, and
informing means for informing through the report-information displaying means an operator of the report information and an associated effect based upon the not-yet-dealt-elapsing time period exceeding the predetermined time period.

50. The system as in claim 49, wherein the monitoring terminal means includes an informing method designating means for selectively designating at least one of a first informing method and a second informing method.

51. The system as in claim 50, wherein said first informing method informs the operator of report information through the report information displaying means, the system further comprising:
another monitoring terminal receiving the report information based upon the second informing method.

52. The system as in claim 51, wherein the other monitoring terminal is part of a service station.

* * * * *